US008707281B2

(12) United States Patent
Luszczek et al.

(10) Patent No.: US 8,707,281 B2
(45) **Date of Patent: *Apr. 22, 2014**

(54) PERFORMING PARALLEL PROCESSING OF DISTRIBUTED ARRAYS

(75) Inventors: Piotr R. Luszczek, Knoxville, TN (US); John N. Little, Sherborn, MA (US); Jocelyn Luke Martin, Burwell (GB); Halldor N. Stefansson, Natick, MA (US); Edric Ellis, Cambs (GB); Penelope L. Anderson, Newton, MA (US); Brett Baker, Framingham, MA (US); Loren Dean, Natick, MA (US); Roy E. Lurie, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 52 days.

This patent is subject to a terminal disclaimer.

(21) Appl. No.: 13/555,517

(22) Filed: Jul. 23, 2012

(65) Prior Publication Data

US 2012/0284726 A1 Nov. 8, 2012

Related U.S. Application Data

(63) Continuation of application No. 12/254,605, filed on Oct. 20, 2008, now Pat. No. 8,255,890, which is a (Continued)

(51) Int. Cl.
*G06F 9/45* (2006.01)

(52) U.S. Cl.
USPC ............................ 717/149; 717/150; 717/151

(58) Field of Classification Search
USPC .................................................. 717/145–151
IPC ........................ G06F 8/41,8/354, 8/456, 9/3822
See application file for complete search history.

(56) References Cited

U.S. PATENT DOCUMENTS 5,021,945 A 6/1991 Morrison et al.
5,293,631 A 3/1994 Rau et al.

(Continued)

FOREIGN PATENT DOCUMENTS

WO 93/15457 8/1993
WO WO 2006/032001 A2 3/2006

(Continued)

OTHER PUBLICATIONS

Shirako et al, "Chunking Parallel Loops in the Presence of Synchronization", ACM, pp. 181-192, 2009.*

(Continued)

*Primary Examiner* — Anil Khatri
(74) *Attorney, Agent, or Firm* — Harrity & Harrity, LLP

(57) ABSTRACT

One or more computer-readable media store executable instructions that, when executed by processing logic, perform parallel processing. The media store one or more instructions for initiating a single programming language, and identifying, via the single programming language, one or more data distribution schemes for executing a program. The media also store one or more instructions for transforming, via the single programming language, the program into a parallel program with an optimum data distribution scheme selected from the one or more identified data distribution schemes, and allocating the parallel program to two or more labs for parallel execution. The media further store one or more instructions for receiving one or more results associated with the parallel execution of the parallel program from the two or more labs, and providing the one or more results to the program.

20 Claims, 47 Drawing Sheets

Related U.S. Application Data

(63) continuation-in-part of application No. 11/748,938, filed on May 15, 2007, now Pat. No. 8,010,954, which is a continuation-in-part of application No. 11/706,805, filed on Feb. 14, 2007, now Pat. No. 7,975,001, said application No. 12/254,605 is a continuation-in-part of application No. 11/758,947, filed on May 15, 2007, now Pat. No. 8,108,845, which is a continuation-in-part of application No. 11/706,805, filed on Feb. 14, 2007, now Pat. No. 7,975,001.

(60) Provisional application No. 61/054,292, filed on May 19, 2008, provisional application No. 61/054,295, filed on May 19, 2008.

(56) References Cited

U.S. PATENT DOCUMENTS 5,355,492 A 10/1994 Frankel et al.
5,355,494 A 10/1994 Sistare et al.
5,442,758 A * 8/1995 Slingwine et al. ............ 717/147
5,442,797 A 8/1995 Casavant et al.
5,485,612 A 1/1996 Ota et al.
5,515,535 A 5/1996 Frankel et al.
5,535,393 A 7/1996 Reeve et al.
5,551,039 A 8/1996 Weinberg et al.
5,586,325 A 12/1996 MacDonald et al.
5,717,883 A 2/1998 Sager
5,721,928 A * 2/1998 Umehara et al. .............. 717/149
5,752,036 A 5/1998 Nakamura et al.
5,768,594 A 6/1998 Blelloch et al.
5,832,272 A * 11/1998 Kalantery ..................... 717/149
6,106,575 A 8/2000 Hardwick
6,112,225 A 8/2000 Kraft et al.
6,253,371 B1 6/2001 Iwasawa et al.
6,275,448 B1 8/2001 Kittower et al.
6,339,840 B1 * 1/2002 Kothari et al. ................ 717/149
6,463,457 B1 10/2002 Armentrout et al.
6,609,248 B1 8/2003 Srivastava et al.
6,665,862 B2 12/2003 Isman
6,681,388 B1 * 1/2004 Sato et al. ..................... 717/159
6,725,448 B1 4/2004 Moriya et al.
6,829,760 B1 12/2004 Bera
6,851,108 B1 2/2005 Syme et al.
6,865,730 B1 3/2005 Burke et al.
6,961,925 B2 11/2005 Callahan et al.
6,963,917 B1 11/2005 Callis et al.
7,103,628 B2 9/2006 Neiman et al.
7,127,709 B2 10/2006 Demsey et al.
7,134,073 B1 11/2006 Fiedorowicz et al.
7,171,615 B2 1/2007 Jensen et al.
7,174,381 B2 * 2/2007 Gulko et al. .................. 709/226
7,254,806 B1 8/2007 Yates et al.
7,305,666 B2 12/2007 Burger et al.
7,313,788 B2 12/2007 Ben-David et al.
7,475,393 B2 1/2009 Essick et al.
7,493,606 B2 2/2009 Morin
7,555,745 B2 * 6/2009 Iwashita ....................... 717/137
7,620,945 B1 11/2009 Song et al.
7,680,765 B2 3/2010 Meijer et al.
7,712,090 B2 * 5/2010 Stuefe ........................... 717/149
7,757,222 B2 * 7/2010 Liao et al. ..................... 717/140
7,765,534 B2 * 7/2010 Archambault et al. ....... 717/154
7,770,161 B2 8/2010 Mitran et al.
7,797,691 B2 9/2010 Cockx et al.
7,849,451 B2 12/2010 Palacz et al.
7,853,937 B2 * 12/2010 Janczewski ................... 717/149
7,975,001 B1 7/2011 Stefansson et al.
7,984,431 B2 7/2011 Kejariwal et al.
8,010,954 B2 8/2011 Little et al.
8,108,845 B2 1/2012 Little et al.
8,136,104 B2 3/2012 Papakipos et al.
8,146,066 B2 * 3/2012 Demetriou et al. ........... 717/149
8,225,300 B1 7/2012 Webb et al.
8,239,846 B2 8/2012 Luszczek et al.
8,239,847 B2 * 8/2012 Yu et al. ........................ 717/149
8,261,249 B2 * 9/2012 Archer et al. ................. 717/149
8,381,202 B2 * 2/2013 Papakipos et al. ............ 717/149
8,443,249 B2 * 5/2013 Li et al. ......................... 714/752
8,443,348 B2 * 5/2013 McGuire et al. .............. 717/146
8,448,156 B2 * 5/2013 Demetriou et al. ........... 717/149
2002/0078125 A1 6/2002 Ichinose et al.
2003/0014611 A1 1/2003 Ferris
2003/0101023 A1 5/2003 Shah et al.
2004/0098447 A1 5/2004 Verbeke et al.
2004/0215829 A1 10/2004 Hubbard et al.
2004/0243709 A1 12/2004 Kalyanavarathan et al.
2005/0015437 A1 1/2005 Strait
2005/0021795 A1 1/2005 Kuroshima et al.
2006/0041859 A1 2/2006 Vrancic et al.
2006/0059251 A1 3/2006 Cunha et al.
2006/0212882 A1 9/2006 Foti et al.
2007/0143248 A1 6/2007 Uppala
2008/0022264 A1 1/2008 Macklem et al.
2009/0006167 A1 1/2009 Toussaint et al.
2009/0044179 A1 2/2009 Luszczek et al.
2009/0044196 A1 2/2009 Stefansson et al.
2009/0044197 A1 2/2009 Stefansson et al.
2009/0119677 A1 5/2009 Stefansson et al.
2009/0132867 A1 5/2009 Stefansson et al.
2011/0035736 A1 2/2011 Stefansson et al.
2011/0035737 A1 2/2011 Stefansson et al.
2012/0011347 A1 1/2012 Little et al.

FOREIGN PATENT DOCUMENTS

WO WO 2006/088669 A1 8/2006
WO WO 2007/016658 A1 2/2007
WO WO 2008/144187 11/2008

OTHER PUBLICATIONS

Bikshandi et al, "Efficient, Portable Implementation of Asynchronous Multi-place Programs" ACM pp. 271-281, 2009.*

Wu et al, "SCALAEXTRAP: Trace-Based Communication Extrapolation for SPMD Programs"ACM Transactions on Programming Languages and Systems, vol. 34, No. 1, Article 5, pp, 1-29, 2012.*

Tabatabaee et al, "Automatic Software Interference Detection in Parallel Applications" ACM pp. 1-12, 2007.*

Clapp et al., "Parallel language constructs for efficient parallel processing", IEEE, pp. 230-241, 1992.

Nichols et al., "Data management and control flow aspects of an SIMD/SPMD parallel language/compiler", IEEE, vol. 4, No. 2, pp. 222-234, 1993.

Zhang et al., "Intelligent allocation alogorithms based on parallel processing technology of the computer loads", IEEE, pp. 778-781, 2010.

Warneke, "Exploiting dynamic resources allocation for efficient parallel data processing in the cloud", IEEE, vol. 22, No. 6, pp. 985-997, 2011.

Zhou et al., "Implementing database operations using SIMD instructions", ACM SIGMOD, pp. 145-156, 2002.

Liu et al., "PLDA+, Parallel latent dirichlet allocation with data placement and pipeline processing", ACM Trans. on Intelligent Sys. and Tech. vol. 2, No. 3, article 26, pp. 1-18, 2011.

Ismail et al., "Program based static allocation policies for highly parallel computers", IEEE, pp. 61-68, 1995.

Kejariwal et al., "On the exploitation of loop level parallelism in embedded applications," ACM Trans. on embedded computing systems, vol. 8, No. 2, article 10, pp. 1-34, 2009.

Massen et al., "Efficient Java RMI for parallel programming," ACM Trans. on Prog. Lang. and Sys., vol. 23, No. 6, pp. 747-775, 2001.

Nieuwpoort et al., "Satin: A high level and efficient grid programming model," ACM Trans. Prog. Lang. and Sys., vol. 32, No. 3, article 9, pp. 1-39, 2010.

Norris et al., "An experimental study of several cooperative register allocation and instruction scheduling strategies," IEEE, pp. 169-179, 1995.

(56) References Cited

OTHER PUBLICATIONS

International Search Report and Written Opinion mailed Aug. 25, 2008 issued in corresponding international application No. PCT/US2008/062162, 14 pages.
Behboodian et al., "The Mathworks Distributed and Parallel Computing Tools for Signal Processing Applications," IEEE International Conference on Acoustics, Speech and Signal Processing, vol. IV, Apr. 2007, pp. 1185-1188.
Bartz et al., "Rendering and Visualization in Parallel Environments," IEEE Visualization 2001, tutorial 3, 51 pages.
Chen et al., "MATLAB*G: A Grid-Based Parallel MATLAB," htto://ntu-cg.ntu,edu.sg/Grid_competition/report/grid-9.pdf, print date Apr. 6, 2006, 6 pages.
Choy et al., "Parallel MATLAB: Doing it Right," Proceedings of IEEE, vol. 93, No. 2, Feb. 2005, 11 pages.
Travinin et al., "pMapper: Automatic Mapping of Parallel Matlab Programs," Proceedings of the Users Group Conference 2005, 8 pages.
Xue et al., "Implementation of a Grid Computation Toolkit for Design Optimisation with Matlab and Condor," Lecture Notes in Computer Science: Euro-Par 2003 Parallel Processing, vol. 2790, 2003, 9 pages.
Fernández, "Resource Management for Interactive Jobs in a Grid Environment," 2006 IEEE International Conference on Cluster Computing, pp. 1-10, 2006.
Kupczyk et al., "New Generation Environment for Grid Interactive MPI Applications," CrossGrid technical achievements, Amsterdam, retrieved online at http://desktop.psnc.pl/docs/pdf/md_ras_jss.pdf, 2005, 18 pages.
Reuther et al., "Technology Requirements for Supporting On-Demand Interactive Grid Computing," Proceedings of the HPCMP Users Group Conference, pp. 320-327, 2005.
Talwar et al., "An Environment for Enabling Interactive Grids," IEEE International Symposium on High Performance Distributed Computing (HPDC-12), pp. 1-10, 2003.
International Search Report for Application No. PCT/US2008/001921, dated Sep. 5, 2008.
Condor® Version 6.6.11 Manual, retrieved online at http://www.cs.wisc.edu/condor/manual/v6.6/condor-V6_6_11-Manual.pdf (2006) 603 pages.
Raman et al., "Policy Driven Heterogeneous Resource Co-Allocation with Gangmatching," Proceedings of the 12th IEEE International Symposium on High Performance Distributed Computing, pp. 80-89, 2003.
Roy et al., "Condor and Preemptive Resume Scheduling," Grid Resource Management: State of the Art and Future Trends, Klumer Academic Publishers, Jarek Nabrzyski, Ed., pp. 135-144, 2003.
Thain et al., "Distributed Computing in Practice: The Condor Experience," Concurrency: Pract. Exper., pp. 0-20, 2004.
Condor High Throughput Computing, "What is Condor?," retrieved online at http://www.cs.wisc.edu/condor/description.html, 2007, 2 pages.
Condor High Throughput Computing, "An Overview of the Condor System," retrieved online at http://www.cs.wisc.edu/condor/overview/, 2007, 4 pages.
Condor High Throughput Computing, "Top Five Myths About Condor," retrieved online at http://www.cs.wisc.edu/condor/myths.html, 2007, 2 pages.
Condor High Throughput Computing, "Condor Checkpointing," retrieved online at http://www.cs.wisc.edu/condor/checkpointing.html, 2007, 2 pages.
Condor High Throughput Computing. "Classified Advertisements," retrieved online at http://www.cs.wisc.edu/condor/classad/, 2007, 3 pages.
Condor High Throughput Computing. "Condor Standalone ClassAd Catalog," retrieved online at http://www.cs.wisc.edu/condor/catalog/, 2007, 2 pages.
Condor High Throughput Computing, "Condor-G," retrieved online at http://www.cs.wisc.edu/condor/condorg/, 2007, 2 pages.
Condor High Throughput Computing, "Condor or Condor-G: Which one is right for me?," retrieved online at http://www.cs.wisc.edu/condor/condorg/versusG.html, 2007, 3 pages.
Condor High Throughput Computing, "DiskRouter," retrieved online at http://www.cs.wisc.edu/condor/diskrouter/, 2007, 1 page.
Condor High Throughput Computing, "Condor Trigger," retrieved online at http://www.cs.wisc.edu/condor/trigger/, 2007, 1 page.
Condor High Throughput Computing, "MW Overview," retrieved online at http://www.cs.wisc;edu/condor/rnw/overview.html, 2007, 3 pages.
Condor, "Birdbath," retrieved online at http://www.cs.wisc.edu/condor/birdbath/, 2006, 1 page.
Condor, "Bypass," retrieved online at http://www.cs.wisc.edulcondor/bypass/, 2007, 2 pages.
Condor, "Chirp," retrieved online at http://www.cs.wisc.edu/condor/chirp/, 2007, 1 page.
Condor, "FTP-Lite," retrieved online at http://www.cs.wisc.edu/condor/ftp_lite/, 2007, 1 page.
Condor, The Grid Console, retrieved online at http://www.cs.wisc.edu/condor/bypasslexamples/grid-console/, 2007, 3 pages.
Condor, "Hawkeye," retrieved online at http://lwww.cs.wisc.edu/condorlhawkeye/, 2007, 4 pages.
Condor, "NeST: Network Storage, Flexible Commodity Storage Appliances," retrieved online at http://www.cs.wisc.edu/condorlnest/, 2007, 3 pages.
Condor, "STORK: A Scheduler for Data Placement Activities in the Grid," retrieved online at http://www.cs.wisc.edu/condor/stork/, 2007, 1 page.
Condor, "Hunting for Wasted Computing Powder, New Software for Computing Networks Puts Idle PC's to Work," retrieved online at http://www.cs.wisc.edu/condor/doc/Wiscidea.html, 2007, 6 pages.
Frey et al., "Condor-G: A Computation Management Agent for Multi-Institutional Grids," retrieved online at http://www.cs.wisc.edu/condor/doc/condorg-hpdc10.pdf, 2007, 9 pages.
GCB: Generic Connection Brokering. retrieved online at http://www.cs.wisc.edu/-sschang/firewalllgcblindex.htm, 2007, 1 page.
Geer, "Taking the Graphics Processor beyond Graphics," retrieved online at http://ieeexplore.ieee.org/iel5/2/32339/01510560.pdf?tp=&isnumber=&arnumber=1510560, 2005, pp. 14-16.
Goux et al., "Metacomputing and the Master-Worker Paradigm," retrieved online at http://citeseer.ist.psu.edu/cache/papers/cs/17913/ftp:zSzzSzinfo.mcs.anl.govzSzpubzSztech_reportszSzreportszSzP792.pdf/goux00metacomputing.pdf, 2000, 12 pages.
Kulkami, "An Intelligent framework for Master-Worker Applications in a dynamic Metacomputing Environment," retrieved online at http://209.85.165.104/search?q=cache:dcoAFCWtFzgJ:www.cs.wisc.edu/condor/mw/masters.doc+An+Intelligent+framework+for+Master-Worker+Applications+in+a+dynamic+Metammputing+Environment&hl=en&ct=clnk&cd=1&gl=us, 2001, 14 pages.
Parker, Ann, "Built for Speed, Graphics Processors for General-Purpose Computing," retrieved online at http://72.14.209.104/search?q=cache:juEMGJAVMUsJ:www.llnl.gov/str/Novembe5/pdfs/11_05.3.pdf+Built+for+Speed,+Graphics+Processors+for+General-Purpose+Computing,&hl=en&ct=clnk&cd=3&gl=us, 2005, 2 pages.
Tutorial: Luebke, "General-Purpose Computation on Graphics Hardware, GPGPU," SIGGRAPH 2004 retrieved online at http://www.gpgpu.org/s2005/slides13, 2005, pp. 80-113.
Tutorial: Thain, "Master-Worker Tutorial, Condor Week 2006," http://www.cs.wisc.edu/condor/CondoNVeek2006/presentations/thain_mw_tutorial.ppt, 2006, 24 pages.
Tutorial: Farrellee, "Developer APIs to Condor + A Tutorial on Condor's Web Service Interface," retrieved online at http://www.cs.wisc.edu/condor/CondoNVeek2006/presentations/farrellee_tannenba_APIs.ppt, 2006, 44 pages.
Wilson et al., "How Graphics Cards Work," retrieved online at http://computer.howstuffworks.com/graphics-card.htm, 2007, 3 pages.

(56) References Cited

OTHER PUBLICATIONS

Notification of Transmittal of the International Search Report and the Written Opinion of the International Searching Authority, or the Declaration corresponding to PCT/US2009/044384, mailed Oct. 13, 2009, 24 pages.

Bliss et al., "pMatlab Parallel Matlab Library", The International Journal of High Performance Computing Applications, vol. 21, No. 3, Sep. 2007, pp. 336-359, XP009122756.

Hiranandani et al., "Compiling Fortran D for MIMD Distributed-Memory Machines", Communications of the Association for Computing Machinery, vol. 35, No. 8, Aug. 1992, pp. 66-80, XP000331490.

Hall et al., "Interprocedural Compilation of Fortran D for MIMD Distributed-Memory Machines", Proceedings of the Supercomputing Conference, Nov. 1992, pp. 522-534, XP010026946.

Carpenter et al., "Translation Schemes for the HPJava Parallel Programming Language", Languages and Compliers for Parallel Computing, $14^{th}$ International Workshop, LCPC 2001, Revised Papers (Lecture Notes in Computer Science vol. 2624) pp. 18-32, XP002547687.

Behboodian et al., "The Mathworks Distributed and Parallel Computing Tools for Signal Processing Applications", IEEE International Conference on Acoustics, Speech and Signal Processing, vol. 4, Apr. 2007, pp. IV-1185-IV-1188, XP002491720.

The MathWorks, "Matlab—Distributed Computing Toolbox 3—User's Guide", Sep. 2007, 487 pages, XP007909781.

Office Action from U.S. Appl. No. 12/254,618, dated Dec. 15, 2011, 12 pages.

Office Action from U.S. Appl. No. 12/254,620, dated Dec. 30, 2011, 11 pages.

Husbands, P. J. R.: "Interactive Supercomputing", Doctoral Thesis; Department of Electrical Engineering and Computer Science, Massachusetts Institute of Technology, Jan. 1999, 96 pages.

U.S. Appl. No. 12/254,618, filed Oct. 20, 2008, entitled: "Parallel Processing of Distributed Arrays", by Piotr R. Luszczek et al., 77 pages, 47 pages of drawings.

Co-pending U.S. Appl. No. 12/254,605, filed Oct. 20, 2008, entitled "Media for Performing Parallel Processing of Distributed Arrays"; Piotr R. Luszczek et al., 77 pages, 47 sheets of drawings.

* cited by examiner

100

110

120
HARDWARE UE 200
PROCESSOR 210-1
PROCESSOR 210-2
PROCESSOR 210-3
PROCESSOR 210-4
TASK (350-1)
RESULT (360-1)
350-2
360-2
350-3
360-3
350-4
360-4
SCHEDULER 310
JOB (340)
RESULT (370)
CLIENT 300
TECHNICAL COMPUTING ENVIRONMENT 320
LIBRARY 330

130
SOFTWARE UE
410
LAB
420-1
LAB
420-2
LAB
420-3
LAB
420-4
PROGRAM PORTION (440-1)
RESULT (450-1)
440-2
450-2
440-3
450-3
440-4
450-4
CONTROLLER
400
MAIN PROGRAM (430)
RESULT (460)
TECHNICAL COMPUTING ENVIRONMENT
320

140
CLIENT 500
PROGRAM PROVIDER 510
MAIN PROGRAM (545)
ANALYSIS LOGIC 520
PROGRAM PORTIONS (550)
RESOURCE ALLOCATION LOGIC 530
ALLOCATION (560)
RESULTS (570)
RESULTS PROVIDER 540
570

140

RESULTS (570)
ALLOCATION (560)
PROGRAM PORTIONS (550)
MAIN PROGRAM (545)
570
CLIENT 500
RESULTS PROVIDER 540
RESOURCE ALLOCATION LOGIC 530
ANALYSIS LOGIC 520
WEB SERVICE 580
PROGRAM PROVIDER 510

140
CLIENT 500
PROGRAM PROVIDER 510
MAIN PROGRAM (545)
PARALLEL PROCESSING OBJECT API 590
PROGRAM PORTIONS (550)
RESOURCE ALLOCATION LOGIC 530
ALLOCATION (560)
RESULTS (570)
RESULTS PROVIDER 540
570

SOFTWARE UE
410
LAB
420-3
NUMLABS (720)
LABINDEX (740)
LAB
420-4
NUMLABS (720)
LABINDEX (760)
LAB
420-1
NUMLABS (720)
LABINDEX (730)
LAB
420-2
NUMLABS (720)
LABINDEX (750)
770
550-3
550-1
550-2
550-4
TECHNICAL COMPUTING ENVIRONMENT
320
ANALYSIS LOGIC 520
SPMD COMMAND
700
SPMD, statement, ..., statement, END 500
TECHNICAL COMPUTING ENVIRONMENT 320
SPMD OPTIONAL 900
USE SPMD SYNTAX (940)
EFFICIENT DISTRIBUTION SCHEME IDENTIFIER 920
EFFICIENT DISTRIBUTION SCHEME (960)
DO NOT USE SPMD SYNTAX (930)
DISTRIBUTION SCHEME 910
DISTRIBUTION SCHEME (950)

500
TECHNICAL COMPUTING ENVIRONMENT
320
DISTRIBUTION SCHEME COMMANDS
1000
distributor
DISTRIBUTED ARRAY COMMANDS
1010
distributed
REMOTE CLASS (1020)
OUTSIDE DIST. ARRAY PARALLEL CONTEXT (1040)
ANALYSIS LOGIC 520
codistributor
codistributed
NON-REMOTE CLASS (1030)
INSIDE DIST. ARRAY PARALLEL CONTEXT (1050)
AUTOMATICALLY CREATED (1060)
1030/1050
TO LABS 420

500
TECHNICAL COMPUTING ENVIRONMENT
320
DISTRIBUTION SCHEME COMMANDS
1100
cDist1 = distributor('1d');
class(cDist1) % 'distributor'
spmd
rDist = codistributor ('1d');
class(rDist) % 'codistributor'
end
OUTER PARALLEL CONTEXT (1110)
SPMD BOUNDARIES (1120)
INNER PARALLEL CONTEXT (1130)
1130
TO LABS 420

500
DISTRIBUTION SCHEME COMMANDS
1200
spmd
distL = codistributor( . . .);
end
distR = distributor( . . .);
DISTRIBUTOR PLACEMENT API
1210
distL IS NON-REMOTE CLASS (codistributor) (1230)
distR IS REMOTE CLASS (distributor) (1240)

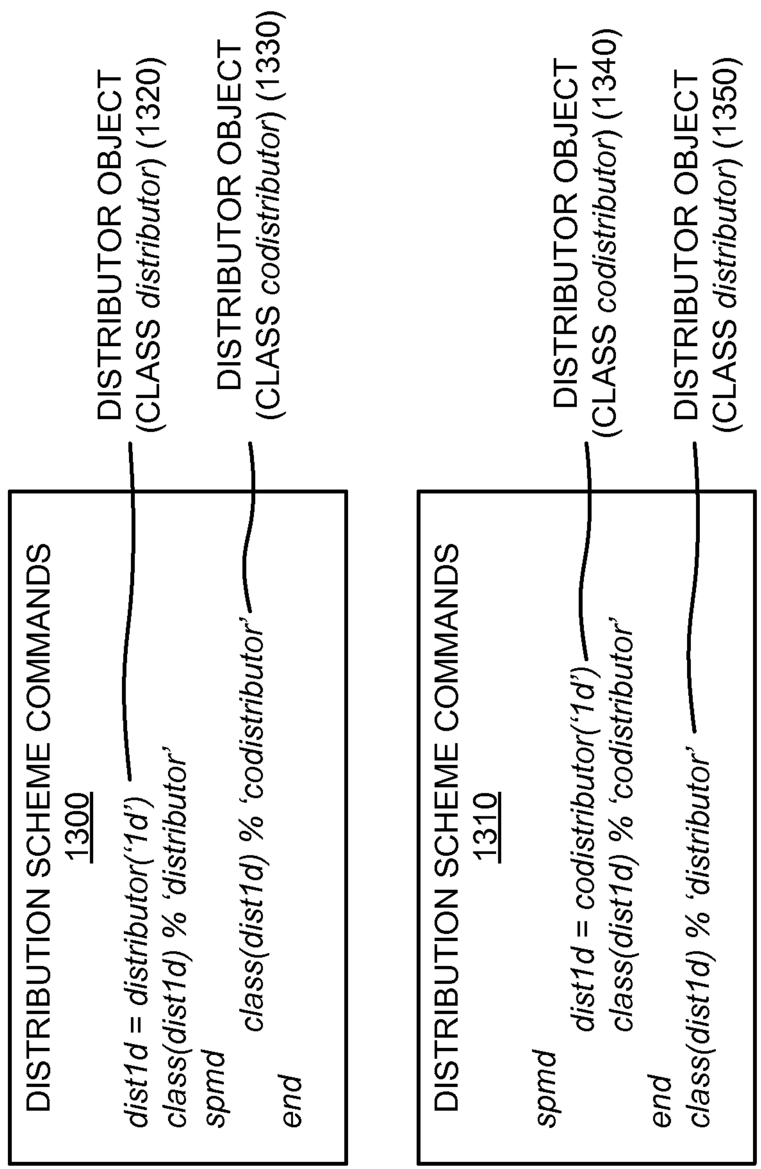
FIG. 13
500
DISTRIBUTION SCHEME COMMANDS
1300
dist1d = distributor('1d')
class(dist1d) % 'distributor'
spmd
class(dist1d) % 'codistributor'
end
DISTRIBUTOR OBJECT
(CLASS distributor) (1320)
DISTRIBUTOR OBJECT
(CLASS codistributor) (1330)
DISTRIBUTION SCHEME COMMANDS
1310
spmd
dist1d = codistributor('1d')
class(dist1d) % 'codistributor'
end
class(dist1d) % 'distributor'
DISTRIBUTOR OBJECT
(CLASS codistributor) (1340)
DISTRIBUTOR OBJECT
(CLASS distributor) (1350)

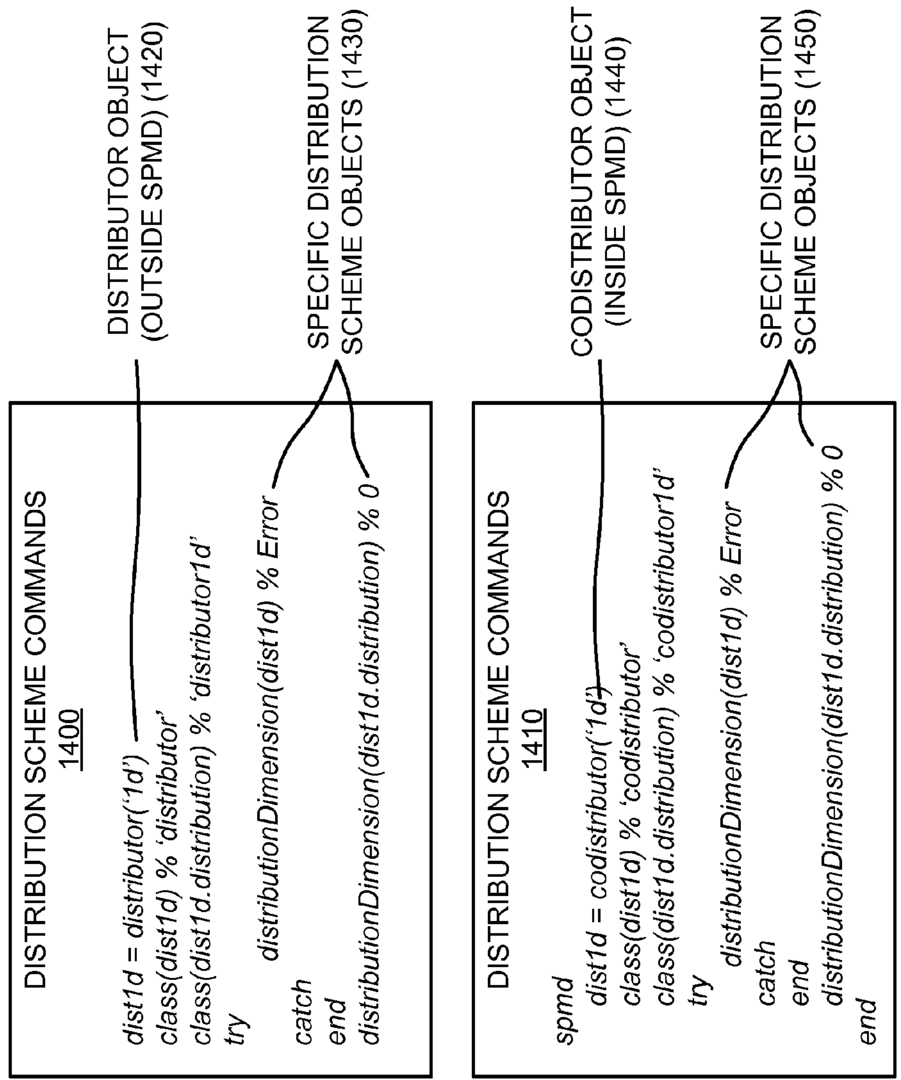
FIG. 14
500
DISTRIBUTION SCHEME COMMANDS
1400
dist1d = distributor('1d')
class(dist1d) % 'distributor'
class(dist1d.distribution) % 'distributor1d'
try
distributionDimension(dist1d) % Error
catch
end
distributionDimension(dist1d.distribution) % 0
DISTRIBUTOR OBJECT (OUTSIDE SPMD) (1420)
SPECIFIC DISTRIBUTION SCHEME OBJECTS (1430)
DISTRIBUTION SCHEME COMMANDS
1410
spmd
dist1d = codistributor('1d')
class(dist1d) % 'codistributor'
class(dist1d.distribution) % 'codistributor1d'
try
distributionDimension(dist1d) % Error
catch
end
distributionDimension(dist1d.distribution) % 0
end
CODISTRIBUTOR OBJECT (INSIDE SPMD) (1440)
SPECIFIC DISTRIBUTION SCHEME OBJECTS (1450)

500

DISTRIBUTED ARRAY COMMANDS
1700

```
classdef distributed
  methods
    function [R, p] = chol(D)
      spmd
        [R, p] = chol(D);
      end
      p = p{1}; % make p non-remote
    end
  end
end
```

INNER PARALLEL CONTEXT (*p* IS REMOTE) (1710)

DEREFERENCE *p* (*p* BECOMES NON-REMOTE) (1720)

DISTRIBUTION SCHEME / DISTRIBUTED ARRAY COMMANDS
2200

```
dist_nV = codistributor(. . .);
N_nV = 10000;
spmd
        dist_V = codistributor(. . .);
        N_V = 10000;
        K_V = 10000 * labindex;
end
dA_V = zeros(N_V, dist_V)
dA_V = zeros(N_nV, dist_V)
dA_nV = zeros(N_nV, dist_nV)
dE = zeros(N_V, dist_nV)
```

NON-REMOTE *distributor* OBJECT (2210)

REMOTE *distributor* OBJECT (2220)

*distributed* CLASS OBJECT (2230)

*codistributed* CLASS OBJECT (2240)

ERROR (2250)

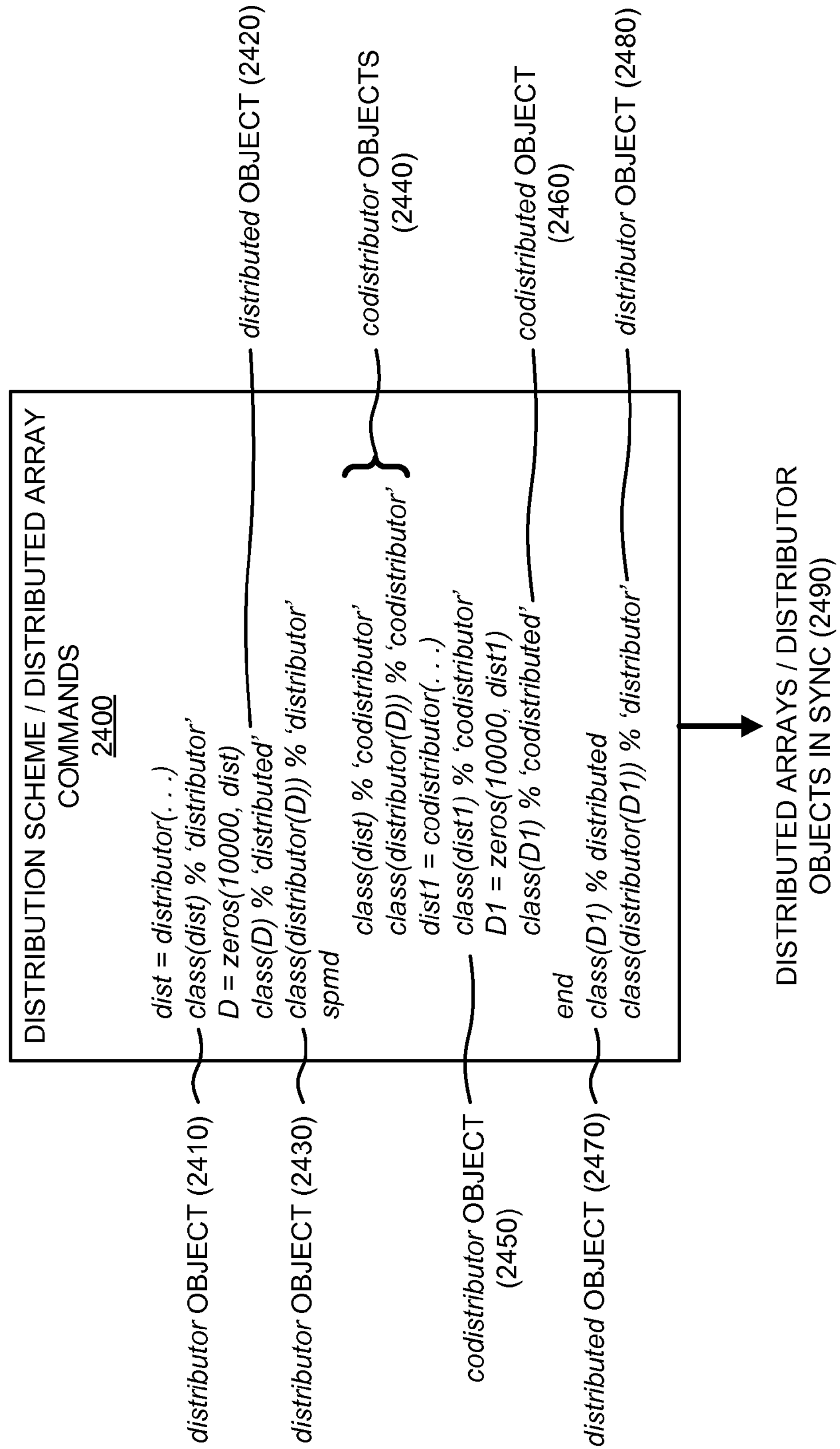
FIG. 24
500
DISTRIBUTION SCHEME / DISTRIBUTED ARRAY COMMANDS
2400
dist = distributor(. . .)
class(dist) % 'distributor'
D = zeros(10000, dist)
class(D) % 'distributed'
class(distributor(D)) % 'distributor'
spmd
class(dist) % 'codistributor'
class(distributor(D)) % 'codistributor'
dist1 = codistributor(. . .)
class(dist1) % 'codistributor'
D1 = zeros(10000, dist1)
class(D1) % 'codistributed'
end
class(D1) % distributed
class(distributor(D1)) % 'distributor'
distributor OBJECT (2410)
distributed OBJECT (2420)
distributor OBJECT (2430)
codistributor OBJECTS (2440)
codistributor OBJECT (2450)
codistributed OBJECT (2460)
distributed OBJECT (2470)
distributor OBJECT (2480)
DISTRIBUTED ARRAYS / DISTRIBUTOR OBJECTS IN SYNC (2490)

DISTRIBUTION SCHEME / DISTRIBUTED ARRAY COMMANDS
2700

```
function nrm = solverSPMD(n, dist)
        A = rand(n, dist); % local call on labs
        b = rand(n, 1, dist); % local call on labs
        x = A \ b; % local call on labs
        r = A * x – b; % 2 local calls on labs
        nrm = norm(r, Inf); % local call on labs
end

function testerSPMD()
        n = 1e5;
        dist - distributor('1d'); % remote call
        spmd % 1 remote call when SPMD sent to labs
                nrm = solverSPMD(n, dist);
        end
        nrm = nrm{1};
        disp(nrm / n / eps);
end
```

2710

2720

2730

500

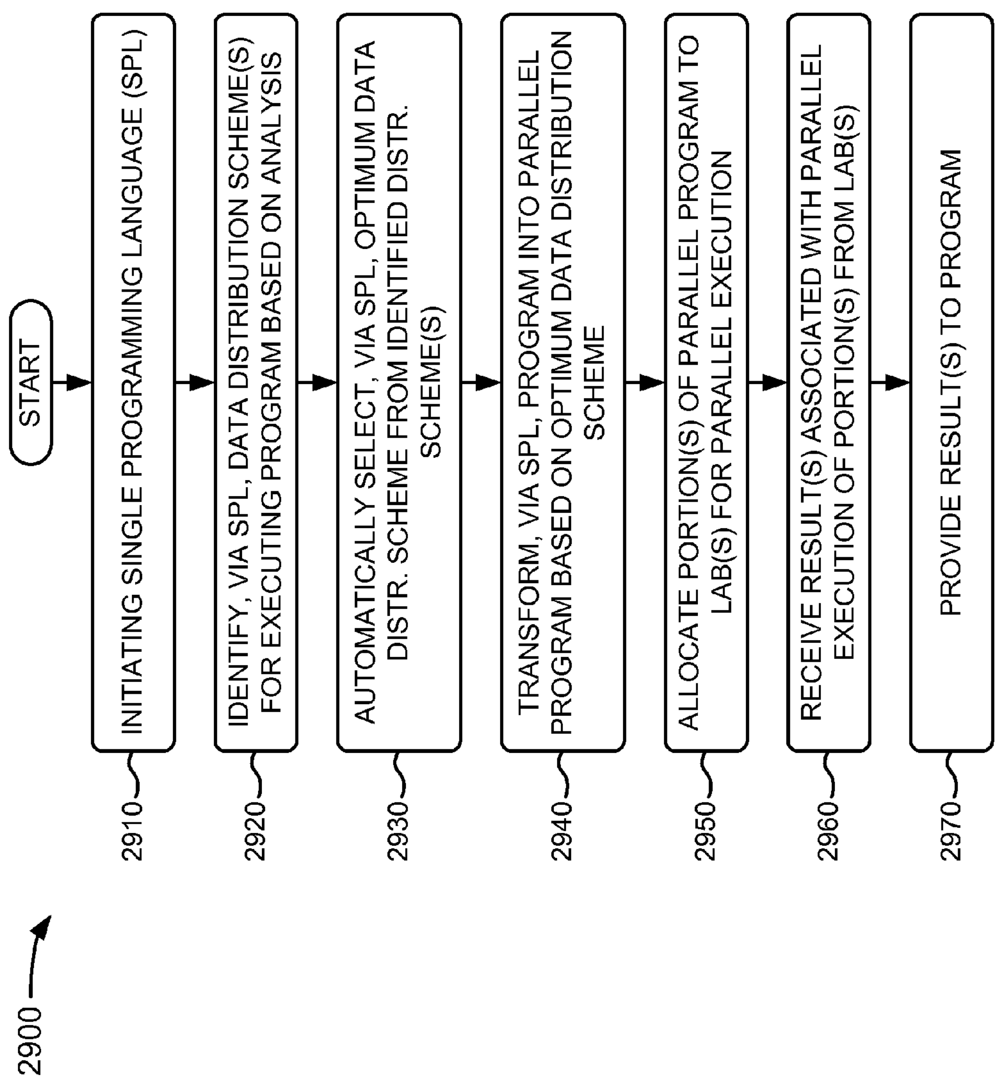
FIG. 29
2900
START
2910
INITIATING SINGLE PROGRAMMING LANGUAGE (SPL)
2920
IDENTIFY, VIA SPL, DATA DISTRIBUTION SCHEME(S) FOR EXECUTING PROGRAM BASED ON ANALYSIS
2930
AUTOMATICALLY SELECT, VIA SPL, OPTIMUM DATA DISTR. SCHEME FROM IDENTIFIED DISTR. SCHEME(S)
2940
TRANSFORM, VIA SPL, PROGRAM INTO PARALLEL PROGRAM BASED ON OPTIMUM DATA DISTRIBUTION SCHEME
2950
ALLOCATE PORTION(S) OF PARALLEL PROGRAM TO LAB(S) FOR PARALLEL EXECUTION
2960
RECEIVE RESULT(S) ASSOCIATED WITH PARALLEL EXECUTION OF PORTION(S) FROM LAB(S)
2970
PROVIDE RESULT(S) TO PROGRAM

2940

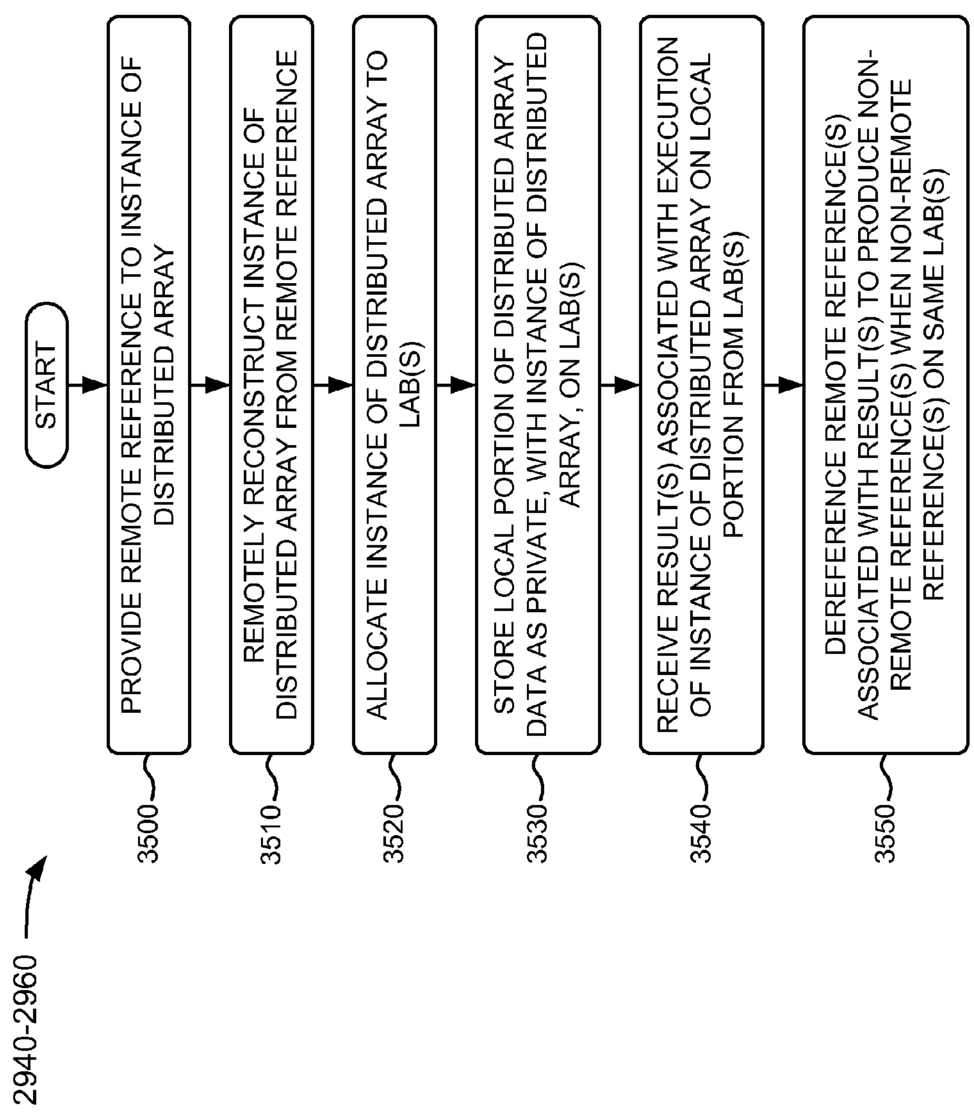
FIG. 35
2940-2960
START
3500
PROVIDE REMOTE REFERENCE TO INSTANCE OF DISTRIBUTED ARRAY
3510
REMOTELY RECONSTRUCT INSTANCE OF DISTRIBUTED ARRAY FROM REMOTE REFERENCE
3520
ALLOCATE INSTANCE OF DISTRIBUTED ARRAY TO LAB(S)
3530
STORE LOCAL PORTION OF DISTRIBUTED ARRAY DATA AS PRIVATE, WITH INSTANCE OF DISTRIBUTED ARRAY, ON LAB(S)
3540
RECEIVE RESULT(S) ASSOCIATED WITH EXECUTION OF INSTANCE OF DISTRIBUTED ARRAY ON LOCAL PORTION FROM LAB(S)
3550
DEREFERENCE REMOTE REFERENCE(S) ASSOCIATED WITH RESULT(S) TO PRODUCE NON-REMOTE REFERENCE(S) WHEN NON-REMOTE REFERENCE(S) ON SAME LAB(S)

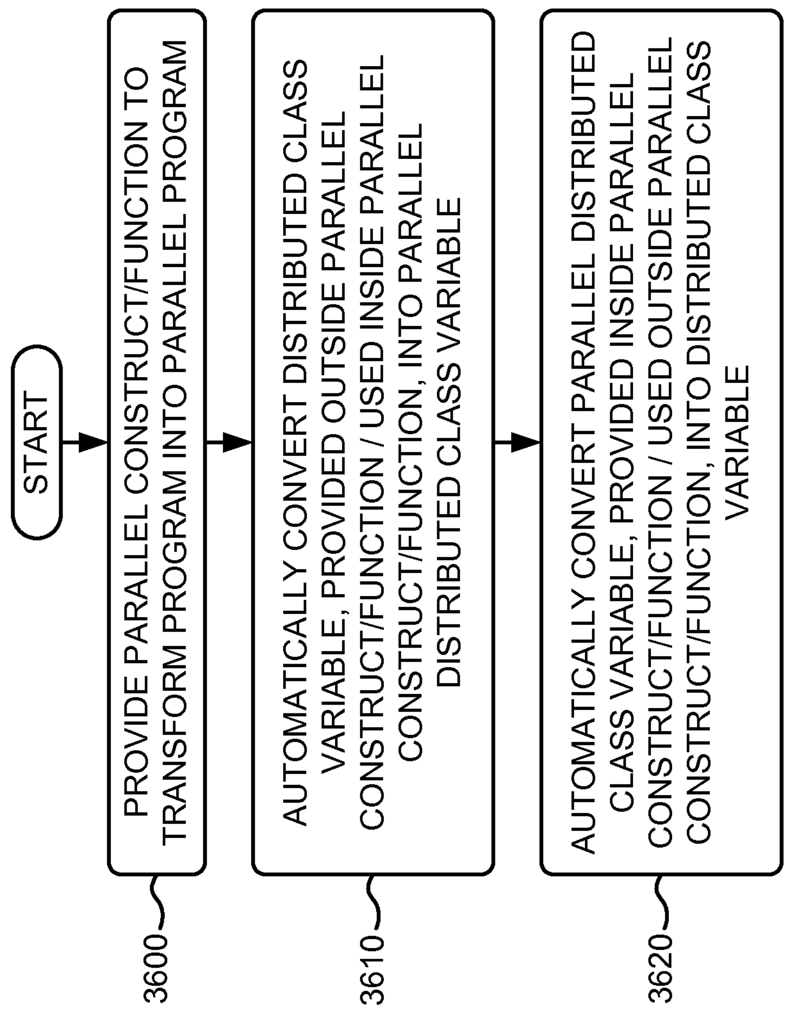
FIG. 36
2940
START
3600
PROVIDE PARALLEL CONSTRUCT/FUNCTION TO TRANSFORM PROGRAM INTO PARALLEL PROGRAM
3610
AUTOMATICALLY CONVERT DISTRIBUTED CLASS VARIABLE, PROVIDED OUTSIDE PARALLEL CONSTRUCT/FUNCTION / USED INSIDE PARALLEL CONSTRUCT/FUNCTION, INTO PARALLEL DISTRIBUTED CLASS VARIABLE
3620
AUTOMATICALLY CONVERT PARALLEL DISTRIBUTED CLASS VARIABLE, PROVIDED INSIDE PARALLEL CONSTRUCT/FUNCTION / USED OUTSIDE PARALLEL CONSTRUCT/FUNCTION, INTO DISTRIBUTED CLASS VARIABLE

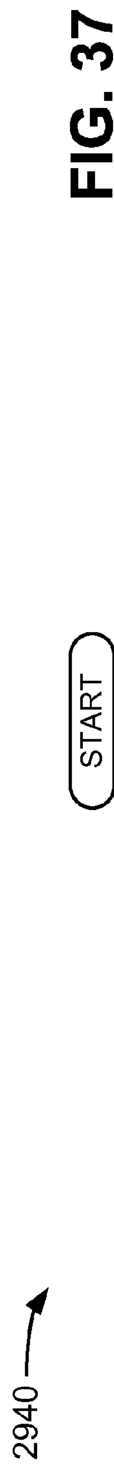
FIG. 37
2940
START
3700
PROVIDE PARALLEL CONSTRUCT/FUNCTION TO TRANSFORM PROGRAM INTO PARALLEL PROGRAM
3710
PROVIDE DISTRIBUTED CLASS OBJECT OUTSIDE PARALLEL CONSTRUCT/FUNCTION
3720
MIX DISTRIBUTED CLASS OBJECT PROVIDED OUTSIDE PARALLEL CONSTRUCT/FUNCTION WITH PARALLEL DISTRIBUTED CLASS OBJECT WHEN DISTRIBUTED CLASS OBJECT/PARALLEL DISTRIBUTED CLASS OBJECT IN SAME CONTEXT
3730
PROVIDE PARALLEL DISTRIBUTED CLASS OBJECT INSIDE PARALLEL CONSTRUCT/FUNCTION
3740
MIX PARALLEL DISTRIBUTED CLASS OBJECT PROVIDED INSIDE PARALLEL CONSTRUCT/FUNCTION WITH DISTRIBUTED CLASS OBJECT WHEN PARALLEL DISTRIBUTED CLASS OBJECT/DISTRIBUTED CLASS OBJECT IN SAME CONTEXT 2940
START
GENERATE DISTRIBUTED CONSTRUCTOR
3800
PROVIDE DATA INSIDE DISTRIBUTED ARRAY AS FIRST ARGUMENT OF DISTRIBUTED CONSTRUCTOR
3810
PROVIDE DISTRIBUTOR CLASS OBJECT AS SECOND ARGUMENT OF DISTRIBUTED CONSTRUCTOR
3820
PROVIDE LAB INDEX AS THIRD ARGUMENT OF DISTRIBUTED CONSTRUCTOR
3830
PROVIDE STRING CONVERSION AS FOURTH ARGUMENT OF DISTRIBUTED CONSTRUCTOR
3840

2940

2940/2950

2940
START
RECEIVE FIRST USER-DEFINED DISTRIBUTION SCHEME FOR PROGRAM
4500
RECEIVE SECOND USER-DEFINED DISTRIBUTION SCHEME FOR PROGRAM
4510
REDISTRIBUTE DISTRIBUTED ARRAYS, ASSOCIATED WITH FIRST / SECOND USER-DEFINED DISTRIBUTION SCHEMES, INTO COMMON DISTRIBUTION SCHEME
4520
REDISTRIBUTE COMMON DISTRIBUTION SCHEME TO TARGET DISTRIBUTION SCHEME
4530

PERFORMING PARALLEL PROCESSING OF DISTRIBUTED ARRAYS

RELATED APPLICATIONS

This application is a continuation of U.S. patent application Ser. No. 12/254,605, filed Oct. 20, 2008, which is a continuation-in-part of U.S. patent application Ser. No. 11/748,938, filed May 15, 2007, now U.S. Pat. No. 8,010,954, issued Aug. 30, 2011, which is a continuation-in-part of U.S. patent application Ser. No. 11/706,805, filed Feb. 14, 2007, now U.S. Pat. No. 7,975,001, issued Jul. 5, 2011. U.S. patent application Ser. No. 12/254,605 is also a continuation-in-part of U.S. patent application Ser. No. 11/748,947, filed May 15, 2007, now U.S. Pat. No. 8,108,845, issued Jan. 31, 2012, which is a continuation-in-part of U.S. patent application Ser. No. 11/706,805, filed Feb. 14, 2007, now U.S. Pat. No. 7,975,001, issued Jul. 5, 2011. U.S. patent application Ser. No. 12/254,605 further claims priority under 35 U.S.C. §119 based on U.S. Provisional Patent Application Nos. 61/054,292 and 61/054,295, filed May 19, 2008. The entire contents of U.S. patent application Ser. Nos. 11/748,938, 11/748,947, 11/706,805, and 12/254,605 and U.S. Provisional Patent Application Nos. 61/054,292 and 61/054,295 are hereby incorporated by reference.

BACKGROUND

Closely-coupled processors or hardware resources will likely become widely available within the near future. Examples of such closely-coupled processors (or hardware resources) may include additional processors, threads in a particular processor, additional cores in a central processing unit, additional processors mounted on the same substrate or board, and/or such devices provided within computers connected by a network fabric into a cluster, a grid, or a collection of resources.

Certain computations (e.g., parallel processing or parallel programming) may benefit from the availability of such hardware resources. For example, a complex simulation may run faster if the simulation is divided into portions and the portions are simultaneously run on a number of processing devices in a parallel fashion. Parallel computing arrangements may include a controller that determines how an application should be divided and what application portions go to which parallel processors. For example, a host computer that is running a simulation may act as the controller for a number of parallel processors. Parallel processors may receive instructions and/or data from the controller and may return a result to the controller.

An array is a data structure consisting of a group of elements that are accessed by indexing. An array may include any number of dimensions containing numeric, character, logical values, cells, or structures. An array may be partitioned into segments to create a distributed array. However, current architectures do not utilize a single language presentation for parallel processing of distributed arrays. Rather, current architectures may process distributed arrays exclusively in parallel or exclusively in sequential manner.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 13 depicts an exemplary diagram of distribution scheme commands capable of being provided by the client illustrated in FIGS. 5A-5C, where the distribution scheme commands may provide conversions between distributor objects and parallel distributor objects;

FIG. 14 illustrates an exemplary diagram of distribution scheme commands capable of being provided by the client depicted in FIGS. 5A-5C, where the distribution scheme commands may convert a distributor object into a specific distributions scheme object;

FIG. 17 depicts an exemplary diagram of distributed array commands capable of being provided by the client illustrated in FIGS. 5A-5C, where the distributed array commands may convert a remote object into a non-remote object;

FIG. 22 illustrates an exemplary diagram of a data placement policy for distribution scheme and/or distributed array commands capable of being provided by the client depicted in FIGS. 5A-5C;

FIG. 24 illustrates an exemplary diagram of distribution scheme and/or distributed array commands capable of being provided by the client depicted in FIGS. 5A-5C, and transferring distributed arrays and associated distributor objects;

FIG. 26 illustrates an exemplary diagram of distribution scheme and/or distributed array commands capable of being provided by the client depicted in FIGS. 5A-5C, where the distribution scheme and/or distributed array commands may generate an error to prevent parallel error signaling;

FIG. 27 depicts an exemplary diagram of distribution scheme and/or distributed array commands capable of being provided by the client illustrated in FIGS. 5A-5C, where the distribution scheme and/or distributed array commands may reduce a remote call outside a parallel processing construct;

FIGS. 29-45 depict flow charts associated with an exemplary process according to implementations described herein.

DETAILED DESCRIPTION

Figure 1:
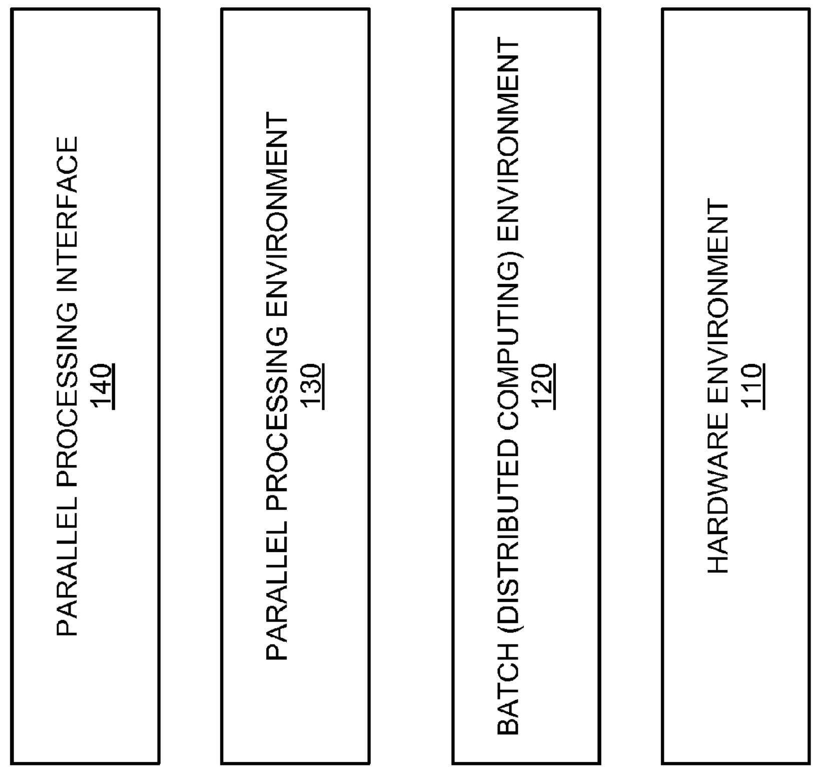
FIG. 1 depicts an exemplary diagram of an architectural overview in which implementations described herein may be practiced.

The following detailed description refers to the accompanying drawings. The same reference numbers in different drawings may identify the same or similar elements. Also, the following detailed description does not limit the invention.

Overview

Implementations described herein may include systems and/or methods for providing a single programming language presentation of distributed arrays. For example, in one implementation, the systems and/or methods may initiate a single programming language, and may identify, via the single programming language, one or more data distribution schemes for executing a program. The systems and/or methods also may transform, via the single programming language, the program into a parallel program with an optimum data distribution scheme selected from the one or more identified data distribution schemes, and may allocate one or more portions of the parallel program to two or more labs for parallel execution. The systems and/or methods may further receive one or more results associated with the parallel execution of the one or more portions from the two or more labs, and may provide the one or more results to the program.

A lab may include hardware, software, and/or combination of hardware and software that performs and/or participates in parallel processing activities. For example, a lab may perform and/or participate in parallel processing activities in response to a request and/or a task received from a client. In one example, a lab may be implemented as a software unit of execution and/or a hardware unit of execution. A lab may perform and/or participate in substantially any type of parallel processing (e.g., task, data, and/or stream processing). In one example, a lab may perform and/or participate in parallel processing activities in response to a receipt of a program or one or more portions of the program. A lab may support one or more threads (or processes) when performing processing operations.

Parallel processing may include any type of processing that can be distributed across two or more resources (e.g., software units of execution, hardware units of execution, processors, microprocessors, clusters, labs, etc.) and be performed at substantially the same time. For example, in one implementation, parallel processing may refer to task parallel processing where a number of tasks are processed at substantially the same time on a number of software units of execution. In task parallel processing, each task may be processed independently of other tasks executing at the same time (e.g., a first software unit of execution executing a first task may not communicate with a second software unit of execution executing a second task). In another implementation, parallel processing may refer to data parallel processing, where data (e.g., a data set) is parsed into a number of portions that are executed in parallel using two or more software units of execution. In data parallel processing, the software units of execution and/or the data portions may communicate with each other as processing progresses.

In still another implementation, parallel processing may refer to stream parallel processing (also referred to as pipeline parallel processing). Stream parallel processing may use a number of software units of execution arranged in series (e.g., a line) where a first software unit of execution produces a first result that is fed to a second software unit of execution that produces a second result. Stream parallel processing may also include a state where task allocation may be expressed in a directed acyclic graph (DAG) or a cyclic graph with delays. Other implementations may combine two or more of task, data, or stream parallel processing techniques alone or with other types of processing techniques to form hybrid-parallel processing techniques.

A parallel processing environment may include any environment capable of performing parallel processing. For example, a parallel processing environment may include a dynamic number of processes provided on one or more hardware, software, and/or a combination of hardware and software units of execution which may have several different control and data passing layers through which a current behavior of a part or a whole of the environment may be specified. In one implementation, a front-end application (e.g., a parallel processing interface) may interface with the parallel processing environment to provide one or more users with access to the parallel processing environment. In another implementation, the processes involved in the parallel processing environment may include processes associated with a technical computing environment.

A technical computing environment (TCE) may include any hardware, software, and/or a combination of hardware and software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, a TCE may include a dynamically-typed programming language (e.g., the M language or MATLAB® language) that can be used to express problems and/or solutions in mathematical notations. For example, a TCE may use an array as a basic element, where the array may not require dimensioning. In addition, a TCE may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

A TCE may further provide mathematical functions and/or graphical tools (e.g., for creating plots, surfaces, images, volumetric representations, etc.). In one implementation, a TCE may provide these functions and/or tools using toolboxes (e.g., toolboxes for signal processing, image processing, data plotting, parallel processing, etc.). In another implementation, a TCE may provide these functions as block sets. In still another implementation, a TCE may provide these functions in another way, such as via a library, etc.

A TCE may be implemented as a text-based environment (e.g., MATLAB® software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.), a graphically-based environment (e.g., Simulink® software, Stateflow® software, SimEvents™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.), or another type of environment, such as a hybrid environment that includes one or more of the above-referenced text-based environments and one or more of the above-referenced graphically-based environments.

Exemplary Architectural Overview

FIG. 1 is an exemplary diagram of an architectural overview 100 in which implementations described herein may be practiced. As illustrated, overview 100 may include a hardware environment 110, a batch (or distributed computing) environment 120, a parallel processing environment 130, and/or a parallel processing interface 140.

Hardware environment 110 may include one or more hardware resources that may be used to perform parallel processing. For example, in one implementation, hardware environment 110 may include one or more hardware units of execution. Further details of hardware environment 110 are provided below in connection with FIG. 2.

Batch environment 120 may provide a distributed computing environment for a job. For example, in one implementation, batch (or distributed computing) environment 120 may include a client that provides a job to a scheduler. The scheduler may distribute the job into one or more tasks, and may provide the tasks to one or more hardware units of execution and/or one or more processors. The hardware units of execution and/or processors may execute the tasks, and may provide results to the scheduler. The scheduler may combine the results into a single result, and may provide the single result to the client. Further details of batch environment 120 are provided below in connection with FIG. 3.

Parallel processing environment 130 may provide parallel processing for a main program. For example, in one implementation, parallel processing environment 130 may include a technical computing environment that provides a main program to a controller. The controller may provide portions of the program to one or more software units of execution and/or one more labs. The software units of execution and/or labs may execute the program portions, and may provide results to the controller. The controller may combine the results into a single result, and may provide the single result to the technical computing environment. Further details of parallel processing environment 130 are provided below in connection with FIG. 4.

Parallel processing interface 140 may include a front-end application (e.g., an application program interface (API)) that provides an interface for dynamically accessing, controlling, utilizing, etc. hardware environment 110, batch environment 120, and/or parallel processing environment 130. For example, in one implementation, parallel processing interface 140 may include parallel processing constructs that permit users to express specific parallel workflows. In such an implementation, parallel processing interface 140 may include a program provider that provides a main program to analysis logic. The analysis logic may analyze the main program, may parse the main program into program portions, and may provide the program portions to resource allocation logic. The resource allocation logic may allocate the program portions to one or more software units of execution and/or hardware units of execution. The program portions may be executed, and results may be provided to the program provider. In another implementation, parallel processing interface 140 may include an object API where a user may specify how a program may be parallelized. Further details of parallel processing interface 140 are provided below in connection with FIGS. 5A-5C.

Although FIG. 1 shows exemplary components of architectural overview 100, in other implementations, architectural overview 100 may contain fewer, different, or additional components than depicted in FIG. 1.

Exemplary Hardware Environment

Figure 2:
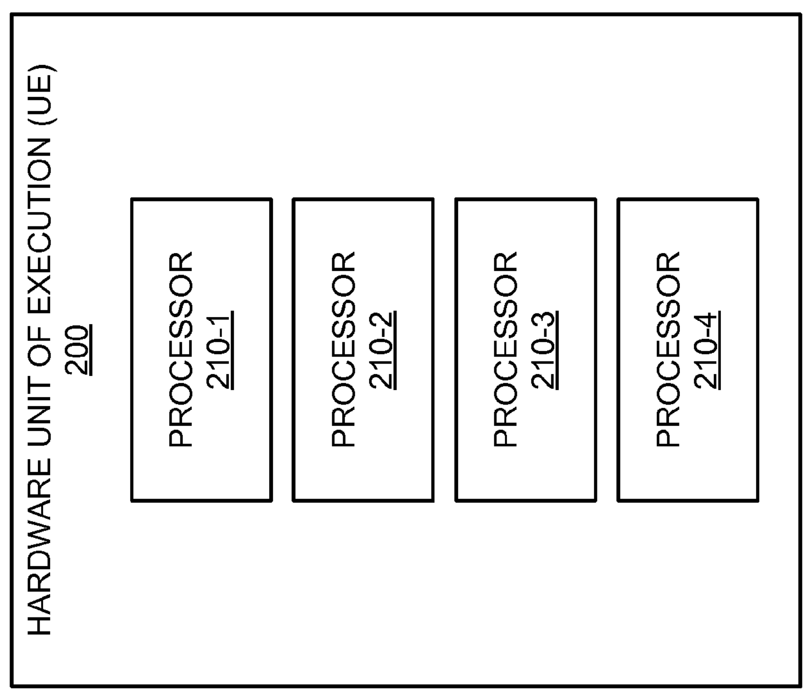
FIG. 2 illustrates an exemplary diagram of a hardware environment depicted in FIG. 1.

FIG. 2 is an exemplary diagram of hardware environment 110. As illustrated, hardware environment 110 may include a hardware unit of execution (UE) 200 with one or more processors 210-1, 210-2, 210-3, 210-4 (collectively, "processors 210").

A hardware unit of execution may include a device (e.g., a hardware resource) that performs and/or participates in parallel processing activities. For example, a hardware unit of execution may perform and/or participate in parallel processing activities in response to a request and/or a task received from a client. A hardware unit of execution may perform and/or participate in substantially any type of parallel processing (e.g., task, data, and/or stream processing) using one or more devices. For example, in one implementation, a hardware unit of execution may include a single processor that includes multiple cores and in another implementation, the hardware unit of execution may include a number of processors. Devices used in a hardware unit of execution may be arranged in substantially any configuration (or topology), such as a grid, ring, star, etc. A hardware unit of execution may support one or more threads (or processes) when performing processing operations.

In one implementation, hardware UE 200 may perform parallel processing activities on behalf of another device. In another implementation, hardware UE 200 may perform parallel processing activities on behalf of itself or on behalf of a host of which hardware UE 200 is a part. Hardware UE 200 may perform parallel processing in a variety of ways. For example, hardware UE 200 may perform parallel processing activities related to task parallel processing, data parallel processing, stream parallel processing, etc. Hardware UE 200 may perform parallel processing using processing devices resident on UE 200 and/or using processing devices that are remote with respect to UE 200.

As further shown in FIG. 2, hardware UE 200 may include processors 210-1, 210-2, 210-3, and 210-4. Processors 210 may include hardware, software, and/or a combination of hardware and software based logic that performs processing operations. Processors 210 may include substantially any type of processing device, such as a central processing unit (CPU), a microprocessor, a field programmable gate array (FPGA), an application specific integrated circuit (ASIC), a micro electrical mechanical switch (MEMS), a general purpose graphical processing unit (GPGPU), an optical processor, etc. In one implementation, each processor 210-1 through 210-4 may include a single core processor or a multi-core processor. In another implementation, each processor 210-1 through 210-4 may include a single processing device or a group of processing devices, such as a processor cluster or a computing grid. In still another implementation, each processor 210-1 through 210-4 may include multiple processors that may be local or remote with respect each other, and may use one or more threads while processing. In a further implementation, each processor 210-1 through 210-4 may represent a single hardware UE.

Although FIG. 2 shows exemplary components of hardware environment 110, in other implementations, hardware environment 110 may contain fewer, different, or additional components than depicted in FIG. 2. For example, in one implementation, hardware environment 110 may include one or more of a bus, a main memory, a read-only memory (ROM), a storage device, an input device, an output device, and/or a communication interface. In still other implementations, one or more components of hardware environment 110 may perform one or more other tasks described as being performed by one or more other components of hardware environment 110.

Exemplary Batch Environment

Figure 3:
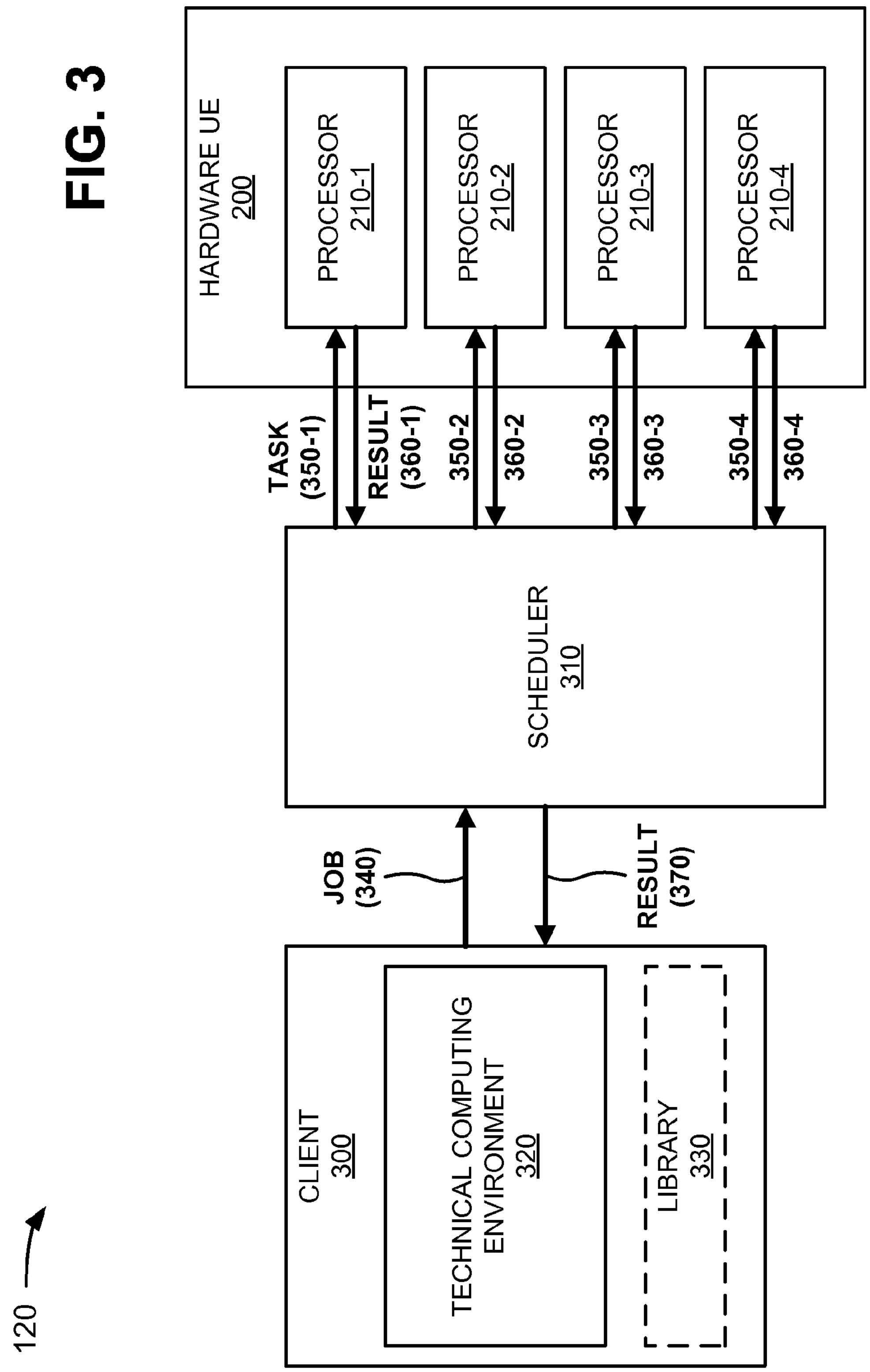
FIG. 3 depicts an exemplary diagram of a batch (or distributed computing) environment illustrated in FIG. 1.

FIG. 3 is an exemplary diagram of batch environment 120. As illustrated, batch environment 120 may include a client 300, a scheduler 310, and hardware UE 200 (including processors 210). Hardware UE 200 and processors 210 may perform the same or similar tasks as described above in connection with FIG. 2.

Client 300 may include one or more entities. An entity may be defined as a device, such as a personal computer, a personal digital assistant (PDA), a laptop, or another type of computation or communication device, a thread or process running on one of these devices, and/or an object executable by one of these devices. In an exemplary implementation, client 300 may include a device capable of sending information to, or receiving information from, another device, such as hardware UE 200. As shown in FIG. 3, client 300 may include a technical computing environment (TCE) 320 and a library 330. Other implementations of client 300 may contain fewer, different, or additional components than depicted in FIG. 3.

Technical computing environment (TCE) 320 may include any of the features described above with respect to the term "technical computing environment."

Library 330 may include hardware, software, and/or a combination of hardware and software based logic that may operate with TCE 320 to perform certain operations. For example, in one implementation, library 330 may store functions to perform certain operations (e.g., signal processing, image processing, parallel processing, data display, etc.) in a text-based environment. In another implementation, library 140 may store graphical representations (e.g., blocks, icons, images, etc.) to perform certain operations in a graphically-based environment (e.g., a gain block, a source block, a filter block, a discrete event generator block, etc.).

Scheduler 310 may include hardware, software, and/or a combination of hardware and software based logic to perform scheduling operations on behalf of a device (e.g., client 300). For example, scheduler 310 may perform operations to select and/or control parallel processing activities performed by hardware UE 200 on behalf of client 300. In one implementation, scheduler 310 may receive a job 340, and may distribute or divide job 340 into tasks (e.g., tasks 350-1, 350-2, 350-3, and 350-4). Scheduler 310 may send tasks 350-1, 350-2, 350-3, and 350-4 to hardware UE 200 (e.g., to processor 210-1, 210-2, 210-3, and 210-4, respectively) for execution. Scheduler 310 may receive results from hardware UE 200 (e.g., results 360-1, 360-2, 360-3, and 360-4), may assemble the results into a single result 370, and may provide result 370 to client 300. Scheduler 310 may reside locally on client 300 or may be located remotely with respect to client 300 depending on particular implementations described herein.

Although FIG. 3 shows exemplary components of batch environment 120, in other implementations, batch environment 120 may contain fewer, different, or additional components than depicted in FIG. 3. In still other implementations, one or more components of batch environment 120 may perform one or more other tasks described as being performed by one or more other components of batch environment 120.

Exemplary Parallel Processing Environment

Figure 4:
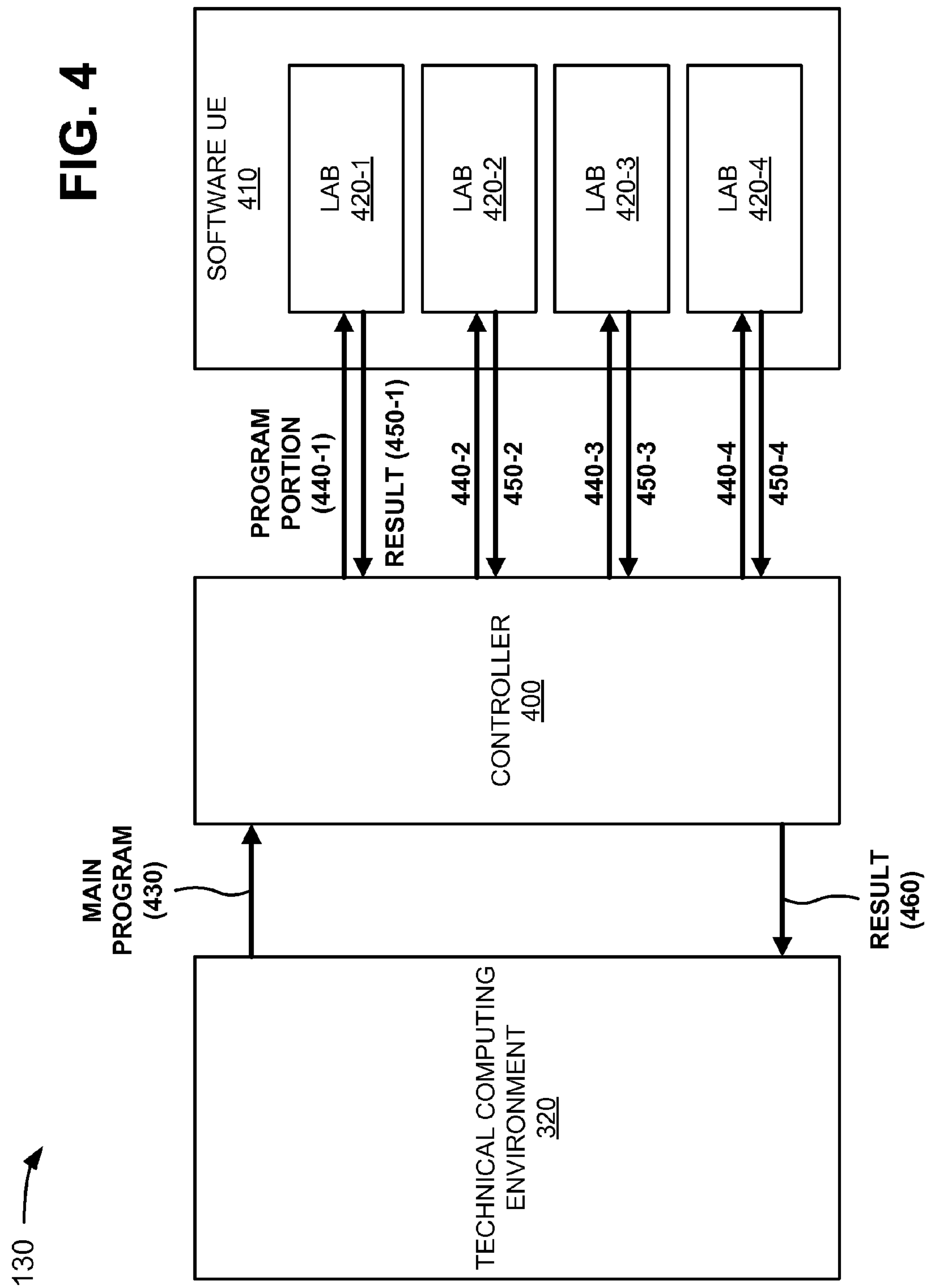
FIG. 4 illustrates an exemplary diagram of a parallel processing environment depicted in FIG. 1.

FIG. 4 is an exemplary diagram of parallel processing environment 130. As illustrated, parallel processing environment 130 may include technical computing environment 320, a controller 400, and a software unit of execution (UE) 410. Technical computing environment 320 may include any of the features described above with respect to the term "technical computing environment."

Controller 400 may include hardware, software, and/or a combination of hardware and software based logic to perform controlling operations on behalf of a program. For example, in one implementation, controller 400 may select and/or control parallel processing activities performed by software UE 410 on behalf of technical computing environment 320.

A software unit of execution may include a software resource (e.g., a worker, a lab, etc.) that performs and/or participates in parallel processing activities. For example, a software unit of execution may perform and/or participate in parallel processing activities in response to receipt of a program and/or one or more portions of the program. A software unit of execution may perform and/or participate in substantially any type of parallel processing using one or more hardware units of execution. A software unit of execution may support one or more threads (or processes) when performing processing operations.

In one implementation, software UE 410 may include one or more labs (e.g., labs 420-1, 420-2, 420-3, and 420-3, collectively referred to as "labs 420"). Labs 420 may include any of the features described above with respect to the term "lab." In one implementation, a lab may be similar to a software unit of execution, except on a smaller scale. In other implementations, a lab may represent a single software unit of execution.

In an exemplary operation, technical computing environment 320 may provide a main program 430 to controller 400. Controller 400 may provide portions of program 430 (e.g., program portions 440-1, 440-2, 440-3, and 440-4, collectively referred to as "program portions 440") to labs 420-1, 420-2, 420-3, and 420-4, respectively, to software UE 410. Labs 420 may execute program portions 440, and may provide results to controller 400. For example, lab 420-1 may provide a result 450-1 to controller 400, lab 420-2 may provide a result 450-2 to controller 400, lab 420-3 may provide a result 450-3 to controller 400, and lab 420-4 may provide a result 450-4 to controller 400. Controller 400 may combine the results into a single result 460, and may provide single result 460 to technical computing environment 320.

Although FIG. 4 shows exemplary components of parallel processing environment 130, in other implementations, parallel processing environment 130 may contain fewer, different, or additional components than depicted in FIG. 4. In still other implementations, one or more components of parallel processing environment 130 may perform one or more other tasks described as being performed by one or more other components of parallel processing environment 130.

Exemplary Parallel Processing Interfaces

Figure 5A:
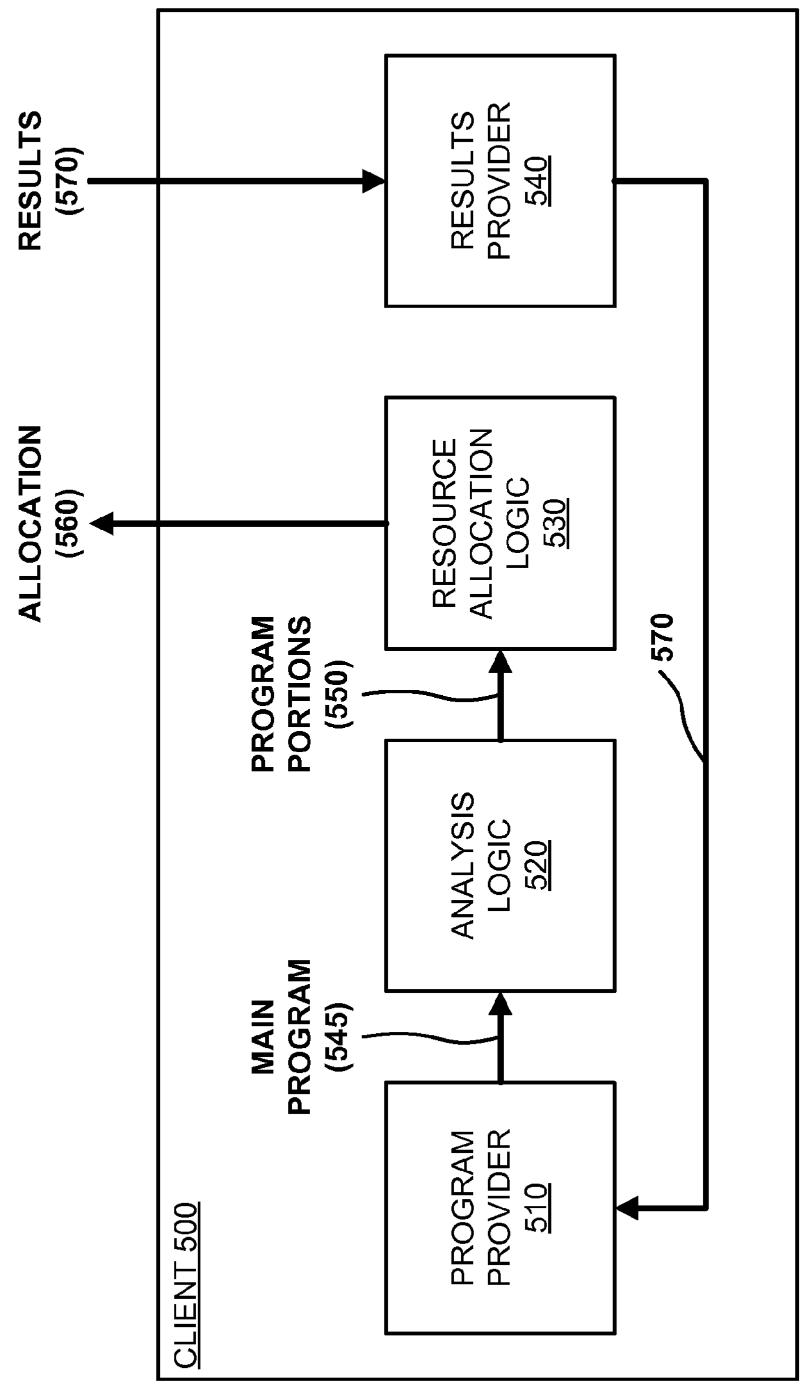
FIG. 5A depicts an exemplary diagram of functional components of a parallel processing interface illustrated in FIG. 1.

FIG. 5A is an exemplary diagram of functional components of parallel processing interface 140. As illustrated, parallel processing interface may include a client 500 that includes a variety of functional components, such as a program provider 510, analysis logic 520, resource allocation logic 530, and/or a results provider 540.

Client 500 may include one or more entities. An entity may be defined as a device, such as a personal computer, a personal digital assistant (PDA), a laptop, or another type of computation or communication device, a thread or process running on one of these devices, and/or an object executable by one of these devices. In an exemplary implementation, client 500 may include a device capable of providing a parallel processing interface, as described herein. Other implementations of client 500 may contain fewer, different, or additional components than depicted in FIG. 5. For example, although not shown in FIG. 5A, client 500 may include a technical computing environment (e.g., TCE 320) and a library (e.g., library 330).

Program provider 510 may include hardware, software, and/or a combination of hardware and software based logic that provides one or more programs for execution. For example, in one implementation, program provider 510 may generate programs created using a technical computing environment, as defined above. As shown in FIG. 5, program provider 510 may provide a main program 545 to analysis logic 520.

Analysis logic 520 may receive main program 545, and may include hardware, software, and/or a combination of hardware and software based logic that analyzes main program 545 and parses main program 545 into one or more program portions 550. In one implementation, analysis logic 520 may include language constructs (as described herein) that parse main program 545 into one or more program portions 550. As shown in FIG. 5, analysis logic 520 may provide program portions 550 to resource allocation logic 530. Further details of analysis logic 520 are provided below.

Resource allocation logic 530 may receive program portions 550, and may include hardware, software, and/or a combination of hardware and software based logic that dynamically allocates (as indicated by reference number 560) program portions 550 to one or more software UEs (e.g., software UE 410) for parallel execution. Although not shown in FIG. 5A, allocation 560 may be provided to one or more software UEs, and the software UEs may be executed by one or more hardware UEs (e.g., hardware UE 200) in a parallel processing manner. Alternatively and/or additionally, if no external resources (e.g., external software UEs or external hardware UEs) are available, allocation 560 may be executed via software UEs and/or hardware UEs of client 500. The software UEs may return results 570 of the execution of program portions 550 to results provider 540.

Results provider 540 may include hardware, software, and/or a combination of hardware and software based logic that receives results 570 from the software UEs, and provides results 570 to program provider 510. In one implementation, results provider 540 may combine results 570 into a single result, and may provide the single result to program provider 510.

Client 500 (e.g., via analysis logic 520) may use different control and data passing layers through which it may specify the current behavior of a part or a whole of the parallel processing interface 140. For example, in one implementation, client 500 may use a message passing interface (MPI), a Transmission Control Protocol/Internet Protocol (TCP/IP), an Ethernet protocol, and/or other interconnects and protocols for the control and data passing layers. In another implementation, client 500 may implement an MPI layer (and/or other data and control layers) on any standard non-guaranteed stream protocol. In still another implementation, client 500 may use two different layers, a cooperative communication layer (e.g., where processes may need to agree that a particular type of message is being sent) and an imperative communication layer or control layer (e.g., that may send unexpected messages to a recipient and may request the recipient to undertake an instruction contained in the message).

Client 500 (e.g., via analysis logic 520) may define a sub-group behavior for each of program portions 550. A sub-group may include any part of the overall set of processes (e.g., main program 545 and/or program portions 550). For example, the sub-group behavior may relate to the parallel processing styles that may be employed on the group of program portions 550. However, client 500 may dynamically change the behavior of one or more of program portions 550 as code is executed for other program portions 550. In one implementation, client 500 may use the control layer to change the current state of a sub-group at any time, which may dynamically change the behavior of that portion of the group. For example, an application (e.g., main program 545) may include different phases (e.g., an input phase, an analysis phase, an output phase, etc.), and parallel processing needs may be different for each phase.

In one implementation, the sub-group behavior may include an unused state (e.g., the initial state of a process when it is not being used), a user-controlled UE state (e.g., if a user has acquired a process as a UE object), a task parallel state (e.g., an execution state used by parallel processing constructs), a single program, multiple data (SPMD) state (e.g., one or more processes may have a MPI ring between them with appropriate values for rank and size), a stream state (e.g., a state where task allocation may be expressed in a directed acyclic graph (DAG) or a cyclic graph with delays), etc. Each of program portions 550 may be in one of the above-mentioned states, and may request other tasks to be placed in a new state.

The sub-group behavior may include a variety of other states. For example, the sub-group behavior may include a delayed debugging state where a task may be executed and delayed in time with respect to another task (or delayed in lines of code). A delayed debugging state may permit a breakpoint to be created for one task if another task experiences an error, and may enable a user to see why an error occurred. In another example, the sub-group behavior may include a release differences state that may execute one or more tasks associated with different releases of a product (e.g., different releases of TCE 320). This may permit behavior differences to be found between different releases of a product, and may permit users to undertake release compatibility studies.

In one implementation, some state information may be consistent across client 500. For example, a source of code may come from one device (e.g., client 500), and a file system associated with the source device may be used across client 500. In another implementation, some state information may be consistent across a sub-group of client 500 (e.g., labindex, numlabs, etc.).

In another implementation, the state information may be automatically transferred from client 500 to software unit of execution 410 and/or labs 420. For example, if a path is added to a technical computing environment (e.g., TCE 320) of client 500, the path may be automatically added to all TCEs in the parallel environment (e.g., TCEs provided in labs 420). If the TCE of client 500 is instructed to reanalyze a piece of code (e.g., because a program changed), then all of the TCEs in the parallel environment may be instructed to reanalyze the piece of code for a sub-group, this may be similar to changing a parallel random number seed, or possibly clearing a particular workspace (e.g., one of labs 420) to ensure clean evaluation of a program.

In still another implementation, client 500 may be interactive in that resource allocation logic 530 may permit a user to dynamically control a current setup (e.g., via scripts, functions, command lines, etc.). Thus, client 500 and its configuration may change based on an actual analysis that the user may be currently undertaking. In another implementation, resource allocation logic 530 may be connected to one or more clusters of software UEs 410 and may use processes derived from each of the clusters, as well as client 500, to form the functional components of client 500. In still another implementation, client 500 may include devices having different architectures and/or operating systems (i.e., client 500 may execute across multiple platforms). For example, client 500 may include a different architecture and/or operating system other than software UE 410.

In one exemplary implementation, main program 545 may be submitted in batch manner to a cluster (e.g., a cluster of software UEs 410 and/or a cluster of labs 420). For example, a user may interactively develop main program 545, and may save main program 545 in a file (e.g., an M file). A command may exist in main program 545 (e.g., in the M file) that may cause one lab (e.g., one of labs 420) in the cluster to act as a client where the execution of main program 545 initiates. Main program 545, for example, may use four labs 420 and a client (e.g., one of labs 420 acting as a client), may initiate on the client, and may utilize as many labs 420 as necessary to carry out execution. In another example, a special type of job may be created that creates a pool (or cluster) of labs, where one of the initiated processes of the job may act as the client, and rest of processes may be in the pool.

Figure 5B:
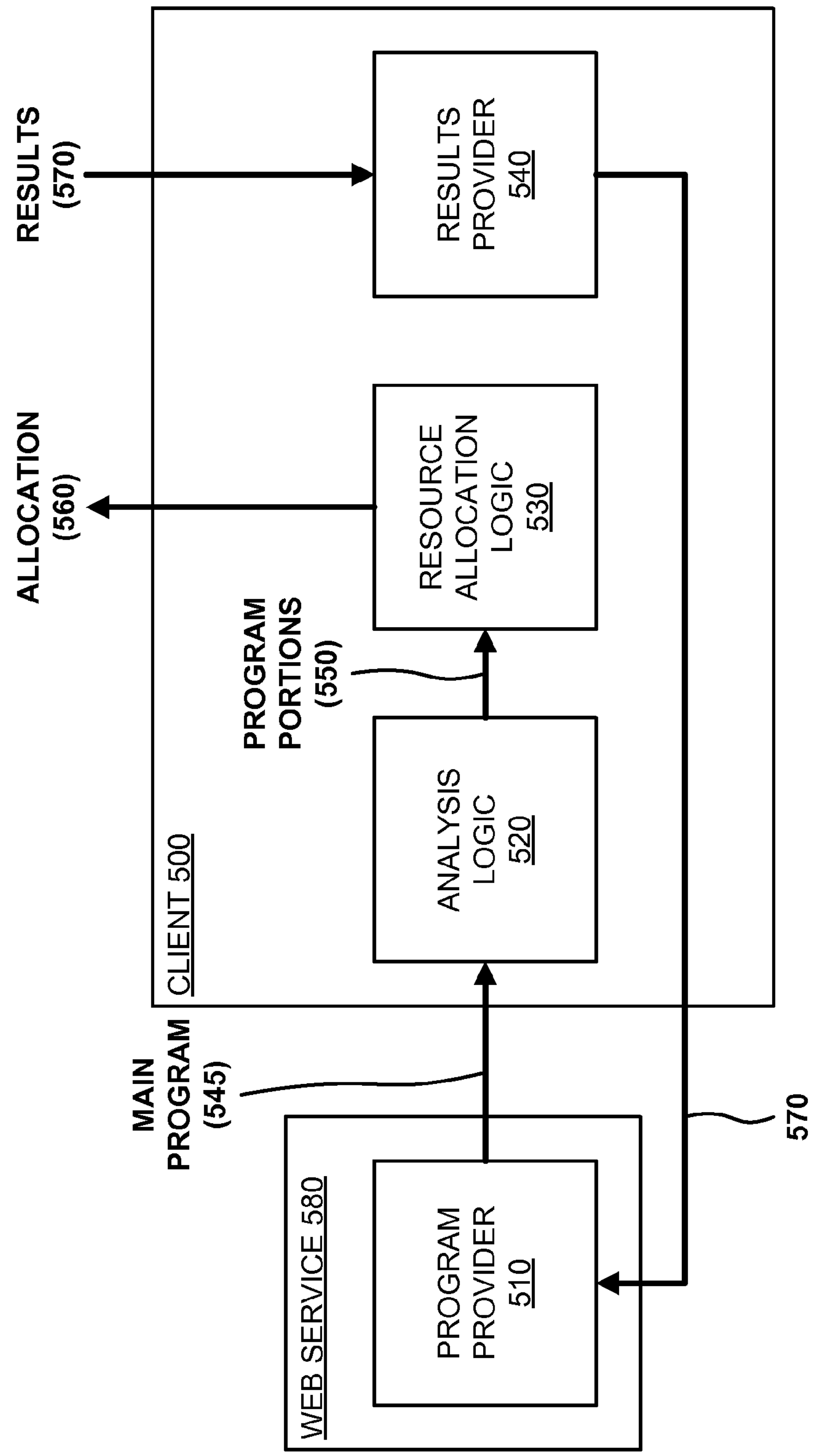
FIG. 5B illustrates an exemplary diagram of functional components of the parallel processing interface in an alternative arrangement.

FIG. 5B is an exemplary diagram of functional components of parallel processing interface 140 in an alternative arrangement. The alternative arrangement depicted in FIG. 5B is the same as the arrangement of FIG. 5A, except that program provider 510 may be included in a web service 580, while analysis logic 520, resource allocation logic 530, and results provider 540 may be include in client 500. Program provider 510, analysis logic 520, resource allocation logic, and/or results provider 540 may operate in the manner as described above in connection with FIG. 5A.

Web service 580 may provide access to one or more programs (e.g., main program 545 provided by program provider 510, applications accessed by main program 545, etc.). A web service may include any software application that allows machine-to-machine communications over a network (e.g., a local area network (LAN), a metropolitan area network (MAN), a wide area network (WAN), such as the Internet, etc.). For example, a web service may communicate with a client (e.g., client 500) using an application program interface (API) that the client may access over the network. The web service may exchange Hypertext Markup Language (HTML), Extensible Markup Language (XML), or other types of messages with the client using industry compatible standards (e.g., simple object access protocol (SOAP)) and/or proprietary standards. A web service may further include network services that can be described using industry standard specifications, such as web service definition language (WSDL) and/or proprietary specifications.

In one exemplary implementation, web service 580 may allow a destination (e.g., a computer operated by a customer) to perform parallel processing using hardware, software, and/or a combination of hardware and software UEs that may be operated by a service provider (e.g., client 500). For example, the customer may be permitted access to client 500 to perform parallel processing if the customer subscribes to one of the offered web services. The service provider may maintain a database that includes parameters, such as parameters that indicate the status of hardware UEs, software UEs, etc. The service provider may perform a look-up operation in the database if a request for parallel processing is received from the customer. The service provider may connect the customer to parallel processing resources that are available based on parameters in the database.

In another exemplary implementation, the customer may receive web service 580 on a subscription basis. A subscription may include substantially any type of arrangement, such as monthly subscription, a per-use fee, a fee based on an amount of information exchanged between the service provider and the customer, a fee based on a number of processor cycles used by the customer, a fee based on a number of hardware UEs, software UEs, etc., used by the customer, etc.

Figure 5C:
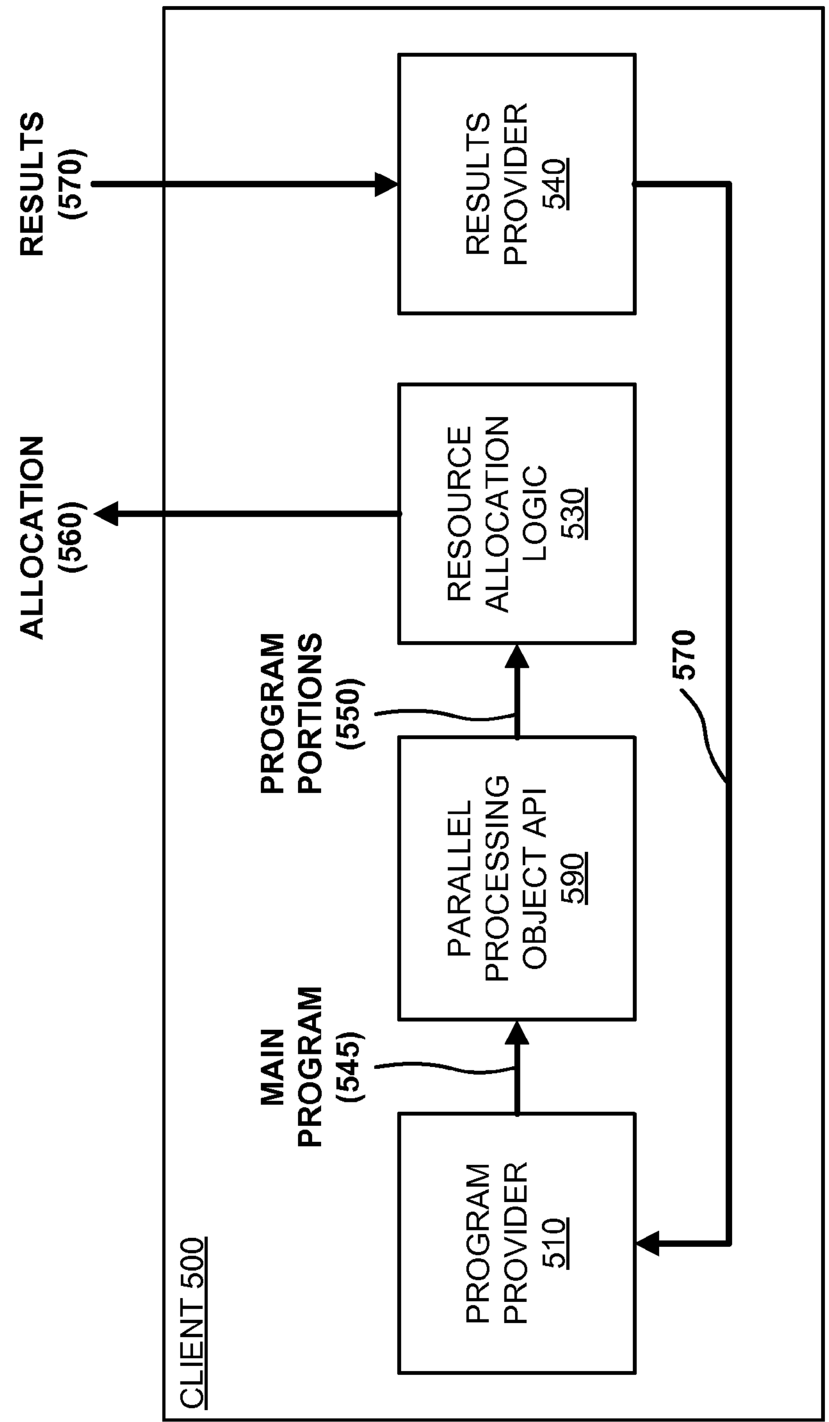
FIG. 5C depicts an exemplary diagram of functional components of the parallel processing interface in another alternative arrangement.

FIG. 5C is an exemplary diagram of functional components of parallel processing interface 140 in another alternative arrangement. The alternative arrangement depicted in FIG. 5C is the same as the arrangement of FIG. 5A, except that analysis logic 520 may be replaced with a parallel processing object API 590. Program provider 510, resource allocation logic 530, and/or results provider 540 may operate in the manner as described above in connection with FIG. 5A.

Parallel processing object API 590 may permit a user to specify how main program 545 may be parallelized. Parallel processing object API 590 may cooperate with resource allocation logic 530 and/or an execution mechanism (e.g., software UEs 420) in a similar manner that analysis logic 520 cooperates with these components. However, parallel processing API 590 may offer much more flexibility and/or customization than analysis logic 520.

Parallel processing API 590 (e.g., a code-based interface) may define and implement an object in a technical computing environment (e.g., TCE 320) that corresponds to another one or more (or set of) executing technical computing environments. Parallel processing API 590 may permit customizable parallelism of a program (e.g., main program 545), and may be nested in other calls or function (e.g., in the parallel processing constructs described herein). Parallel processing API 590 may be used by other calls as inputs to a calling function so that identification of which labs (e.g., labs 420) to use may be known. In one implementation, parallel processing API 590 may be used to provide or initiate a single programming language presentation of distributed arrays, as described herein. For example, in one implementation, parallel processing API 590 may be called a MATLAB® unit of execution (or MUE) API. The MUE API may define and implement an object in MATLAB® software that corresponds to another one or more of executing MATLAB® software applications. The MUE API may be used to permit one technical computing environment to communicate with and control another technical computing environment. The MUE API may be used to create groups of processes with certain behaviors (e.g., using the language constructs described herein).

Although FIGS. 5A-5C show exemplary functional components of parallel processing interface 140, in other implementations, parallel processing interface 140 may contain fewer, different, or additional functional components than depicted in FIGS. 5A-5C. In still other implementations, one or more functional components of parallel processing interface 140 may perform one or more other tasks described as being performed by one or more other functional components of parallel processing interface 140.

Exemplary Client/Web Service Architecture

Figure 6:
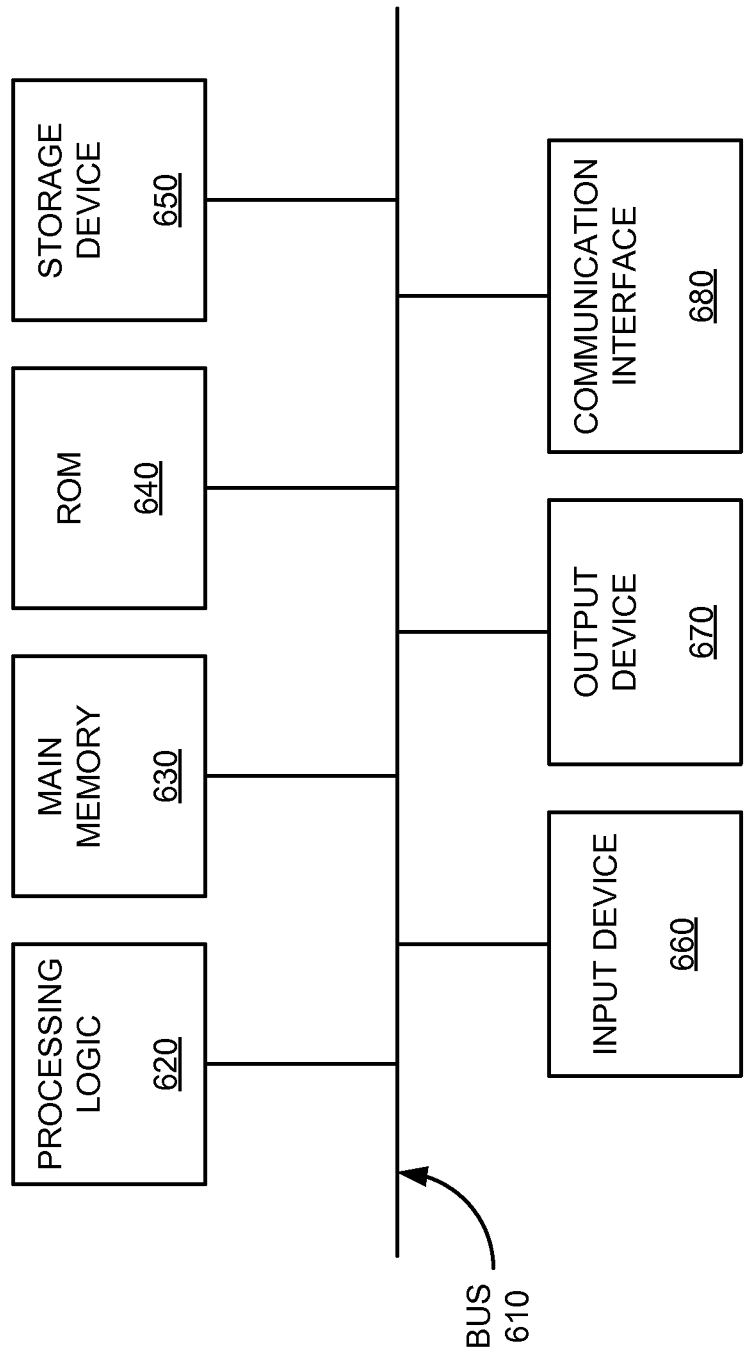
FIG. 6 illustrates exemplary hardware components of a client and/or a web service depicted in FIGS. 5A and 5B.

FIG. 6 is an exemplary diagram of an entity corresponding to client 500 and/or web service 580. As illustrated, the entity may include a bus 610, a processing unit 620, a main memory 630, a read-only memory (ROM) 640, a storage device 650, an input device 660, an output device 670, and/or a communication interface 680. Bus 610 may include a path that permits communication among the components of the entity.

Processing unit 620 may include a processor, microprocessor, or other types of processing logic that may interpret and execute instructions. In one implementation, processing unit 620 may include a single core processor or a multi-core processor. In another implementation, processing unit 620 may include a single processing device or a group of processing devices, such as a processor cluster or computing grid. In still another implementation, processing unit 620 may include multiple processors that may be local or remote with respect each other, and may use one or more threads while processing. In a further implementation, processing unit 620 may include multiple processors implemented as hardware UEs capable of running copies of a technical computing environment.

Main memory 630 may include a random access memory (RAM) or another type of dynamic storage device that may store information and instructions for execution by processing unit 620. ROM 640 may include a ROM device or another type of static storage device that may store static information and/or instructions for use by processing unit 620. Storage device 650 may include a magnetic and/or optical recording medium and its corresponding drive, or another type of static storage device (e.g., a disk drive) that may store static information and/or instructions for use by processing unit 620.

Input device 660 may include a mechanism that permits an operator to input information to the entity, such as a keyboard, a mouse, a pen, a microphone, voice recognition and/or biometric mechanisms, etc. Output device 670 may include a mechanism that outputs information to the operator, including a display, a printer, a speaker, etc. Communication interface 680 may include any transceiver-like mechanism that enables the entity to communicate with other devices and/or systems. For example, communication interface 680 may include mechanisms for communicating with another device or system via a network.

As described herein, the entity depicted in FIG. 6 may perform certain operations in response to processing unit 620 executing software instructions contained in a computer-readable medium, such as main memory 630. A computer-readable medium may be defined as a physical or logical memory device. The software instructions may be read into main memory 630 from another computer-readable medium, such as storage device 650, or from another device via communication interface 680. The software instructions contained in main memory 630 may cause processing unit 620 to perform processes that will be described later. Alternatively, hardwired circuitry may be used in place of or in combination with software instructions to implement processes described herein. Thus, implementations described herein are not limited to any specific combination of hardware circuitry and software.

Although FIG. 6 shows exemplary components of the entity, in other implementations, the entity may contain fewer, different, or additional components than depicted in FIG. 6. In still other implementations, one or more components of the entity may perform one or more other tasks described as being performed by one or more other components of the entity.

Exemplary Parallel Processing Constructs

Figure 7:
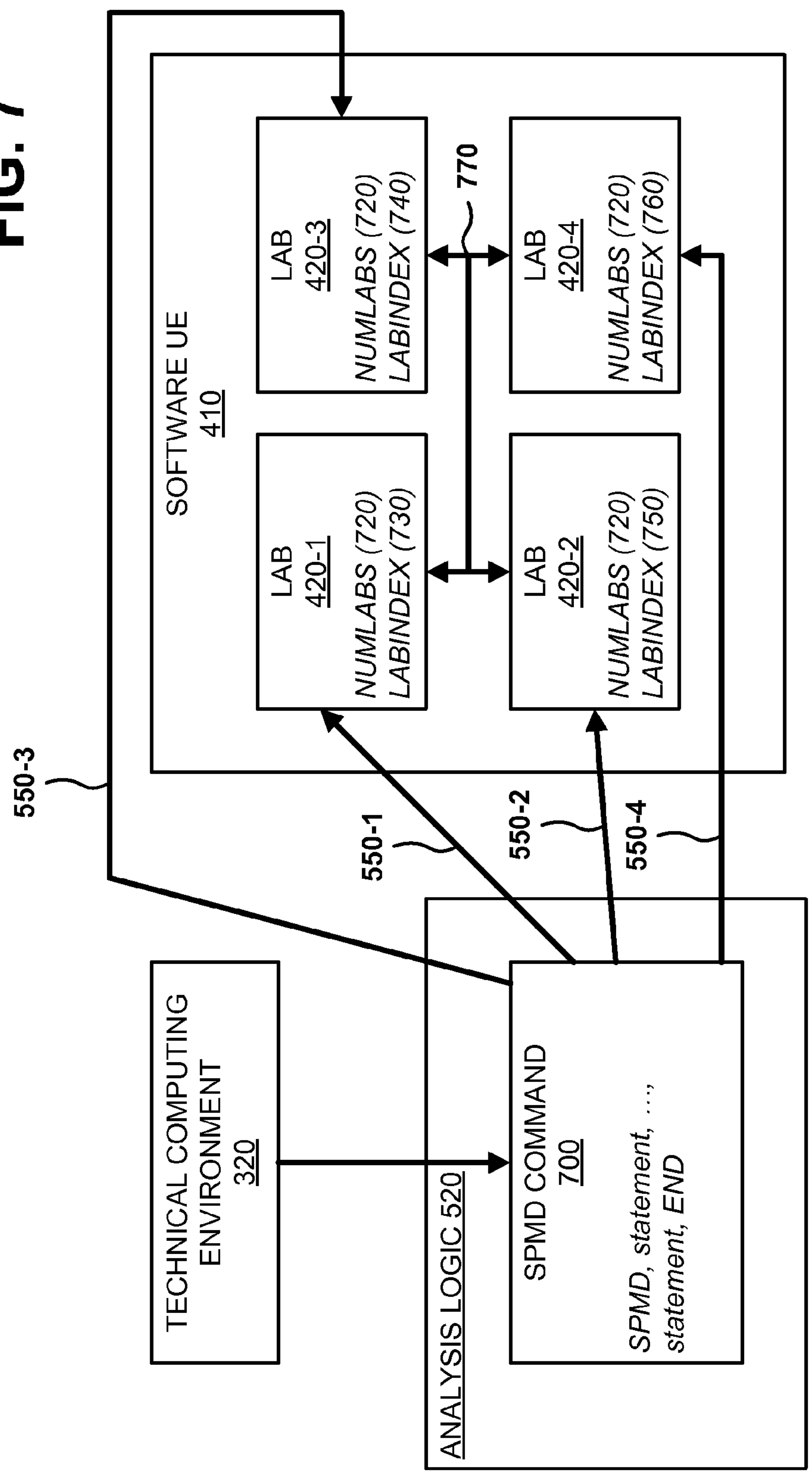
FIG. 7 depicts an exemplary parallel processing construct capable of being analyzed and transformed to parallel program portions by the analysis logic illustrated in FIGS. 5A and 5B.

FIG. 7 illustrates an exemplary parallel processing construct (e.g., a single program, multiple data (SPMD) command 700) capable of being analyzed and transformed to parallel program portions by analysis logic 520 of parallel processing interface 140. As shown, SPMD command 700 may be created with TCE 320 and provided to analysis logic 520 of client 500. In other implementations, SPMD command 700 may be created by another device and/or may be provided to analysis logic 520 of client 500. In one example, analysis logic 520 may implement SPMD command 700 to generate program portions 550.

SPMD command 700 may permit users to enter into a SPMD mode. In one implementation, SPMD command 700 may support data parallelism whereby a large amount of data may be distributed across multiple software UEs (e.g., software UEs 410 and/or labs 420) via a distributed arrays API. Operations on the distributed arrays may be coordinated through communication between labs 420 that own pieces of the array. The general form of SPMD command 700 may include:

SPMD, statement, . . . , statement, END.

The statements in the body of SPMD command 700 may be executed on resources (e.g., software UEs 410 and/or labs 420) that may be defined by a default configuration. SPMD command 700 may configure these resources as a communicating ring of labs (e.g., ring of labs 420), which may mean that labs 420 may have a same number of labs (e.g., NUMLABS) 720 defined, each lab 420 may have a unique value (e.g., LABINDEX 730, 740, 750, and 760 for labs 420-1, 420-2, 420-3, 420-4, respectively) between one and NUMLABS 720, labs 420 may send data to and from one another, and/or each lab 420 may include a unique random number generator that creates random number streams independent of one another. In one example, labs 420 may exchange information among each other when labs 420 are configured and/or executed.

Upon completion of SPMD command 700, labs 420 may be cleaned up, which may mean that labs 420 may be restored to ordinary resources (e.g., after the results are received), NUMLABS 720 and LABINDEX 730-760 may set back to one, the random number generators may be set back to a default start value, and/or workspaces may be cleared. There may be no implicit data transfer to and from the workspace where SPMD command 700 is called and the workspaces of labs 420 executing the body of SPMD command 700. An error on any of labs 420 executing the body of SPMD command 700 may cause an error in SPMD command 700. A warning on any of labs 700 executing the body of SPMD command 700 may be displayed on a device (e.g., client 500).

SPMD command 700 of the form SPMD NUMWORKERS, statement, . . . , statement, END may execute SPMD command 700 on an anonymous group of a number (e.g., NUMWORKERS) of resources provided within a default resource pool. SPMD command 700 of the form SPMD MYWORKERS, statement, . . . , statement, END may execute SPMD command 700 on a specified group of resources (e.g., MYWORKERS).

The syntax [OUT1, OUT2, . . . ]=SPMD(IN1, IN2, . . . ), statement, . . . , statement, END may transfer variables (e.g., IN1, IN2, . . . ) from client 500 to workspaces of labs 420 at the beginning of SPMD command 700, and may transfer variables (e.g., OUT1, OUT2, . . . ) from one of the workspaces back to client 500 at the end of SPMD command 700. If the variable being transferred from client 500 to labs 420 is a distributed array, then the variable may be automatically redistributed to all labs 420. If the variable being transferred from client 500 is a non-distributed array, then the variable may be replicated on all labs 420. If the variable being transferred from labs 420 to client 500 is a replicated array, then a replicated value may be received from any of labs 420. If the variable being transferred from labs 420 to client 500 is a variant array, then a value may be received from one of labs 420. If the variable being transferred from labs 420 to client 500 is a distributed array, then the variable may be automatically redistributed to be a distributed array over a single lab 420.

In one implementation, SPMD command 700 (and its associated syntax) may be implemented via client 500 (e.g. via analysis logic 520 of client 500), software UEs 410 (including labs 420), and/or TCE 320. In other implementations, SPMD command 700 (and its associated syntax) may be implemented via other software and hardware logic. SPMD command 700 may increase processing performance by dividing large data sets into pieces, and by providing each piece to different resources. Each resource may execute the same program on its piece of data, and the results may be collected.

Although FIG. 7 shows an exemplary parallel processing construct, in other implementations, analysis logic 520 may contain fewer, different, or additional parallel processing constructs than depicted in FIG. 7. In still other implementations, the exemplary parallel processing construct may be allocated in other ways than depicted in FIG. 7.

Exemplary Analysis of SPMD Parallel Processing Constructs

A SPMD parallel processing construct may provide a place holder for a single program that may be executed on one or more labs. The code for the SPMD construct may be provided to the labs, and workspace contents available to the SPMD construct may be determined on the client. The SPMD constructs described herein may be easy to use (e.g., may make it easy to mark code to execute in parallel and may make it easy to send ordinary variables into the SPMD), may support a user (e.g., a programmer) by performing minimal data transfer through remote references or similar mechanisms, and may provide sufficient richness to allow for remote distributed arrays.

The concept of parallel resource sets may be a building block for the behavior of the SPMD construct. A parallel resource set may include a set of labs such that the labs may be available to execute parallel code, the labs may be connected in a MPI ring, and each of the labs may include a value store that can store values of variables. A parallel context may include a combination of a parallel resource set with a parallel code block, and may include variables associated with the parallel code block.

Figure 8:
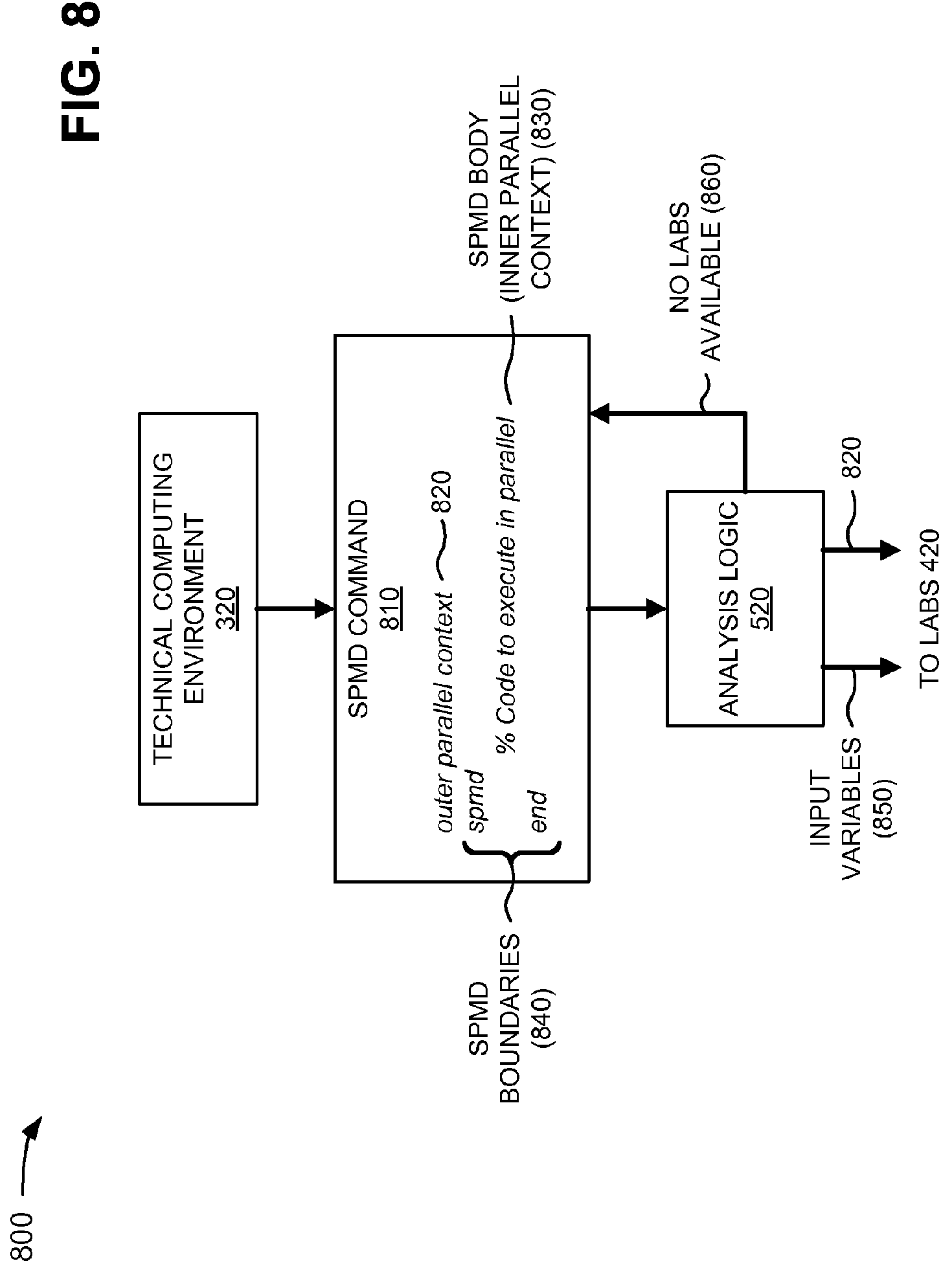
FIG. 8 illustrates an exemplary diagram of a parallel processing construct capable of being generated by a technical computing environment depicted in FIG. 7.

FIG. 8 illustrates an exemplary diagram 800 of a parallel processing construct (a SPMD command 810) capable of being generated by technical computing environment 320. As shown, SPMD command 810 may include an outer parallel context 820, a SPMD body (or inner parallel context) 830, and SPMD boundaries 840.

Outer parallel context 820 may include syntax or code provided outside a spmd statement and an end statement (e.g., outside SPMD boundaries 840). In one exemplary implementation, outer parallel context 820 may be executed sequentially (e.g., by client 500).

SPMD body 830 may include syntax or code provided inside the spmd statement and the end statement (e.g., inside SPMD boundaries 840). In one exemplary implementation, SPMD body 830 may be provided to two or more labs (e.g., labs 420), and may be executed in parallel by the two or more labs.

SPMD boundaries 840 may be defined by the spmd statement and the end statement of SPMD command 810. As described above, SPMD boundaries 840 may define outer parallel context 820 and inner parallel context (e.g., SPMD body 830) associated with SPMD command 810.

As further shown in FIG. 8, SPMD command 810 may be provided to analysis logic 520. Analysis logic 520 may receive SPMD command 810, and may analyze SPMD command 810 to determine outer parallel context 820 and inner parallel context 830. For example, analysis logic 520 may analyze SPMD command 810 to determine input variables 850 associated with SPMD command 810. Input variables 850 may include variables used within SPMD body 830 but before they are assigned values. In one implementation, analysis logic 520 may determine input variables 850 upon entering the spmd statement, and may attempt to transfer input variables from outer parallel context 820 into the inner parallel context (e.g., SPMD body 830). Analysis logic 520 may allocate one or more portions of the inner parallel context (e.g., SPMD body 830) and input variables 850 to labs 420 for parallel execution. If analysis logic 520 determines that no resources (e.g., labs 420) are available for parallel execution, as indicated by reference number 860, client 500 may sequentially execute outer parallel context 820 and SPMD body 830.

Although FIG. 8 shows an exemplary parallel processing construct, in other implementations, client 500 may contain fewer, different, or additional parallel processing constructs than depicted in FIG. 8.

Exemplary Distribution Scheme Determination

Figure 9:
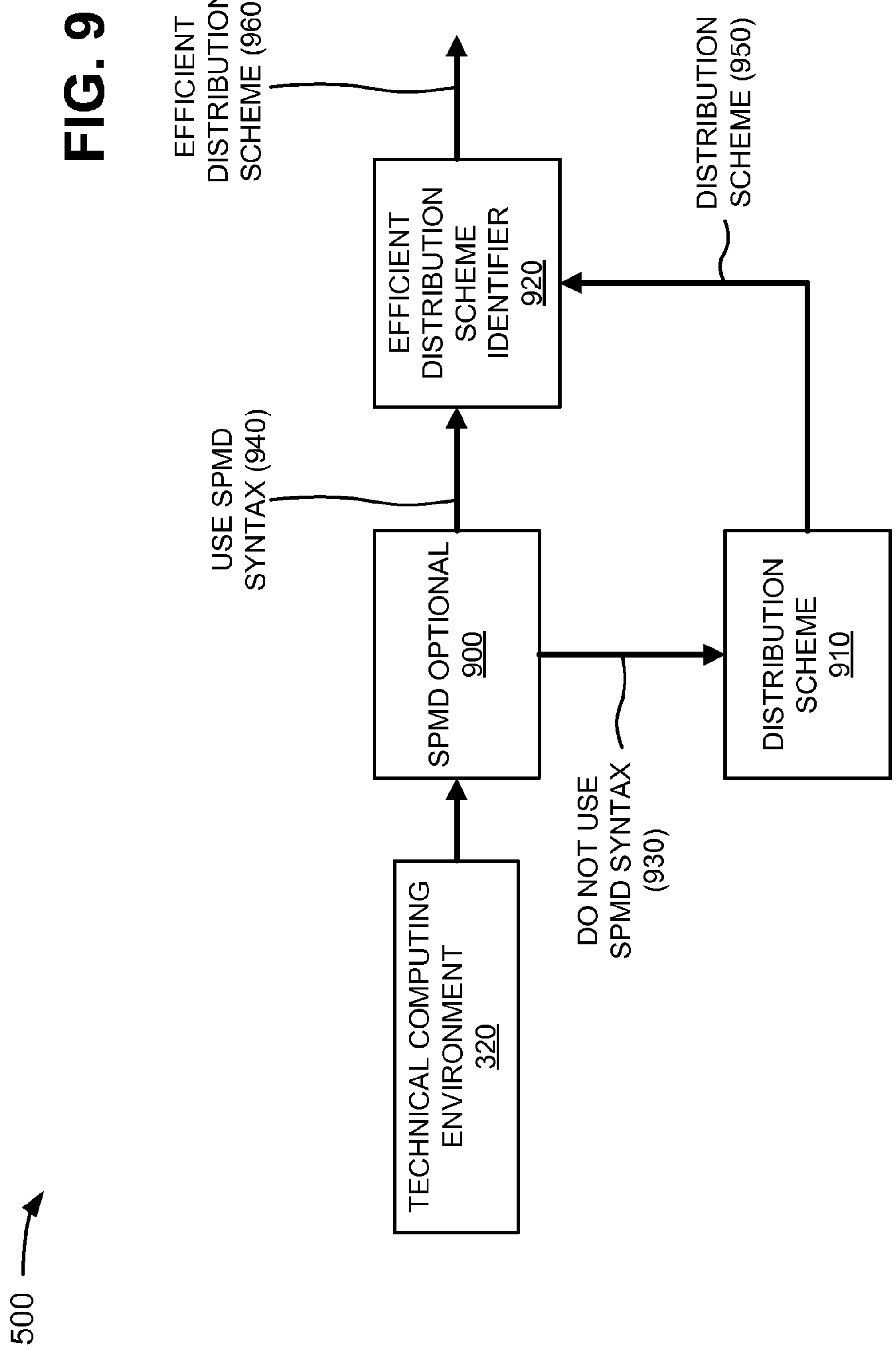
FIG. 9 depicts an exemplary diagram of functional components of the client illustrated in FIGS. 5A-5C, where the client may determine an efficient distribution scheme.

FIG. 9 depicts an exemplary diagram of functional components of client 500 for determining an efficient distribution scheme. As illustrated, client 500 may include SPMD optional logic 900, distribution scheme logic 910, and efficient distribution scheme identifier logic 920.

SPMD optional logic 900 may communicate with technical computing environment 320, and may determine (e.g., based on user input via technical computing environment 320) whether to not use SPMD syntax 930 or whether to use SPMD syntax 940. SPMD optional logic 900 may provide "do not use SPMD" syntax 930 to distribution scheme logic 910, and may provide "use SPMD" syntax 940 to efficient distribution scheme identifier logic 920.

Distribution scheme logic 910 may receive "do not use SPMD" syntax 910 and may generate a data distribution scheme 950 (e.g., for a distributed array provided by technical computing environment 320) without SPMD constructs. In one implementation, distribution scheme logic 910 may generate data distribution scheme 950 based on a user provided distribution scheme. Distribution scheme logic 910 may provide data distribution scheme 950 to efficient distribution scheme identifier logic 920.

Efficient distribution scheme identifier logic 920 may receive "use SPMD" syntax 940 from SPMD optional logic 900 or may receive data distribution scheme 950 from distribution scheme logic 910, and may determine and generate an efficient data distribution scheme 960 (e.g., for a distributed array provided by technical computing environment 320) with SPMD constructs or based on data distribution scheme 950. For example, in one implementation, efficient distribution scheme identifier logic 920 may optimize a time to solution (i.e., a time between when a user submits information (e.g., a distributed array) and when the user receives an answer) using various techniques. In one exemplary technique, efficient distribution scheme identifier logic 920 may identify one or more data distribution schemes for each operation or set of operations submitted by a user, and may select an appropriate distribution scheme (e.g., efficient data distribution scheme 960) for each operation or set of operations. In a second exemplary technique, efficient distribution scheme identifier logic 920 may select a fastest algorithm for each operation submitted by the user. In a third exemplary technique, efficient distribution scheme identifier logic 920 may select appropriate resources (e.g., a number and types of labs) for each operation. In one example, the third exemplary technique may lead to some labs being idle. However, a smaller number of labs may perform a task faster due to inherent algorithmic constraints of an operation. In one example, efficient distribution scheme identifier logic 920 may execute the three exemplary techniques, described above, simultaneously to derive efficient data distribution scheme 960. Efficient data distribution scheme 960 may be used (e.g., by analysis logic 520) to allocate information (e.g., a distributed array) to two or more labs (e.g., labs 420).

Although FIG. 9 shows exemplary functional components of client 500, in other implementations, client 500 may contain fewer, different, or additional functional components than depicted in FIG. 9. In still other implementations, one or more functional components of client 500 may perform one or more other tasks described as being performed by one or more other functional components of client 500.

Exemplary Distribution Scheme/Distributed Array Syntax

In order to perform parallel processing with distributed arrays and their distribution schemes, the SPMD commands described herein may be used. In one exemplary implementation, distributed arrays and their distribution schemes may be created, manipulated, and parallel processed via distribution scheme and/or distributed array commands or functions described herein. Such commands may automatically implement SPMD or other parallel constructs for distribution schemes and/or distributed arrays, as described herein.

Figure 10:
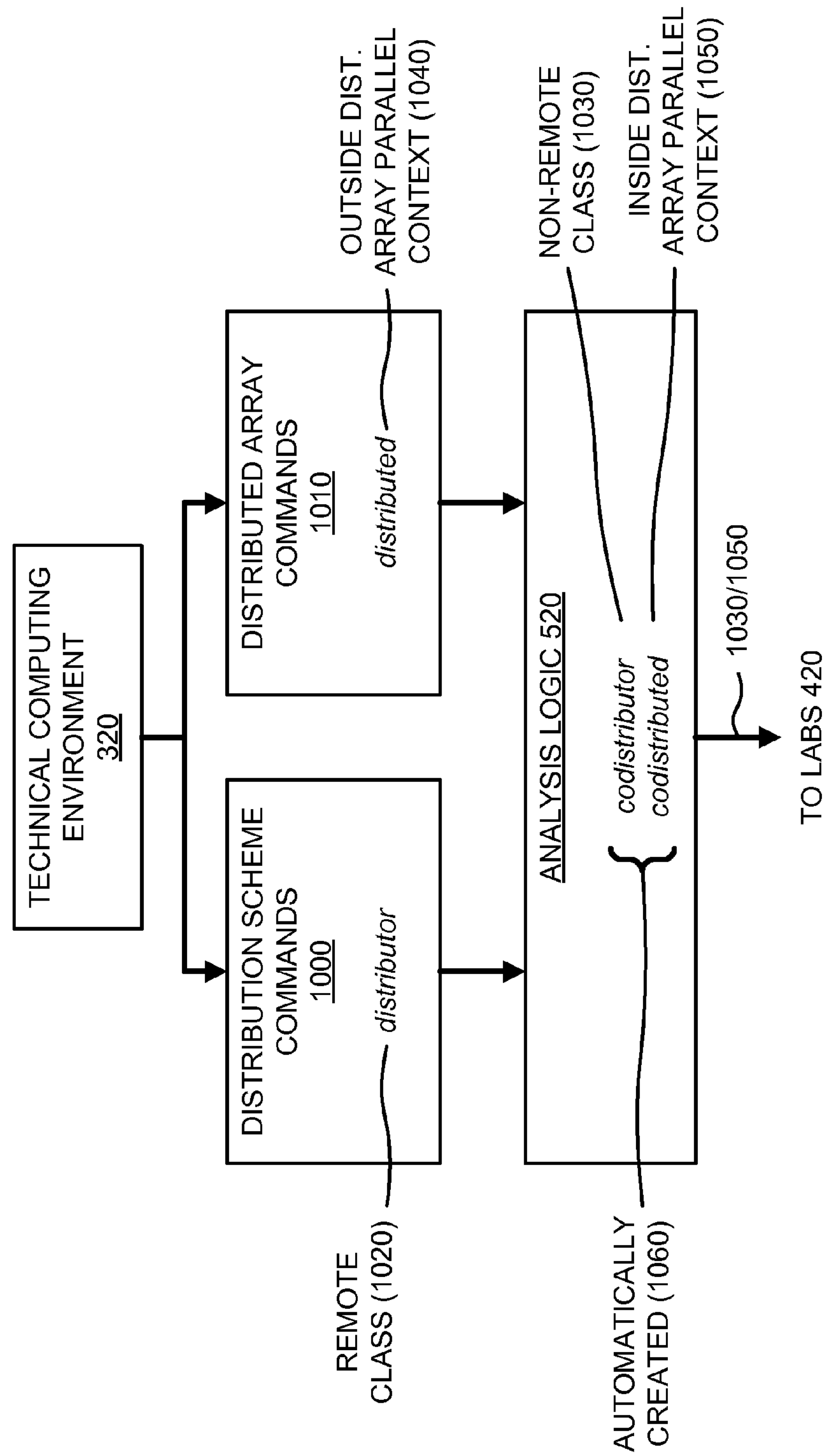
FIG. 10 illustrates an exemplary diagram of distribution scheme commands and/or distributed array commands capable of being generated by the technical computing environment depicted in FIG. 7.

FIG. 10 illustrates an exemplary diagram of distribution scheme commands 1000 and/or distributed array commands 1010 capable of being generated by client 500 (e.g., via technical computing environment 320).

Distribution scheme commands 1000 may specify a layout of data onto a parallel resource set (e.g., labs 420), and may specify which parallel resource set is to be used for a distribution. Distribution scheme commands 1000 may encapsulate such information (e.g., distribution objects) inside a distributor object represented by a remote class 1020 (e.g., a distributor class). Distribution scheme commands 1000 (e.g., remote class 1020) may be provided to analysis logic 520, and analysis logic 520 may create a parallel distributor object represented by a non-remote class 1030 (e.g., a codistributor class). The distributions represented by remote class 1020 and non-remote class 1030 may not be directly exposed to a user (e.g., a programmer) unless explicitly requested. Instead, the user may only see the distributor syntax and/or the codistributor syntax. The distributor syntax may be a place holder (stub or proxy) for the codistributor syntax, and may perform operations using the SPMD block syntax to change the parallel context from an outer parallel context to an inner parallel context. In other words, the distributor syntax may not store data, but may rely on a state information provided by the codistributor syntax.

Distributed array commands 1010 may specify a layout of data onto a parallel resource set (e.g., labs 420), and may specify which parallel resource set is to be used for a distributed array. Distributed array commands 1010 may encapsulate such information (e.g., distributed array objects) inside a distributed object represented a distributed class provided outside a distributed array's parallel context, as indicated by reference number 1040. Distributed array commands 1010 (e.g., the distributed class) may be provided to analysis logic 520, and analysis logic may create a parallel distributed object represented by a codistributed class. The codistributed class may be provided inside a distributed array's parallel context, as indicated by reference number 1050. The distributed syntax may include a remote reference to a distributed array, and methods of the distributed syntax may remotely invoke methods of the codistributed syntax. The codistributed syntax may include an instance of the distributed array. Codistributed syntax may reside on each lab, and may store a local portion of the distributed array data as a private field. The methods of the codistributed syntax may perform computations on the data. The distributed syntax may serve as a stub or a proxy that may remotely invoke the methods of the codistributed syntax (e.g., via SPMD blocks).

As further shown in FIG. 10, analysis logic 520 may automatically create the codistributor syntax and the codistributed syntax based on the distributor syntax and the distributed syntax, respectively, as indicated by reference number 1060. In other words, analysis logic 520 may transform distribution scheme commands 1000 (e.g., the distributor syntax) and distributed array commands (e.g., the distributed syntax) into parallel-based syntax (e.g., the codistributor syntax and the codistributed syntax). Analysis logic 520 may provide the codistributor syntax and the codistributed syntax to one or more labs 420 for parallel execution.

Although FIG. 10 shows exemplary distribution scheme commands and/or distributed array commands, in other implementations, client 500 may contain fewer, different, or additional distribution scheme commands and/or distributed array commands than depicted in FIG. 10.

Exemplary Distribution Scheme Commands

Figure 11:
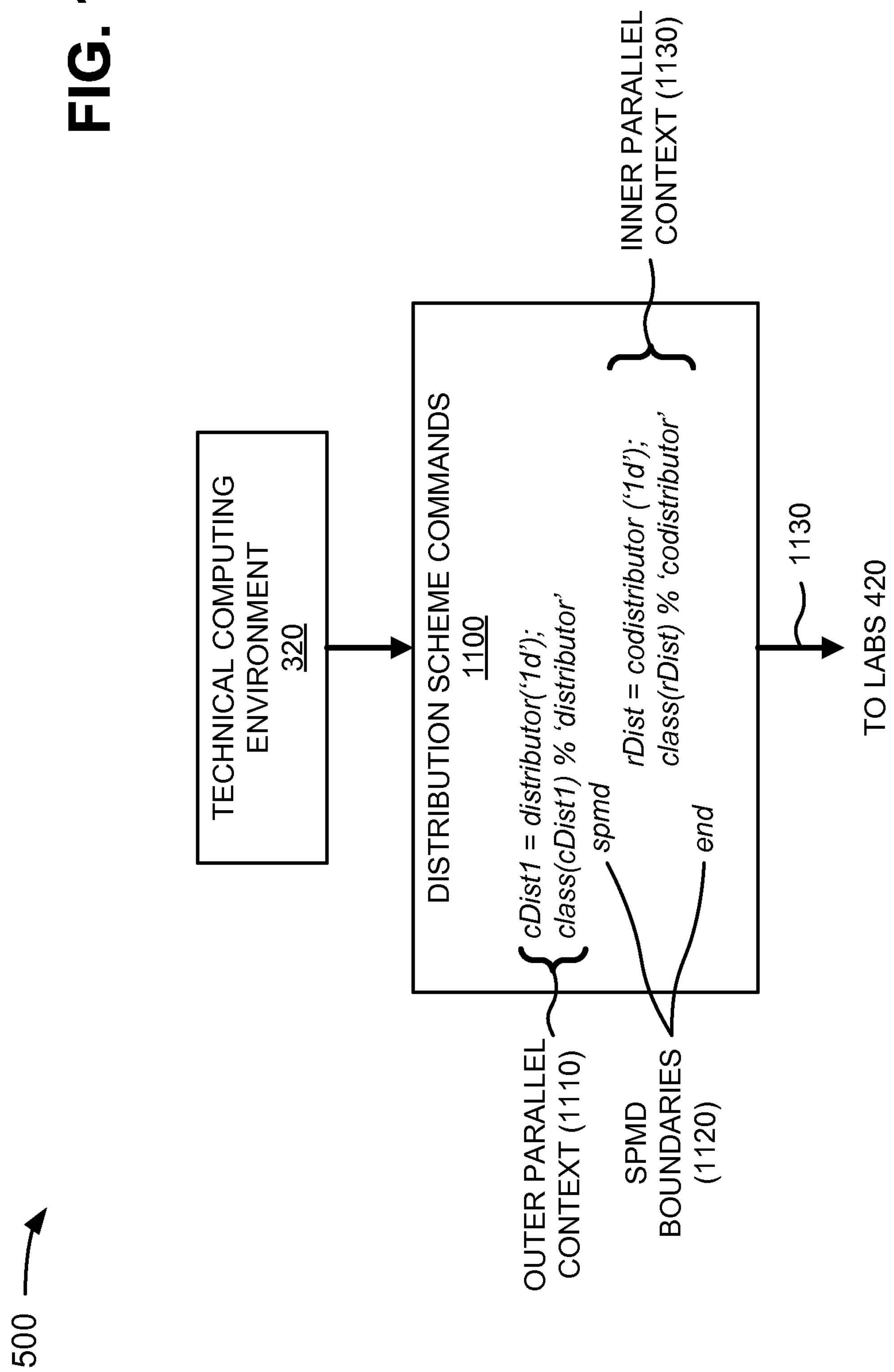
FIG. 11 depicts an exemplary diagram of distribution scheme commands capable of being generated by the technical computing environment illustrated in FIG. 7 and may include remote objects.

FIG. 11 depicts an exemplary diagram of distribution scheme commands 1100 capable of being generated by client 500 (e.g., via technical computing environment 320). As illustrated, distribution scheme commands 1100 may include an outer parallel context 1110, SPMD boundaries 1120, and an inner parallel context 1130.

Outer parallel context 1110 may include syntax or code provided outside a spmd statement and an end statement (e.g., outside SPMD boundaries 1120). In one exemplary implementation, outer parallel context 1110 may be executed sequentially (e.g., by client 500), and may include distributor syntax.

SPMD boundaries 1120 may be defined by the spmd statement and the end statement of the SPMD command. SPMD boundaries 1120 may define outer parallel context 1110 and inner parallel context 1130) associated with the SPMD command.

Inner parallel context 1130 may include syntax or code provided inside the spmd statement and the end statement (e.g., inside SPMD boundaries 1120). In one exemplary implementation, inner parallel context 1130 may be provided to two or more labs (e.g., labs 420), and may be executed in parallel by the two or more labs. Inner parallel context 1130 may include codistributor syntax.

In one implementation, outer parallel context 1110 may be provided to analysis logic 520 (not shown), and analysis logic 520 may automatically create and identify SPMD boundaries 1120 and inner parallel context 1130. For example, analysis logic 520 may analyze outer parallel context 1110 to determine input variables associated with outer parallel context 1110, and may execute outer parallel context 1110 sequentially on client 500. Analysis logic 520 may determine and allocate one or more portions of inner parallel context 1130 and the input variables to labs 420 for parallel execution. If analysis logic 520 determines that no resources (e.g., labs 420) are available for parallel execution, client 500 may sequentially execute outer parallel context 1110 and inner parallel context 1130.

Although FIG. 11 shows exemplary distribution scheme commands, in other implementations, client 500 may contain fewer, different, or additional distribution scheme commands than depicted in FIG. 11.

Figure 12:
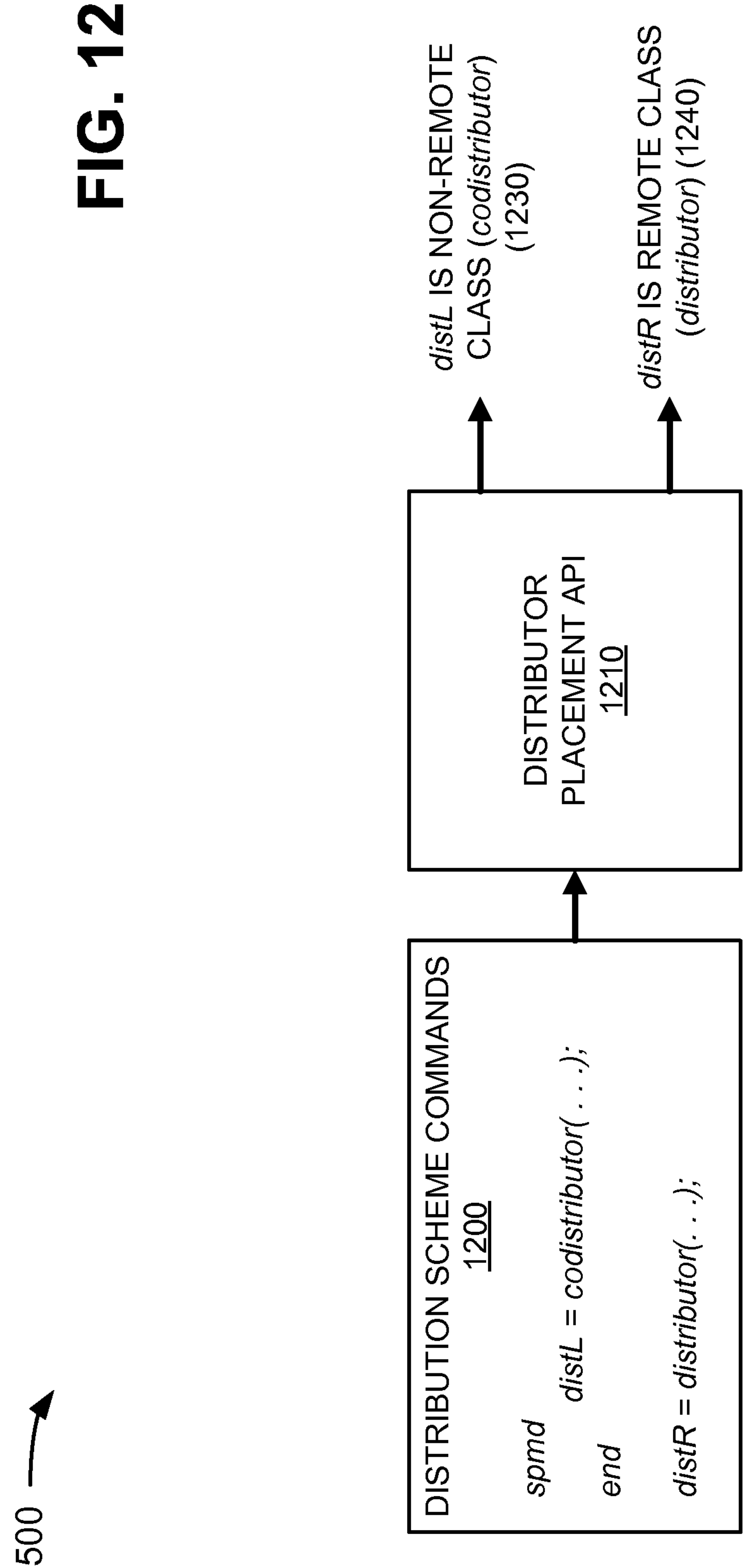
FIG. 12 illustrates an exemplary distributor placement application program interface capable of being provided by the client depicted in FIGS. 5A-5C.

The distributor object may determine a parallel context that owns a distributed array. In one implementation, client 500 (e.g., analysis logic 520) may select the parallel context by choosing which of the distributor objects is called. FIG. 12 illustrates an exemplary distributor placement application program interface (API) capable of being provided by client 500. As shown, client 500 may provide distribution scheme commands 1200 and a distributor placement API 1210.

Distribution scheme commands 1200 may include a codistributor object (e.g., distL) and a distributor object (e.g., distR). Distribution scheme commands 1200 may be provided to distributor placement API 1210.

Distributor placement API 1210 may receive distribution scheme commands 1200, and may choose a parallel context for distributed arrays by calling an appropriate distributor object. For example, in one implementation, distributor placement API 1210 may determine that distL is a non-remote class (e.g., a codistributor class), as indicated by reference number 1230, and may choose a local (or non-remote) parallel context for distributed arrays associated with distL. Distributor placement API 1210 may determine that distR is a remote class (e.g., a distributor class), as indicated by reference number 1240, and may choose a remote parallel context for distributed arrays associated with distR.

Although FIG. 12 shows exemplary functions associated with distributor placement API 1210, in other implementations, distributor placement API 1210 may contain fewer, different, or additional functions than depicted in FIG. 12.

FIG. 13 depicts an exemplary diagram of distribution scheme commands 1300 and 1310 capable of being provided by client 500. As illustrated, distributor objects of class distributor and codistributor may implement a SPMD conversion. For example, for distribution scheme commands 1300, a distributor object of class distributor 1320 provided outside a SPMD block may be automatically converted (e.g., via analysis logic 520) into a distributor object of class codistributor 1330 if distributor object of class distributor 1320 is used inside the SPMD block. In one example, since distributor object 1320 (e.g., dist1*d*) is provided outside the SPMD block and is used inside the SPMD block, distributor object 1320 may be automatically converted (e.g., via analysis logic 520) into distributor object of class codistributor 1330.

For distribution scheme commands 1310, a distributor object of class codistributor 1340 provided inside a SPMD block may be automatically converted (e.g., via analysis logic 520) into a distributor object of class distributor 1350 if distributor object of class codistributor 1340 is used outside the SPMD block. In one example, since distributor object 1340 (e.g., dist1*d*) is provided inside the SPMD block and is used outside the SPMD block, distributor object 1340 may be automatically converted (e.g., via analysis logic 520) into distributor object of class distributor 1350.

Although FIG. 13 shows exemplary distribution scheme commands, in other implementations, client 500 may contain fewer, different, or additional distribution scheme commands than depicted in FIG. 13.

FIG. 14 illustrates an exemplary diagram of distribution scheme commands 1400 and 1410 capable of being provided by client 500. Distribution scheme commands 1400 and/or 1410 may provide a mechanism (e.g., a distribution property of a distributor object) for obtaining a specific distribution scheme object.

As shown in FIG. 14, distribution scheme commands 1400 may include a distributor object 1420 provided outside a SPMD block and specific distribution scheme objects 1430 (e.g., distributionDimension). Information specific to a distribution scheme (e.g., provided by distributor object 1420) may be obtained (e.g., via analysis logic 520) by using specific distribution objects 1430 outside the SPMD block. As further shown in FIG. 14, distribution scheme commands 1410 may include a distributor object 1440 provided inside a SPMD block and specific distribution scheme objects 1450 (e.g., distributionDimension). Information specific to a distribution scheme (e.g., provided by distributor object 1440)

may be obtained (e.g., via analysis logic 520) by using specific distribution objects 1450 inside the SPMD block.

Although FIG. 14 shows exemplary distribution scheme commands, in other implementations, client 500 may contain fewer, different, or additional distribution scheme commands than depicted in FIG. 14. For example, distribution scheme commands 1400 and/or 1410 may provide a mechanism (e.g., a distribution property of a distributor object) for accessing functions common to all distribution schemes (e.g., a zeros( ) function).

Figure 15:
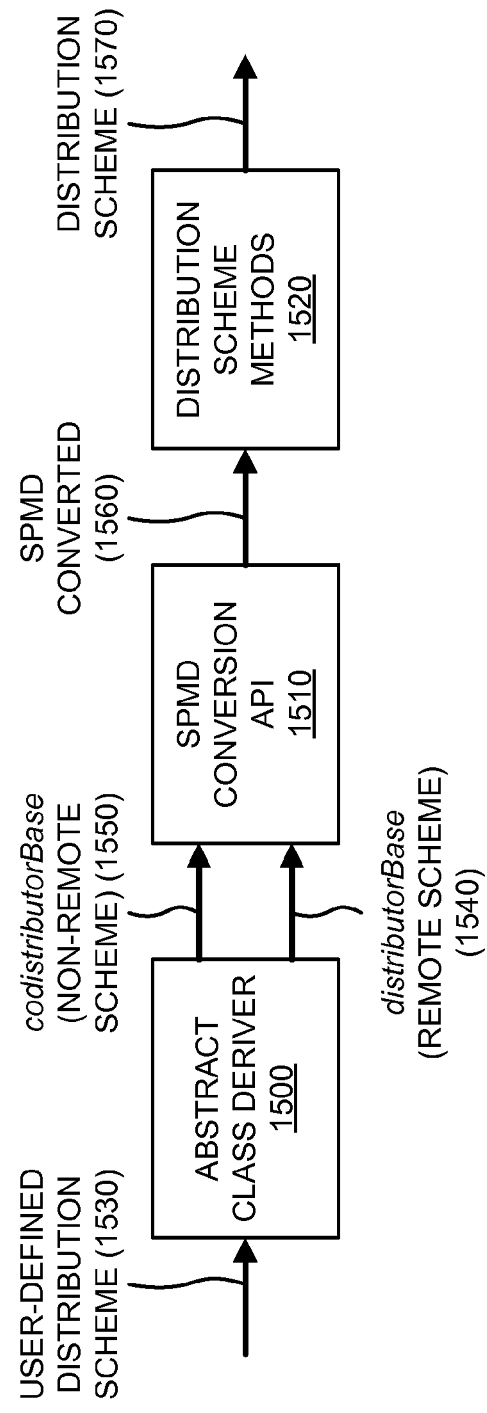
FIG. 15 depicts an exemplary diagram of functional components, of the client illustrated in FIG. 5A-5C, for handling user-defined distribution schemes.

FIG. 15 depicts an exemplary diagram of functional components of client 500 for handling user-defined distribution schemes. As illustrated, client 500 may include abstract class deriver logic 1500, SPMD conversion API logic 1510, and distribution scheme methods logic 1520.

Abstract class deriver logic 1500 may include hardware, software, and/or a combination of hardware and software based logic that receives a user-defined distribution scheme 1530, and creates a class (e.g., distributorBase) 1540 that is a subclass of a remote distribution scheme or a class (e.g., codistributorBase) 1550 that is a subclass of a non-remote distribution scheme. Abstract class deriver 1500 may provide class (e.g., distributorBase) 1540 or class (e.g., codistributorBase) 1550 to SPMD conversion API logic 1510.

SPMD conversion API logic 1510 may include hardware, software, and/or a combination of hardware and software based logic that receives class (e.g., distributorBase) 1540 or class (e.g., codistributorBase) 1550 from abstract class deriver logic 1500, and integrates class (e.g., distributorBase) 1540 or class (e.g., codistributorBase) 1550 by implementing a SPMD conversion API.

For example, the SPMD conversion API may include a first function that may be invoked in inner parallel context when crossing end statement, and may return a function handle to a variant constructor function and input data that may be used by a second function. The second function may invoke the variant constructor function in the outer parallel context when crossing an end statement, and may return a variant (or a reference). The SPMD conversion API may include a third function that may be invoked in an outer parallel context when crossing a spmd statement, and may return a function handle to a function that updates actual data in the inner parallel context and input data for that function. The update function and input data may be used by a fourth function. The fourth function may invoke the update function in the inner parallel context when crossing a spmd statement, and may return an input variable (or data). The fourth function may receive the input data, may update the input data, and may return updated data. SPMD conversion API logic 1510 may provide a SPMD converted distribution scheme 1560, based on implementation of the SPMD conversion API, to distribution scheme methods logic 1520.

Distribution scheme methods logic 1520 may include hardware, software, and/or a combination of hardware and software based logic that receives SPMD converted distribution scheme 1560, and implements a distribution scheme 1570. For example, distribution scheme methods logic 1520 may implement methods that perform parallel computations based on distribution scheme 1570.

Although FIG. 15 shows exemplary functional components of client 500, in other implementations, client 500 may contain fewer, different, or additional functional components than depicted in FIG. 15. In still other implementations, one or more functional components of client 500 may perform one or more other tasks described as being performed by one or more other functional components of client 500.

Exemplary Distributed Array Commands

Figure 16:
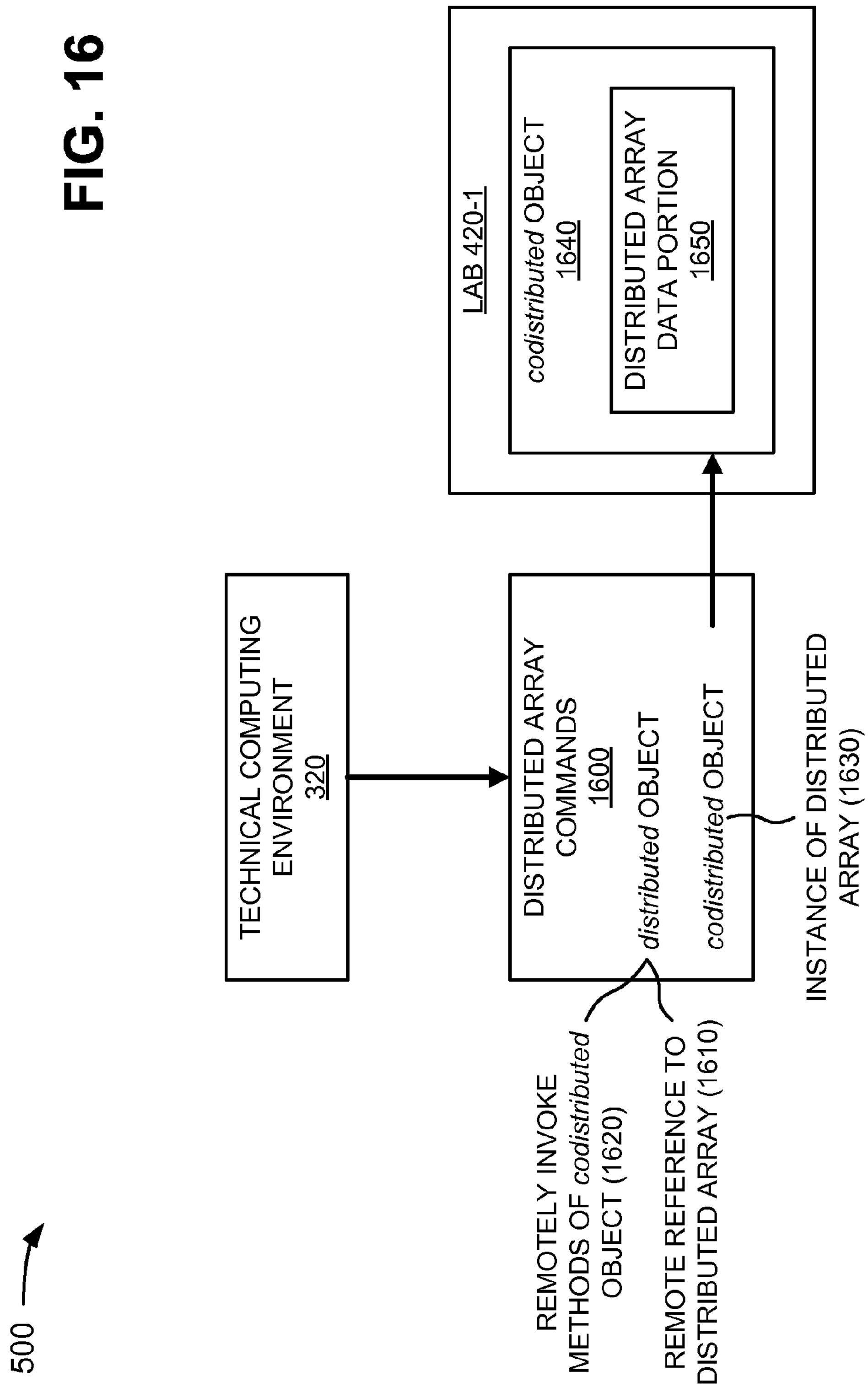
FIG. 16 illustrates an exemplary diagram of distributed array commands capable of being provided by the client depicted in FIGS. 5A-5C, where the distributed array commands may create an instance of a distributed array for execution by a lab.

FIG. 16 illustrates an exemplary diagram of distributed array commands 1600 capable of being provided by the client 500 (e.g., via technical computing environment 320). As shown, distributed array commands 1600 may include a distributed object and a codistributed object.

The distributed object may provide a remote reference to a distributed array, as indicated by reference number 1610, and may remotely invoke methods of the codistributed object, as indicated by reference number 1620. The codistributed object may include an instance of the distributed array 1630 (e.g., the distributed array remotely referenced by the distributed object), and may reside on one or more labs (e.g., lab 420-1), as indicated by reference number 1640. The codistributed object may store a local portion of distributed array data 1650 (e.g., as a private field) on the one or more labs (e.g., lab 420-1). Methods associated with the codistributed object may perform computations on distributed array data portion 1650.

Although FIG. 16 shows exemplary distributed array commands, in other implementations, client 500 may contain fewer, different, or additional distributed array commands than depicted in FIG. 16.

FIG. 17 depicts an exemplary diagram of distributed array commands 1700 capable of being provided by client 500. As illustrated, distributed array commands 1700 may include an inner parallel context 1710 and dereference syntax 1720.

Execution of some methods associated with an instance of distributed arrays may return replicated values. Inner parallel context 1710 may automatically generate such methods, and the returned values (e.g., p) may become remote objects inside inner parallel context 1710. That is, if a call is made in the outer parallel context of distributed array commands 1700, a value coming out of inner parallel context 1710 may be converted to a remote object.

However, if non-remote objects may be desired outside of inner parallel context 1710. Dereference syntax 1720 (e.g., p=p{1}) may be used to dereference the value (e.g., p) inside inner parallel context 1710, and to return a non-remote object (e.g., p becomes a non-remote object).

Figure 18:
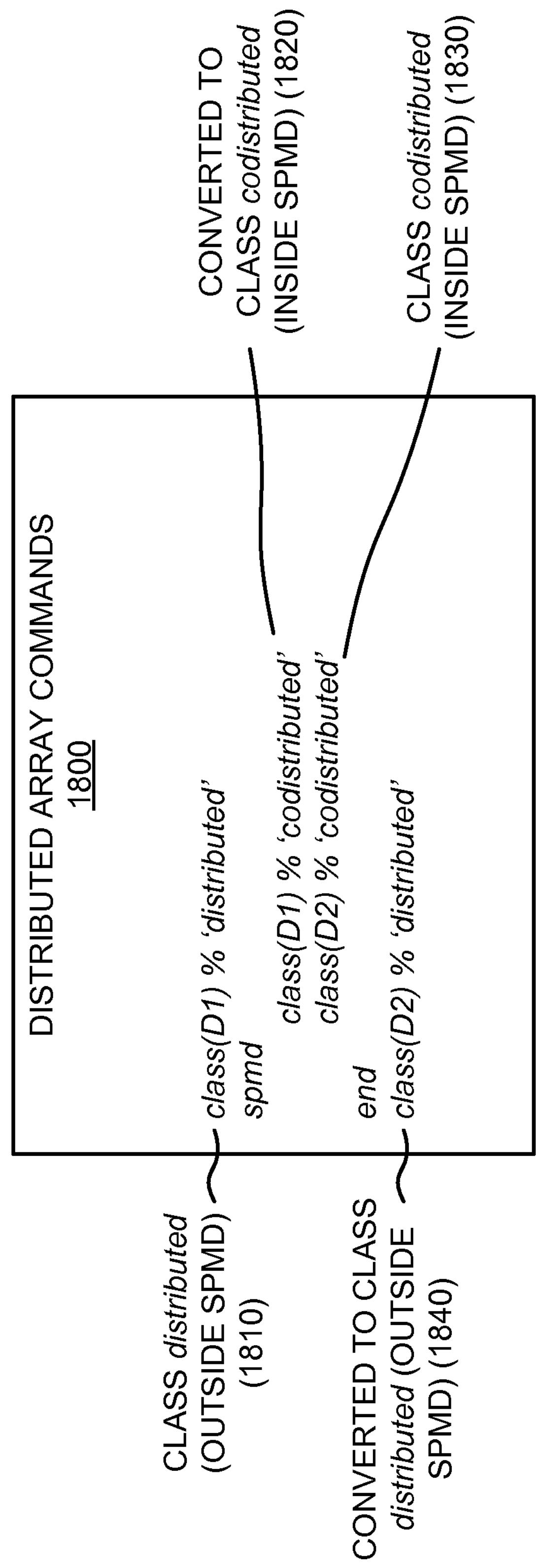
FIG. 18 illustrates an exemplary diagram of distributed array commands capable of being provided by the client depicted in FIGS. 5A-5C, where the distributed array commands may provide conversions between distributed objects and parallel distributed objects.

FIG. 18 illustrates an exemplary diagram of distributed array commands 1800 capable of being provided by client 500. As shown, distributed objects of class distributed and codistributed may implement a SPMD conversion. For example, a distributed object of class distributed 1810 provided outside a SPMD block may be automatically converted (e.g., via analysis logic 520) into a distributed object of class codistributed 1820 if distributed object of class distributed 1810 is used inside the SPMD block. In one example, since distributed object 1810 (e.g., D1) is provided outside the SPMD block and is used inside the SPMD block, distributed object 1810 may be automatically converted (e.g., via analysis logic 520) into distributed object of class codistributed 1820.

As further shown in FIG. 18, a distributed object of class codistributed 1820 provided inside a SPMD block may be automatically converted (e.g., via analysis logic 520) into a distributed object of class distributed 1840 if distributed object of class codistributed 1830 is used outside the SPMD block. In one example, since distributed object 1830 (e.g., D2) is provided inside the SPMD block and is used outside the SPMD block, distributed object 1830 may be automatically converted (e.g., via analysis logic 520) into distributed object of class distributed 1840.

Although FIG. 18 shows exemplary distributed array commands, in other implementations, client 500 may contain fewer, different, or additional distributed array commands than depicted in FIG. 18.

Figure 19:
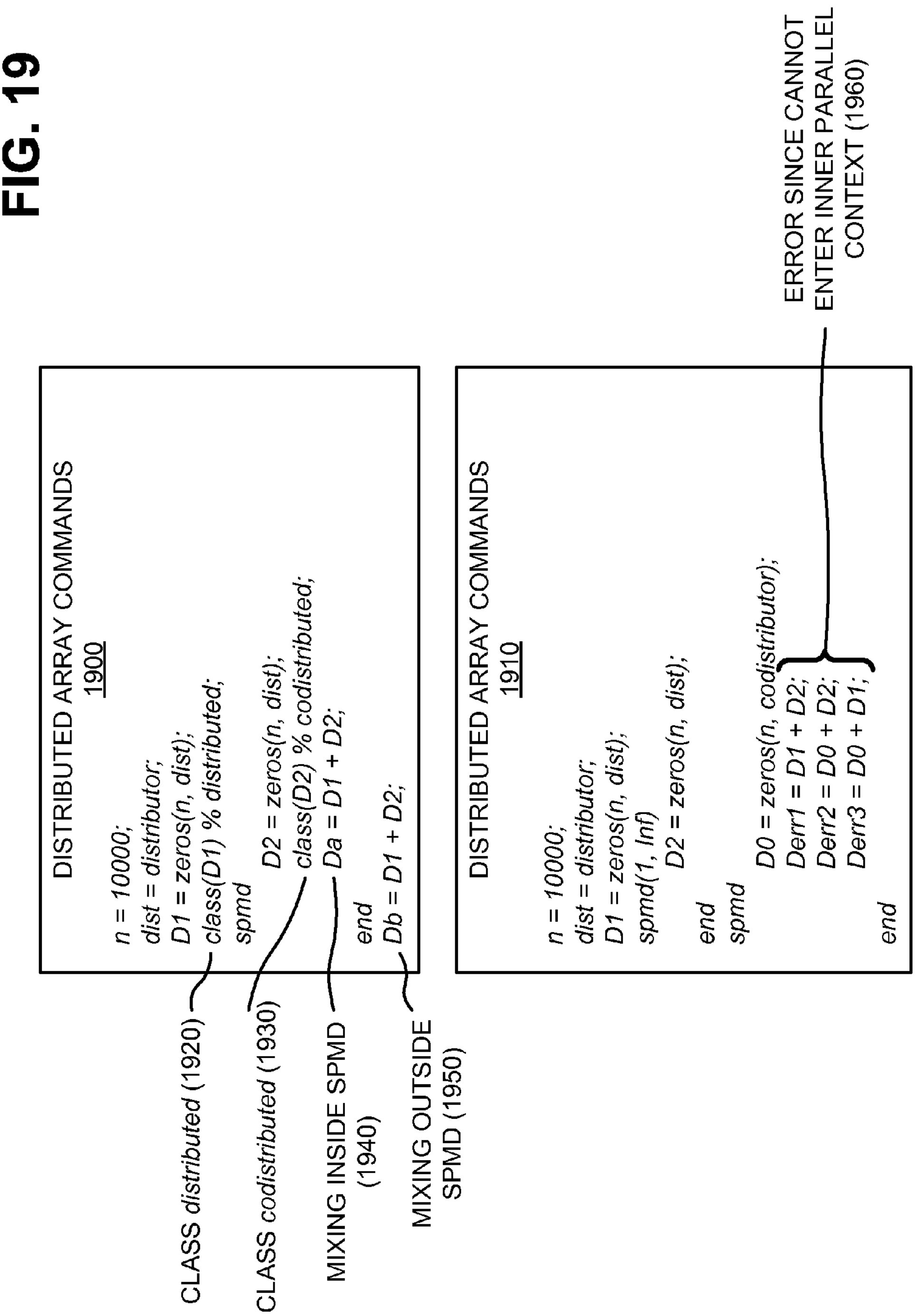
FIG. 19 depicts an exemplary diagram of distributed array commands capable of being provided by the client illustrated in FIGS. 5A-5C, where the distributed array commands may mix distributed objects and parallel distributed objects.

FIG. 19 depicts an exemplary diagram of distributed array commands 1900 and 1910 capable of being provided by client 500. Distributed array commands 1900 and 1910 may mix distributed objects and parallel distributed objects. As shown in FIG. 19, distributed array commands 1900 and 1910 may include a distributed object 1920 (e.g., D1—class distributed) and a parallel distributed object 1930 (e.g., D2—class codistributed). As further shown in FIG. 19, distributed object 1920 and parallel distributed object 1930 may be mixed inside a SPMD block, as indicated by reference number 1940, and may be mixed outside the SPMD block, as indicated by reference number 1950.

Distributed objects (e.g., distributed object 1920) and parallel distributed objects (e.g., parallel distributed object 1930) may not be mixed in calls to functions, methods, and/or operators until objects of either class are transferred into an appropriate context. For example, distributed objects may need to cross the SPMD block boundary and enter the inner parallel context if they are to be mixed with parallel distributed objects. Conversely, parallel distributed objects may need to be taken out of the inner parallel context, across the SPMD block boundary, if they are to be mixed with distributed objects.

An attempt to mix distributed objects and parallel distributed objects in the wrong context may produce an error 1960. For example, as shown in distributed array commands 1910, attempting to mix a distributed object (e.g., D1) and a parallel distributed object (e.g., D2) in a second SPMD second block may produce error 1960. Attempting to mix another parallel distributed object (e.g., D0) with the distributed object (e.g., D1) or the parallel distributed object (e.g., D2) in the second SPMD block may also produce error 1960.

Although FIG. 19 shows exemplary distributed array commands, in other implementations, client 500 may contain fewer, different, or additional distributed array commands than depicted in FIG. 19.

Figure 20:
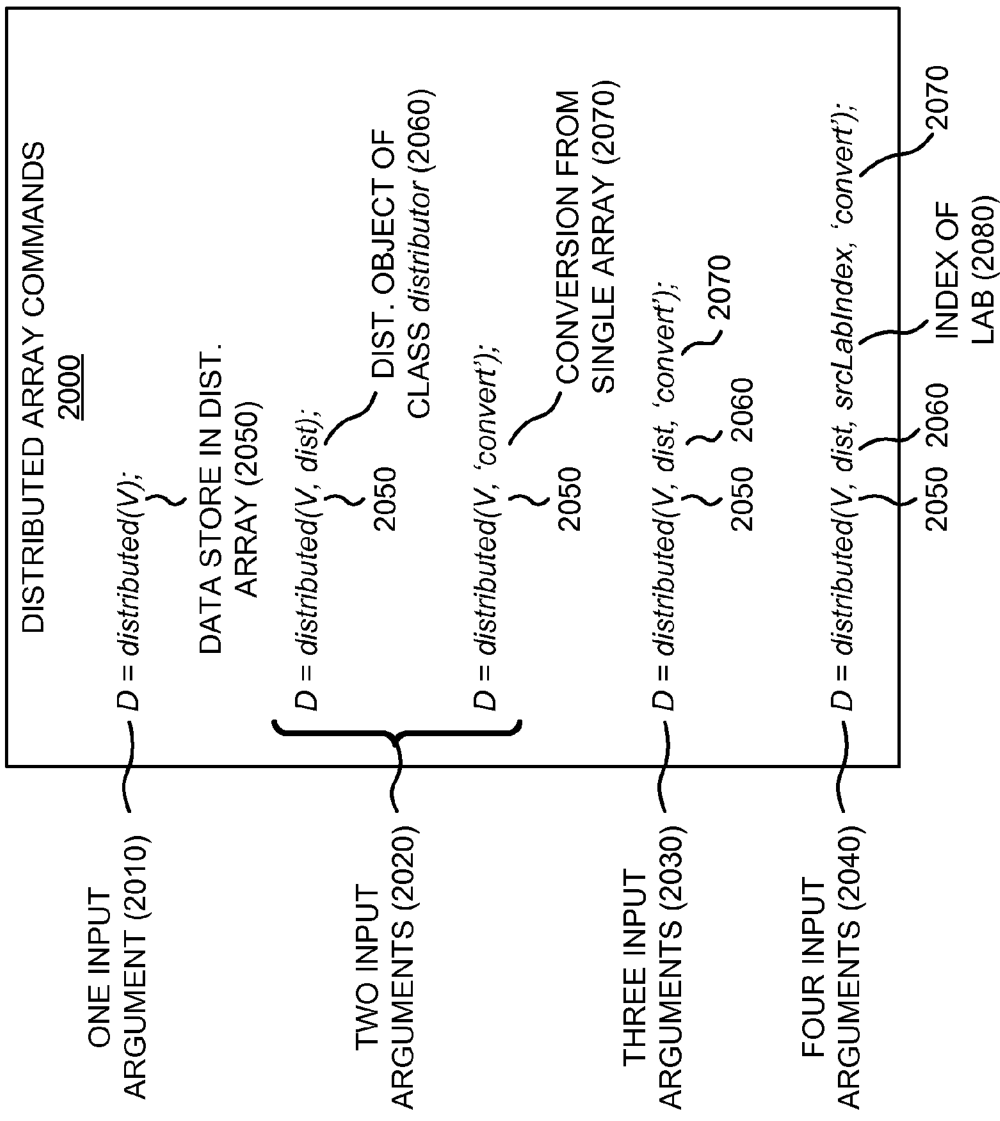
FIG. 20 illustrates an exemplary diagram of distributed array commands capable of being provided by the client depicted in FIGS. 5A-5C, where the distributed array commands may include distributed objects with one or more input arguments.

FIG. 20 illustrates an exemplary diagram of distributed array commands 2000 capable of being provided by client 500. As shown, distributed array commands 2000 may include distributed objects with one or more input arguments. For example, distributed array commands 2000 may include a distributed object with one input argument 2010, distributed objects with two input arguments 2020, a distributed object with three input arguments 2030, and/or a distributed object with four input arguments 2040.

The distributed object with one input argument 2010 may include an argument 2050 that includes data to be stored in a distributed array. In one example, the data may include a built-in data type that may be sent to one or more labs (e.g., labs 420) and replicated. In another example, the data may include a remote reference to an object that resides in a different parallel context.

In one example, the distributed objects with two input arguments 2020 may include argument 2050 and an argument 2060 that includes a distributor object of class distributor. In another example, the distributed objects with two input arguments 2020 may include argument 2050 and an argument 2070 that indicates a conversion from a single built-in array is requested.

The distributed object with three input arguments 2030 may include arguments 2050-2070. The distributed object with four input arguments 2040 may include arguments 2050-2070 and an argument 2080 that includes an index of a lab (e.g., a labindex).

Although FIG. 20 shows exemplary distributed array commands, in other implementations, client 500 may contain fewer, different, or additional distributed array commands than depicted in FIG. 20.

Figure 21:
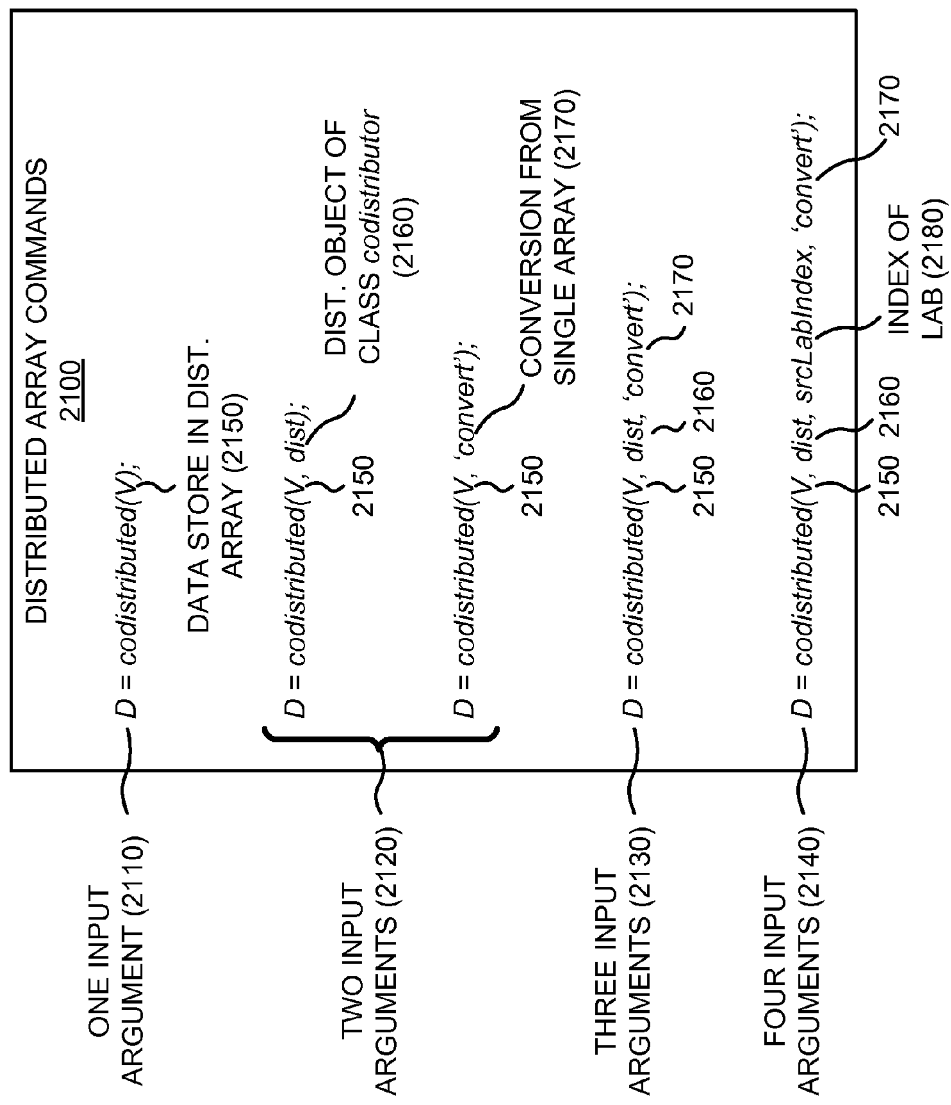
FIG. 21 depicts an exemplary diagram of distributed array commands capable of being provided by the client illustrated in FIGS. 5A-5C, where the distributed array commands may include parallel distributed objects with one or more input arguments.

FIG. 21 depicts an exemplary diagram of distributed array commands 2100 capable of being provided by client 500. As illustrated distributed array commands 2100 may include parallel distributed objects with one or more input arguments. For example, distributed array commands 2100 may include a parallel distributed object with one input argument 2110, parallel distributed objects with two input arguments 2120, a parallel distributed object with three input arguments 2130, and/or a parallel distributed object with four input arguments 2140.

The distributed object with one input argument 2110 may include an argument 2150 that includes data to be stored in a distributed array. In one example, the data may include a built-in data type that may be sent to one or more labs (e.g., labs 420) and replicated.

In one example, the distributed objects with two input arguments 2120 may include argument 2150 and an argument 2160 that includes a distributor object of class codistributor. In another example, the distributed objects with two input arguments 2120 may include argument 2150 and an argument 2170 that indicates a conversion from a single built-in array is requested.

The distributed object with three input arguments 2130 may include arguments 2150-2170. The distributed object with four input arguments 2140 may include arguments 2150-2170 and an argument 2180 that includes an index of a lab (e.g., a labindex).

Although FIG. 21 shows exemplary distributed array commands, in other implementations, client 500 may contain fewer, different, or additional distributed array commands than depicted in FIG. 21.

Exemplary Distribution Scheme/Distributed Array Commands

FIG. 22 illustrates an exemplary diagram of a data placement policy for distribution scheme commands and/or distributed array commands 2200 capable of being provided by client 500. As shown, distribution scheme/distributed array commands 2200 may include a non-remote distributor object 2210, a remote distributor object 2220, a distributed class object 2230, a codistributed class object 2240, and/or an error 2250.

A distributor object (e.g., non-remote distributor object 2210 and remote distributor object 2220) may determine where data associated with a distributed array may be placed. For example, if a distributor object is non-remote (e.g., non-remote distributor object 2210), a resulting distributed array (e.g., codistributed class object 2240) may be non-remote. However, if a distributor object is non-remote (e.g., non-remote distributor object 2210), error 2250 may be generated if any dimensions of the resulting distributed array are remote. If a distributor object is remote (e.g., remote distributor object 2220), a resulting distributed array (e.g., distributed class object 2230) may be remote.

Although FIG. 22 shows exemplary distribution scheme/distributed array commands, in other implementations, client 500 may contain fewer, different, or additional distribution scheme/distributed array commands than depicted in FIG. 22.

Figure 23:
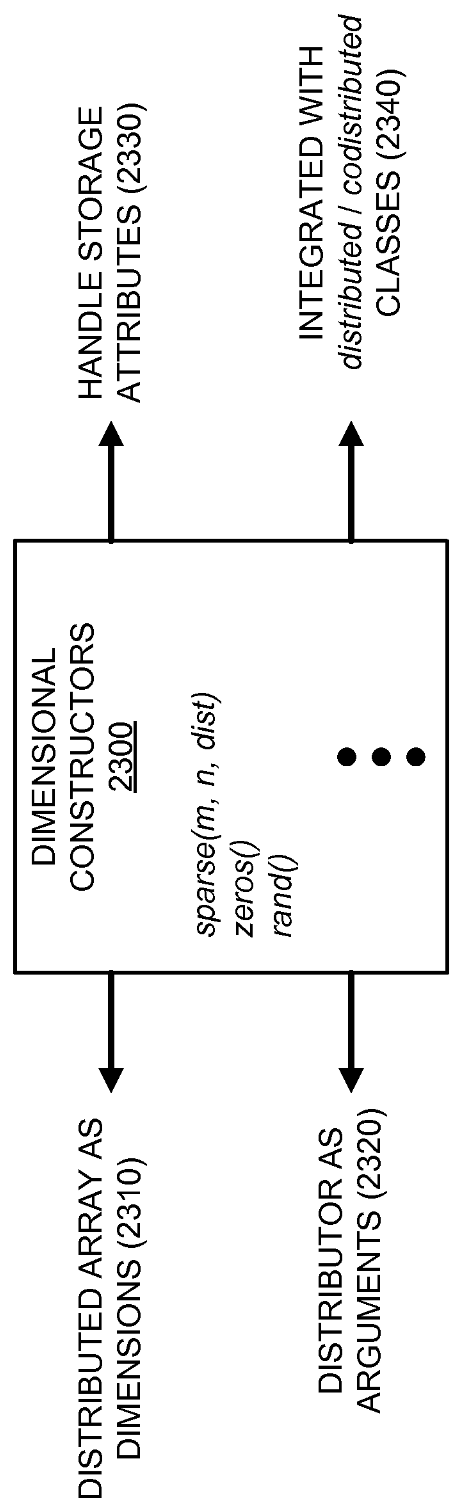
FIG. 23 depicts an exemplary diagram of dimensional constructors capable of being provided by the client illustrated in FIGS. 5A-5C.

FIG. 23 depicts an exemplary diagram of dimensional constructors 2300 capable of being provided by client 500. In one implementation, dimensional constructors 2300 may include dimensional constructors for distributed arrays, such as eye( ), ones( ), zeros( ), Inf( ), NaN( ), false( ), true( ), rand( ), randn( ), sparse(m, n, dist), speye( ), spones( ), sprand( ), sprandn( ), sprandsym( ), cell( ), etc. In other implementations, dimensional constructors 2300 may include other dimensional constructors for distributed arrays.

As further shown in FIG. 23, dimensional constructors 2300 may include distributed array dimensions as arguments, as indicated by reference number 2310, and a distributor object as arguments, as indicated by reference number 2320. Dimensional constructors 2300 may handle storage attributes (e.g., classes) associated with a distributed array, as indicated by reference number 2330, and may be integrated with distributed and/or codistributed classes, as indicated by reference number 2340.

Although FIG. 23 shows exemplary dimensional constructors, in other implementations, client 5Q0 may contain fewer, different, or additional dimensional constructors than depicted in FIG. 23.

FIG. 24 illustrates an exemplary diagram of distribution scheme and/or distributed array commands 2400 capable of being provided by client 500. In one implementation, distribution scheme/distributed array commands 2400 may transfer distributed arrays and associated distributor objects. As shown, distribution scheme/distributed array commands 2400 may include a distributor object (e.g. dist) 2410 for an inner parallel context, a distributed object (e.g., D) 2420, a distributor object (e.g., distributor(D)) 2430, codistributor objects (e.g., dist and distributor(D) inside a SPMD block) 2440, a codistributor object (e.g., dist1) 2450, a codistributed object (e.g., D1) 2460, a distributed object (e.g., D1 outside the SPMD block) 2470, and a distributor object (e.g., distributor(D1)) 2480.

In terms of placement, distributed arrays and distributor objects may be in-sync, as indicated by reference number 2490. In other words, a distributed object (e.g., objects 2420 and/or 2470) may include a distributor object (e.g., objects 2410, 2430, and/or 2480) to define its distribution, and a codistributed object (e.g., object 2460) may include a distributor object (e.g., objects 2410, 2430, and/or 2480) to define its distribution.

Although FIG. 24 shows exemplary distribution scheme/distributed array commands, in other implementations, client 500 may contain fewer, different, or additional distribution scheme/distributed array commands than depicted in FIG. 24.

Figure 25:
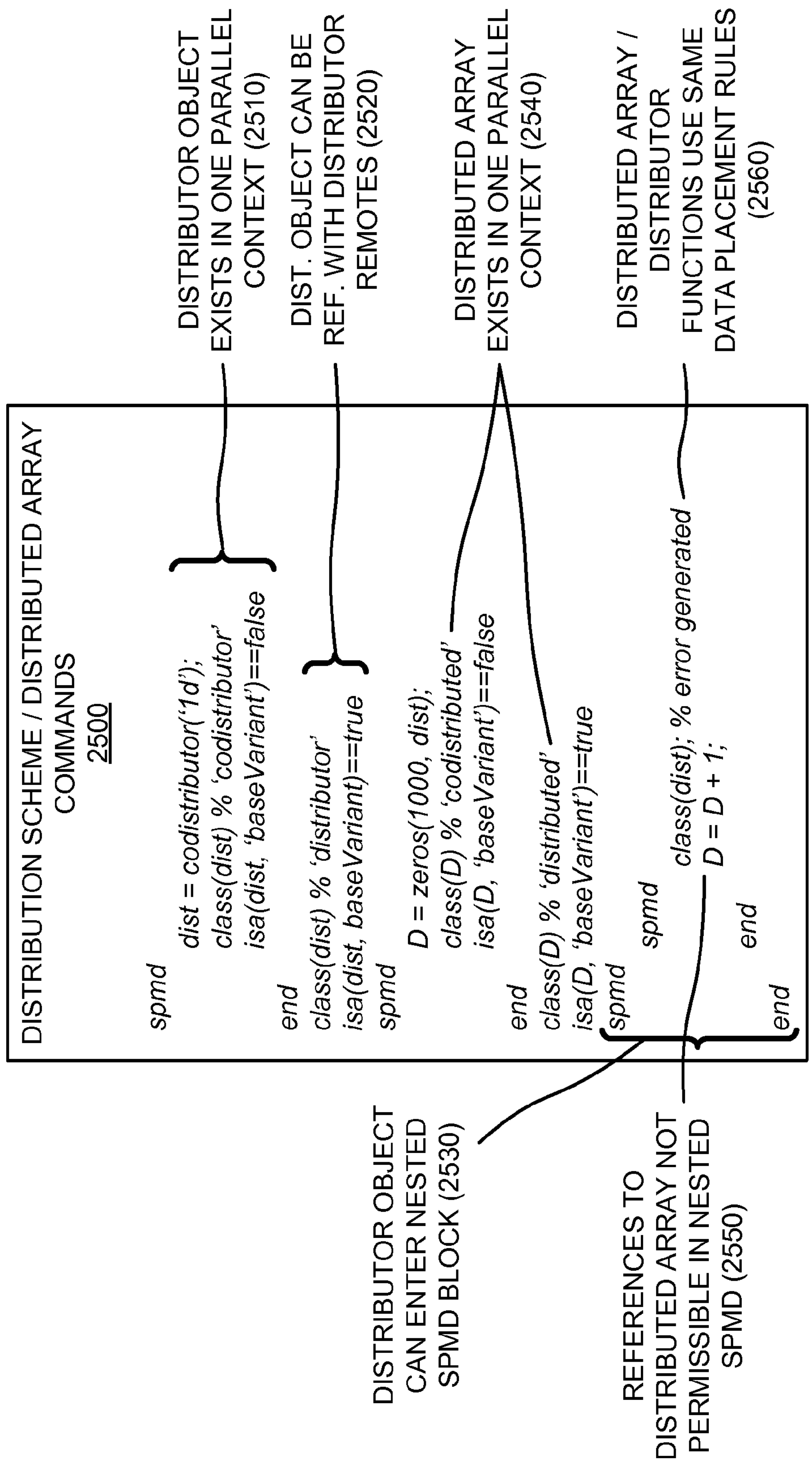
FIG. 25 depicts an exemplary diagram of distribution scheme and/or distributed array commands capable of being provided by the client illustrated in FIGS. 5A-5C, where the distribution scheme and/or distributed array commands may provide interactions with nested parallel processing constructs.

FIG. 25 depicts an exemplary diagram of distribution scheme and/or distributed array commands 2500 capable of being provided by client 500. As illustrated, distribution scheme/distributed array commands 2500 may show interactions with nested SPMD blocks.

A distributor object (e.g., dist) may exist in one parallel context, as indicated by reference number 2510. A distributor object may be referenced with distributor remotes (or remote references) outside of the one parallel context, as indicated by reference number 2520. A distributor object may enter a nested SPMD block from its own parallel context, as indicated by reference number 2530. A distributed array may exist in one parallel context, as indicated by reference number 2540. References to a distributed array outside of the distributed array's context are not permissible in a nested SPMD block, as indicated by reference number 2550. Functions associated with distributed arrays may be collective and may include a transfer of a distributed array into a nested SPMD block (e.g., a SPMD block within another SPMD block). A distributed array and distributor functions may use the same data placement rules regardless of the nesting depth of the SPMD blocks, as indicated by reference number 2560.

Although FIG. 25 shows exemplary distribution scheme/distributed array commands, in other implementations, client 500 may contain fewer, different, or additional distribution scheme/distributed array commands than depicted in FIG. 25.

Figure 26:
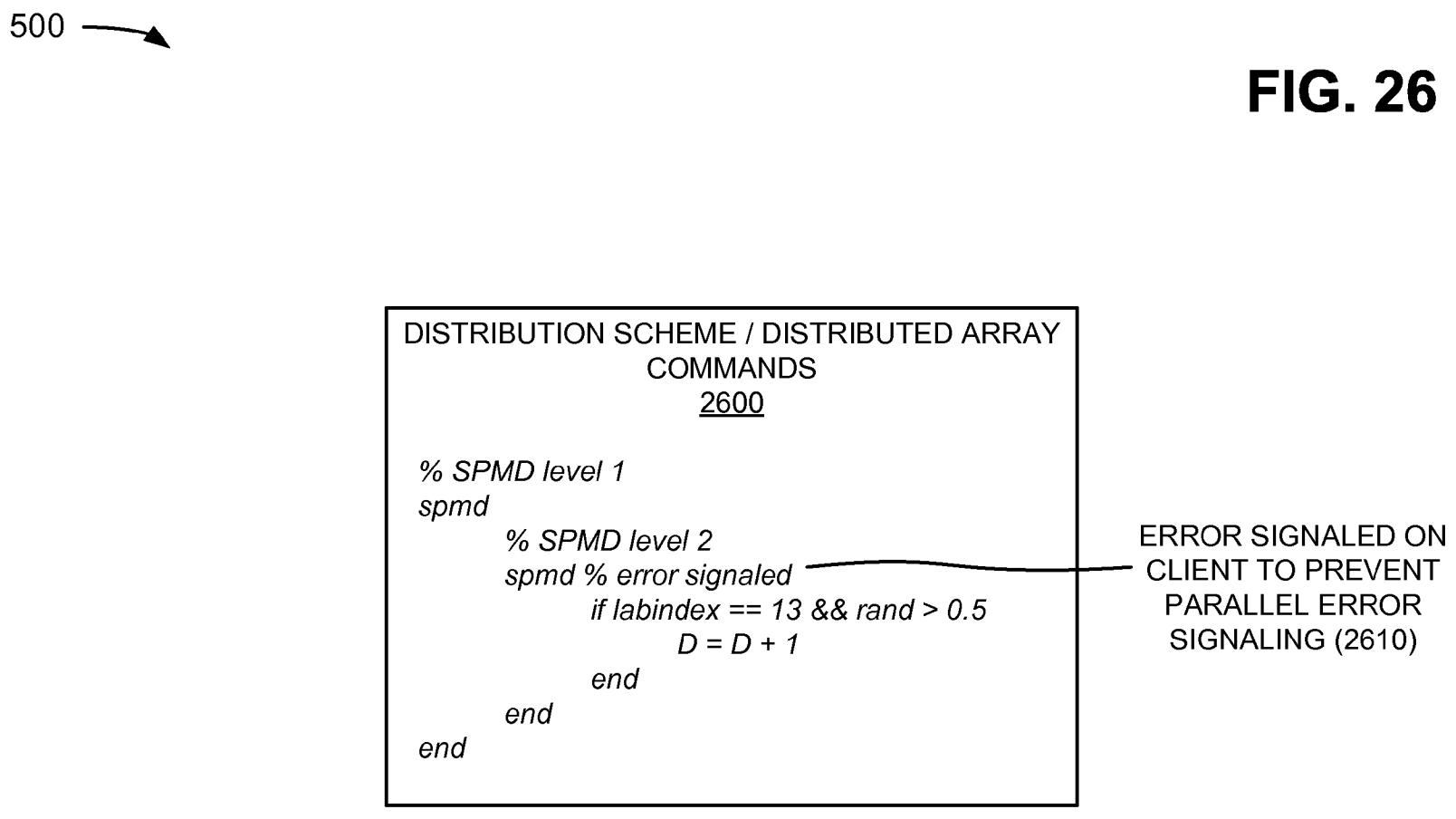

FIG. 26 illustrates an exemplary diagram of distribution scheme and/or distributed array commands 2600 capable of being provided by client 500. As shown, distribution scheme/distributed array commands 2600 may generate an error 2610 to prevent parallel error signaling. Error 2610 may be generated when a codistributed object (e.g., D) is used in a nested SPMD block. In one example, the SPMD conversion API, described above, may convert an object into its remote representation the SPMD code is executed. For the codistributed object, the SPMD conversion API may generate error 2610 unconditionally. By doing so, the erroneous use of the object in a nested SPMD block may be signaled by client 500, and may prevent parallel error signaling (e.g., by labs 420).

Although FIG. 26 shows exemplary distribution scheme/distributed array commands, in other implementations, client 500 may contain fewer, different, or additional distribution scheme/distributed array commands than depicted in FIG. 26.

FIG. 27 depicts an exemplary diagram of distribution scheme and/or distributed array commands 2700 capable of being provided by client 500. As shown, distribution scheme/distributed array commands 2700 may reduce a remote call outside a parallel processing construct. If code that uses distributed arrays is inside a SPMD block, remote method invocation may be reduced. In other words, surrounding a piece of code with a SPMD block may optimize the code. Distributed arrays may execute faster inside a SPMD block because of latency associated with connecting to remote labs for every function call versus sending the entire contents (e.g., distributed arrays) of the SPMD block and executing the contents remotely at one time.

For example, as shown in FIG. 27, a function (e.g., nrm=solverSPMD(n, dist)) may make six separate local calls to the labs (e.g., labs 420), and the labs may separately execute the six separate calls, as indicated by reference number 2720. In contrast, another function (e.g., testerSPMD( )) may include a distributor object 2720 and may make a single remote call to the labs (e.g., labs 420), as indicated by reference number 2730. The labs may execute the single call at one time.

Although FIG. 27 shows exemplary distribution scheme/distributed array commands, in other implementations, client 500 may contain fewer, different, or additional distribution scheme/distributed array commands than depicted in FIG. 27.

Figure 28:
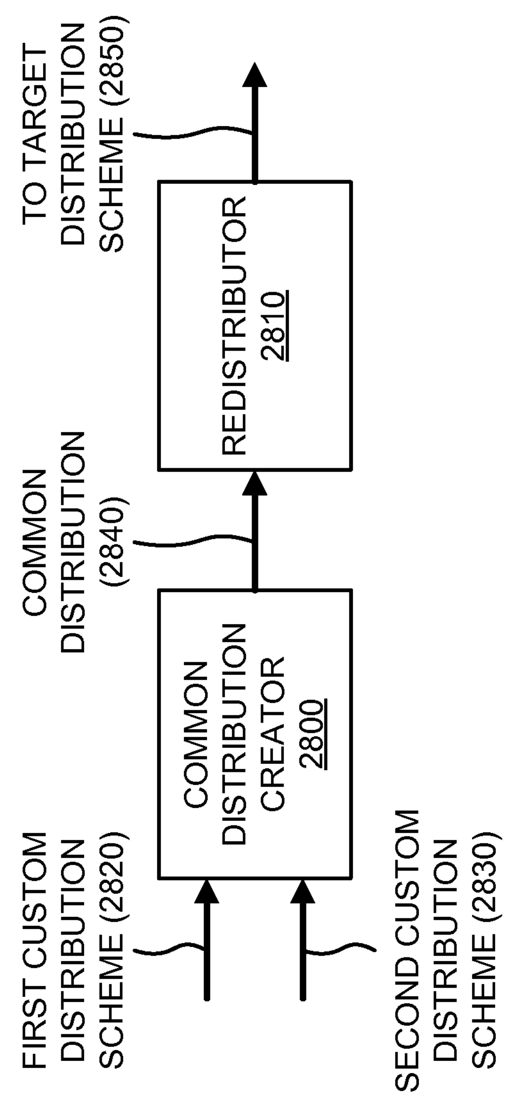
FIG. 28 illustrates an exemplary diagram of functional components, of the client depicted in FIGS. 5A-5C, for delegating distributed array methods to distributor objects.

FIG. 28 illustrates an exemplary diagram of functional components of client 500 for delegating distributed array methods to distributor objects. As shown, client 500 may include common distributor creator logic 2800 and redistributor logic 2810.

Common distribution creator 2800 may include hardware, software, and/or a combination of hardware and software based logic that receives a first custom distribution scheme 2820 (e.g., from a first user), and receives a second customer distribution scheme 2830 (e.g., from a second user). Common distribution creator 2800 may redistribute first custom distribution scheme 2820 and second custom distribution scheme 2830 into a common distribution 2830, and may provide common distribution 2840 to redistributor logic 2810.

Redistributor logic 2810 may include hardware, software, and/or a combination of hardware and software based logic that receives common distribution 2840 from common distribution creator 2800, and redistributes common distribution 2840 to a target distribution scheme 2850. Target distribution scheme 2850 may be used in place of first custom distribution scheme 2820 and second custom distribution scheme 2830.

Although FIG. 28 shows exemplary functional components of client 500, in other implementations, client 500 may contain fewer, different, or additional functional components than depicted in FIG. 28. In still other implementations, one or more functional components of client 500 may perform one or more other tasks described as being performed by one or more other functional components of client 500.

Exemplary Process

FIGS. 29-45 depict flow charts associated with an exemplary process 2900 according to implementations described herein. In one implementation, process 2900 may be performed by client 500. In other implementations, process 2900 may be performed by another device or combination of devices (e.g., client 500 in conjunction with web service 580).

As shown in FIG. 29, process 2900 may begin with initiation of a single programming language (block 2910). For example, in implementations described above in connection with FIG. 5A, parallel processing API 590 may be used to provide or initiate a single programming language presentation of distributed arrays.

One or more data distribution schemes for executing a program may be identified, via the single programming language (block 2920). For example, in implementations described above in connection with FIG. 9, efficient distribution scheme identifier logic 920 may identify one or more data distribution schemes for each operation or set of operations (e.g., main program 545) submitted by a user.

As further shown in FIG. 29, an optimum data distribution scheme may be automatically selected, via the single programming language, from the one or more identified data distribution schemes (block 2930), and the program may be transformed, via the single programming language, into a parallel program based on the optimum distribution scheme (block 2940). For example, in implementations described above in connection with FIGS. 9 and 10, efficient distribution scheme identifier logic 920 may select an appropriate distribution scheme (e.g., efficient data distribution scheme 960) for each operation or set of operations, may select a fastest algorithm for each operation submitted by the user, and may select appropriate resources (e.g., a number and types of labs) for each operation. Efficient data distribution scheme 960 may be used (e.g., by analysis logic 520) to allocate information (e.g., a distributed array) to two or more labs (e.g., labs 420). Distribution scheme commands 1000 may specify a layout of data onto a parallel resource set (e.g., labs 420), and may specify which parallel resource set is to be used for a distribution. Distributed array commands 1010 may specify a layout of data onto a parallel resource set (e.g., labs 420), and may specify which parallel resource set is to be used for a distributed array. Analysis logic 520 may automatically create the codistributor syntax and the codistributed syntax based on the distributor syntax and the distributed syntax, respectively, as indicated by reference number 1060. In other words, analysis logic 520 may transform distribution scheme commands 1000 (e.g., the distributor syntax) and distributed array commands (e.g., the distributed syntax) into parallel-based syntax (e.g., the codistributor syntax and the codistributed syntax).

Returning to FIG. 29, one or more portions of the parallel program may be allocated to one or more labs for parallel execution (block 2950). For example, in implementations described above in connection with FIG. 10, analysis logic 520 may provide the automatically created, parallel-based syntax (e.g., the codistributor syntax and the codistributed syntax) to one or more labs 420 for parallel execution.

As further shown in FIG. 29, one or more results associated with parallel execution of the one or more program portions may be received from the one or more labs (block 2960), and the one or more results may be provided to the program (block 2970). For example, in implementations described above in connection with FIG. 5A, results provider 540 of client 500 may receive results 570 from the labs, and may provide results 570 to program provider 510. In one example, results provider 540 may combine results 570 into a single result, and may provide the single result to program provider 510.

Figure 30:
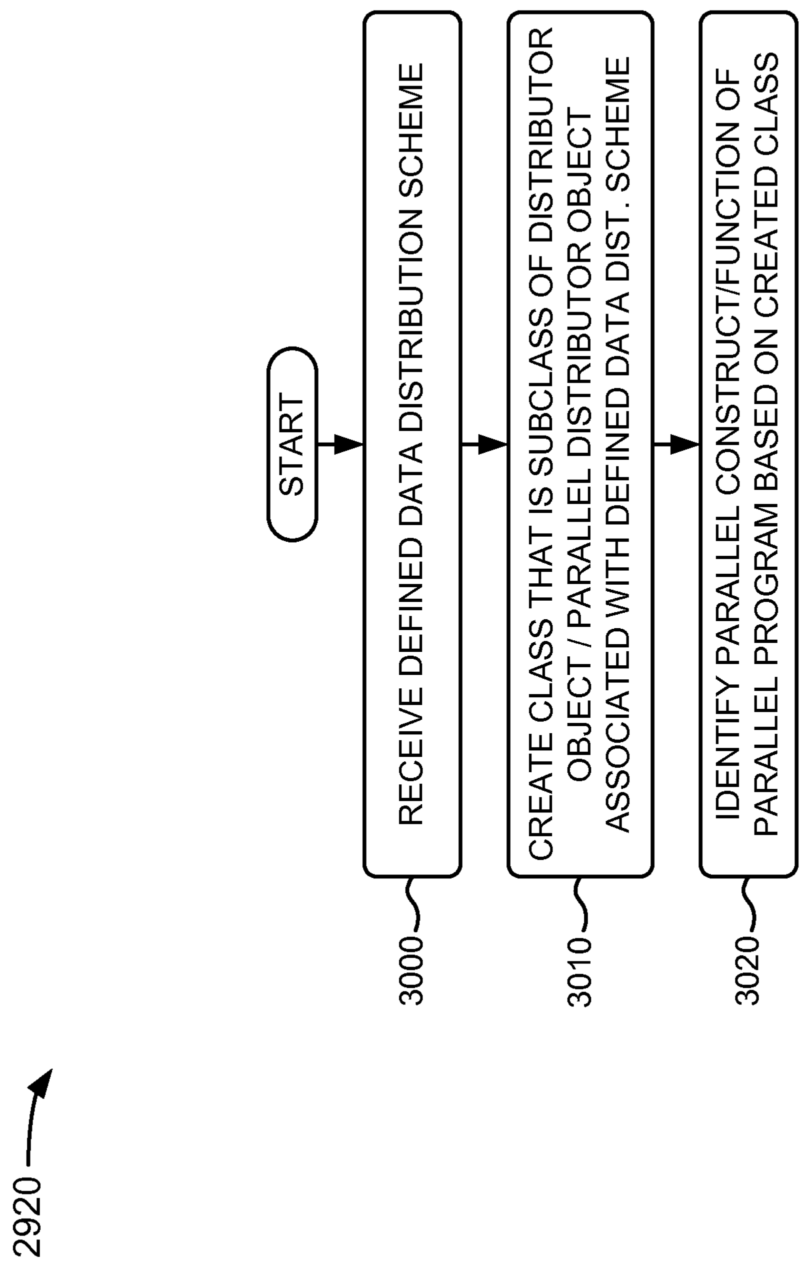

Process block 2930 may include the process blocks illustrated in FIG. 30. As shown in FIG. 30, process block 2930 may include receiving a defined data distribution scheme (block 3000), creating a class that is a subclass of a distributor object or a parallel distributor object associated with the defined data distribution scheme (block 3010), and identifying a parallel construct or function of the parallel program based on the created class (block 3020). For example, in implementations described above in connection with FIG. 15, abstract class deriver logic 1500 may receive user-defined distribution scheme 1530, and may create class (e.g., distributorBase) 1540 that is a subclass of a remote distribution scheme or class (e.g., codistributorBase) 1550 that is a subclass of a non-remote distribution scheme. Abstract class deriver 1500 may provide class (e.g., distributorBase) 1540 or class (e.g., codistributorBase) 1550 to SPMD conversion API logic 1510. SPMD conversion API logic 1510 may receive class (e.g., distributorBase) 1540 or class (e.g., codistributorBase) 1550 from abstract class deriver logic 1500, and may integrate class (e.g., distributorBase) 1540 or class (e.g., codistributorBase) 1550 by implementing a SPMD conversion API. SPMD conversion API logic 1510 may provide SPMD converted distribution scheme 1560, based on implementation of the SPMD conversion API, to distribution scheme methods logic 1520. Distribution scheme methods logic 1520 may receive SPMD converted distribution scheme 1560, and may implement distribution scheme 1570. In one example, distribution scheme methods logic 1520 may implement methods that perform parallel computations based on distribution scheme 1570.

Figure 31:
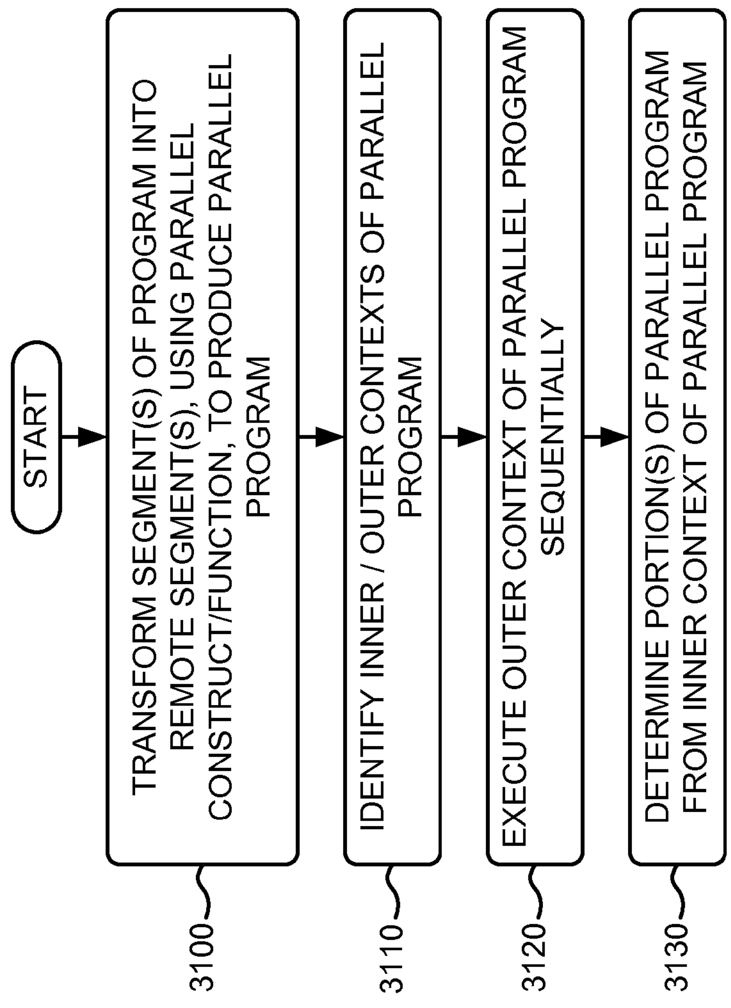

Process block 2940 may include the process blocks illustrated in FIG. 31. As shown in FIG. 31, process block 2940 may include may include transforming one or more segments of the program into one or more remote segments, using a parallel construct or function, to produce the parallel program (block 3100), identifying the inner and outer contexts of the parallel program (block 3110), executing the outer context of the parallel program sequentially (block 3120), and determining the one or more portions of the parallel program from the inner context of the parallel program (block 3130). For example, in implementations described above in connection with FIG. 11, distribution scheme commands 1100 may include outer parallel context 1110, SPMD boundaries 1120, and inner parallel context 1130. Outer parallel context 1110 may be provided to analysis logic 520, and analysis logic 520 may automatically create and identify SPMD boundaries 1120 and inner parallel context 1130. Analysis logic 520 may analyze outer parallel context 1110 to determine input variables associated with outer parallel context 1110, and may execute outer parallel context 1110 sequentially on client 500. Analysis logic 520 may determine and allocate one or more portions of inner parallel context 1130 and the input variables to labs 420 for parallel execution.

Figure 32:
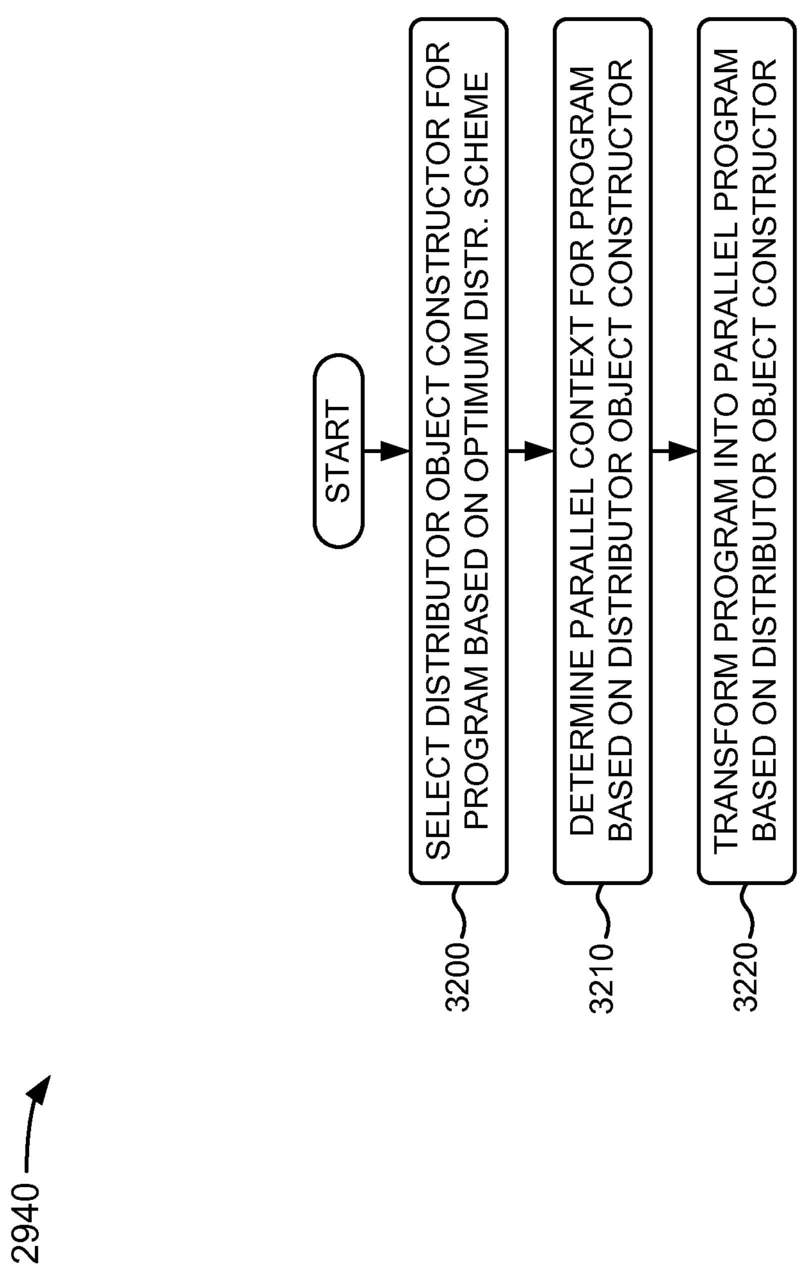

Alternatively and/or additionally, process block 2940 may include the process blocks illustrated in FIG. 32. As shown in FIG. 32, process block 2940 may include selecting a distributor object constructor for the program based on the optimum distribution scheme (block 3200), determining a parallel context for the program based the distributor object constructor (block 3210), and transforming the program into the parallel program based on the distributor object constructor (block 3220). For example, in implementations described above in connection with FIG. 12, a distributor object may determine a parallel context that owns a distributed array. Client 500 (e.g., analysis logic 520) may select the parallel context by choosing which of the distributor objects is called. Distribution scheme commands 1200 may include a codistributor object (e.g., distL) and a distributor object (e.g., distR). Distributor placement API 1210 may receive distribution scheme commands 1200, and may choose a parallel context for distributed arrays by calling an appropriate distributor object. In one example, distributor placement API 1210 may determine that distL is a non-remote class (e.g., a codistributor class), as indicated by reference number 1230, and may choose a local (or non-remote) parallel context for distributed arrays associated with distL. Distributor placement API 1210 may determine that distR is a remote class (e.g., a distributor class), as indicated by reference number 1240, and may choose a remote parallel context for distributed arrays associated with distR. Client 500 (e.g., analysis logic 520) may transform distribution scheme commands 1200 into parallel syntax based on the codistributor object and the distributor object.

Figure 33:
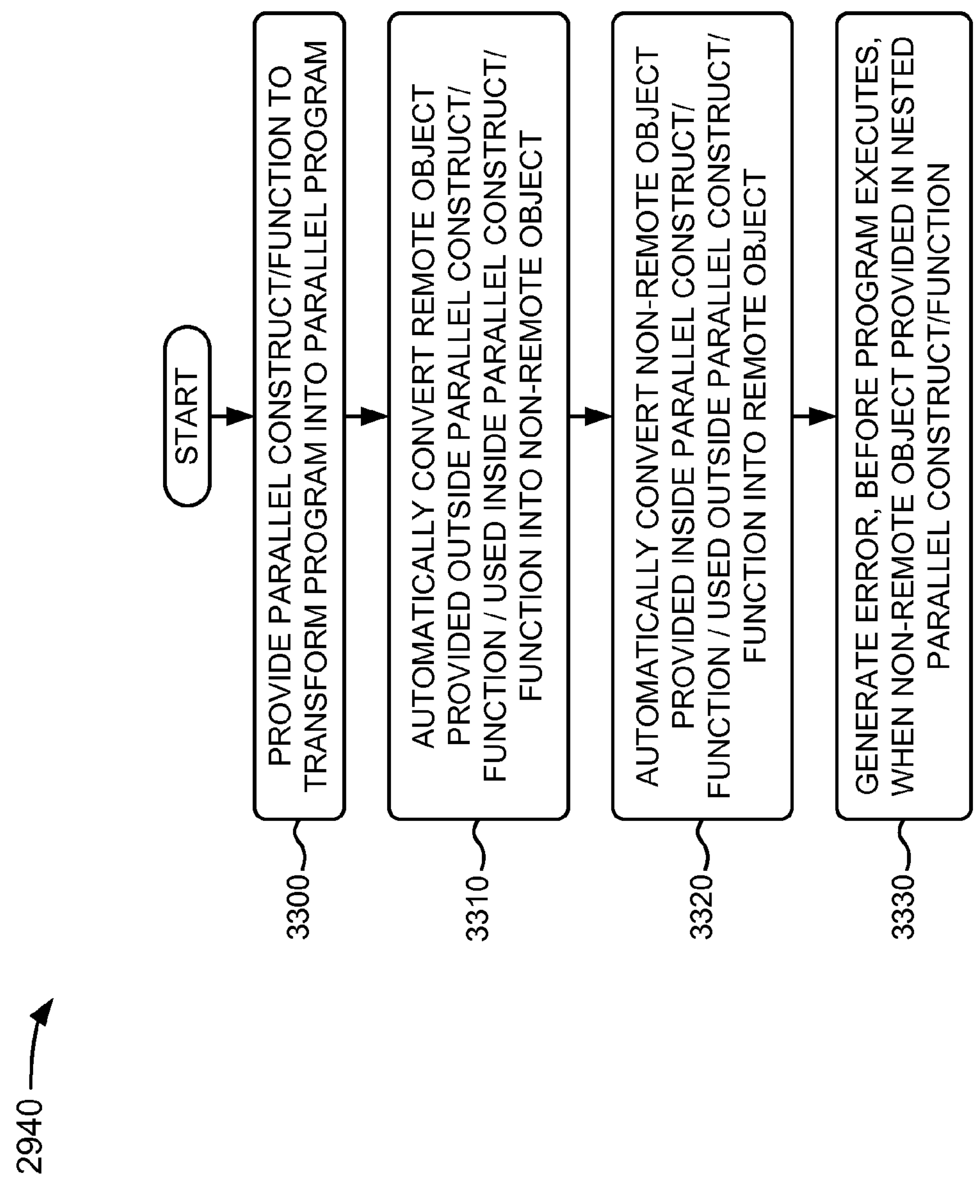

Alternatively and/or additionally, process block 2940 may include the process blocks illustrated in FIG. 33. As shown in FIG. 33, process block 2940 may include providing a parallel construct or function to transform the program into the parallel program (block 3300), automatically converting a remote object, provided outside the parallel construct or function and used inside the parallel construct or function, into a non-remote object (block 3310), automatically converting a non-remote object, provided inside the parallel construct or function and used outside the parallel construct or function, into a remote object (block 3320), and generating an error, before the program executes, when the non-remote object is provided in a nested parallel construct or function (block 3330).

For example, in implementations described above in connection with FIG. 13, distribution scheme commands 1300 and 1310 may include a parallel construct (e.g., a SPMD block). Distributor object of class distributor 1320 provided outside a SPMD block may be automatically converted (e.g., via analysis logic 520) into distributor object of class codistributor 1330 if distributor object of class distributor 1320 is used inside the SPMD block. Distributor object of class codistributor 1340 provided inside a SPMD block may be automatically converted (e.g., via analysis logic 520) into distributor object of class distributor 1350 if distributor object of class codistributor 1340 is used outside the SPMD block. In one example, if distributor object of class codistributor 1330 and 1340 is provided in a nested SPMD block, an error may be generated before execution of distribution scheme commands 1300 and 1310.

Figure 34:
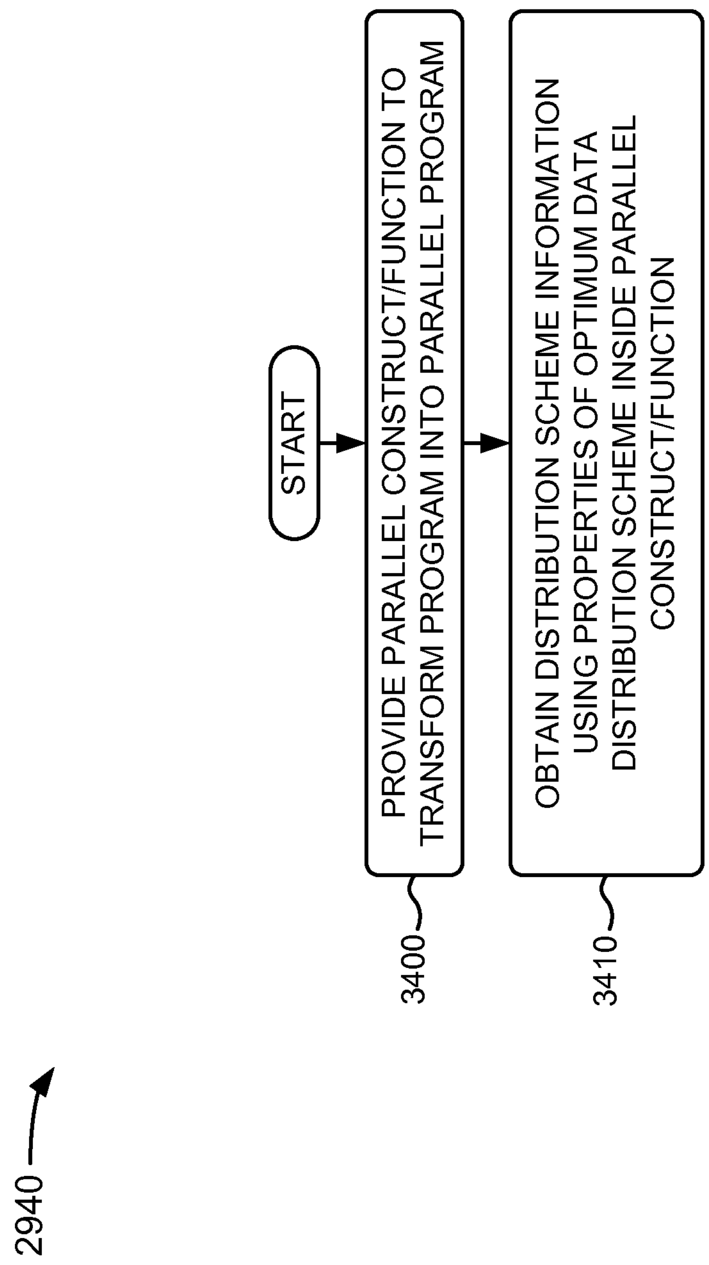

Alternatively and/or additionally, process block 2940 may include the process blocks illustrated in FIG. 34. As shown in FIG. 34, process block 2940 may include providing a parallel construct or function to transform the program into the parallel program (block 3400), and obtaining distribution scheme information using properties of the optimum data distribution scheme inside the parallel construct or function (block 3410).

For example, in implementations described above in connection with FIG. 14, distribution scheme commands 1400 and/or 1410 may include a parallel construct (e.g., a SPMD block), and may provide a mechanism (e.g., a distribution property of a distributor object) for obtaining a specific distribution scheme object. Distribution scheme commands 1400 may include distributor object 1420 provided outside a SPMD block and specific distribution scheme objects 1430 (e.g., distributionDimension). Information specific to a distribution scheme (e.g., provided by distributor object 1420) may be obtained (e.g., via analysis logic 520) by using specific distribution objects 1430 outside the SPMD block. Distribution scheme commands 1410 may include distributor object 1440 provided inside a SPMD block and specific distribution scheme objects 1450 (e.g., distributionDimension). Information specific to a distribution scheme (e.g., provided by distributor object 1440) may be obtained (e.g., via analysis logic 520) by using specific distribution objects 1450 inside the SPMD block.

Process blocks 2940-2960 may include the process blocks illustrated in FIG. 35. As shown in FIG. 35, process blocks 2940-2960 may include providing a remote reference to an instance of distributed array (block 3500), remotely reconstructing the instance of the distributed array from the remote reference (block 3510), allocating the instance of the distributed array to the two or more labs (block 3520), and storing a local portion of distributed array data as private, with the instance of the distributed array, on the two or more labs (block 3530). For example, in implementations described above in connection with FIG. 16, distributed array commands 1600 may include a distributed object and a codistributed object. The distributed object may provide a remote reference to a distributed array, as indicated by reference number 1610, and may remotely invoke methods the codistributed object, as indicated by reference number 1620. The codistributed object may include an instance of the distributed array 1630 (e.g., the distributed array remotely referenced by the distributed object), and may reside on one or more labs (e.g., lab 420-1), as indicated by reference number 1640. The codistributed object may store a local portion of distributed array data 1650 (e.g., as a private field) on the one or more labs (e.g., lab 420-1).

Returning to FIG. 35, process blocks 2940-2960 may further include receiving one or more results associated with execution of the instance of the distributed array on the local portion from the two or more labs (block 3540), and dereferencing one or more remote references associated with the one or more results to produce one or more non-remote references when the one or more non-remote references are on the same lab(s) (block 3550). For example, in implementations described above in connection with FIGS. 16 and 17, the codistributed object may provide a reference to the local portion of distributed array data 1650, and lab 420-1 may provide one or more results of associated with execution of instance of the distributed array 1630 on local portion 1650 to distributed array commands 1600. Distributed array commands 1700 may include inner parallel context 1710 and dereference syntax 1720. Some methods of an instance of distributed arrays may return replicated values. Inner parallel context 1710 may automatically generate such methods, and the returned values (e.g., p) may become remote objects inside inner parallel context 1710. That is, if a call is made in the outer parallel context of distributed array commands 1700, a value coming out of inner parallel context 1710 may be converted to a remote object. However, if non-remote objects may be desired outside of inner parallel context 1710. Dereference syntax 1720 (e.g., p=p{1}) may be used to dereference the value (e.g., p) inside inner parallel context 1710, and to return a non-remote object (e.g., p becomes a non-remote object).

Alternatively and/or additionally, process block 2940 may include the process blocks illustrated in FIG. 36. As shown in FIG. 36, process block 2940 may include providing a parallel construct or function to transform the program into the parallel program (block 3600), automatically converting a distributed class variable, provided outside the parallel construct or function and used inside the parallel construct or function, into a parallel distributed class variable (block 3610), and automatically converting a parallel distributed class variable, provided inside the parallel construct or function and used outside the parallel construct or function, into a distributed class variable (block 3620).

For example, in implementations described above in connection with FIG. 18, distributed array commands 1800 may include a parallel construct (e.g., a SPMD block). Distributed object of class distributed 1810 provided outside a SPMD block may be automatically converted (e.g., via analysis logic 520) into a distributed object of class codistributed 1820 if distributed object of class distributed 1810 is used inside the SPMD block. Distributed object of class codistributed 1820 provided inside a SPMD block may be automatically converted (e.g., via analysis logic 520) into a distributed object of class distributed 1840 if distributed object of class codistributed 1830 is used outside the SPMD block.

Alternatively and/or additionally, process block 2940 may include the process blocks illustrated in FIG. 37. As shown in FIG. 37, process block 2940 may include providing a parallel construct or function to transform the program into the parallel program (block 3700), providing a distributed class object outside the parallel construct or function (block 3710), mixing a distributed class object provided outside the parallel construct or function with a parallel distributed class object when the distributed class object and the parallel distributed class object are in the same context (block 3720), providing a parallel distributed class object inside the parallel construct or function (block 3730), and mixing the parallel distributed class object provided inside the parallel construct or function with a distributed class object when the parallel distributed class object and the distributed class object are in the same context (block 3740). For example, in implementations described above in connection with FIG. 19, distributed array commands 1900 and 1910 may include a parallel construct (e.g., a SPMD block), distributed object 1920, and parallel distributed object 1930. Distributed object 1920 and parallel distributed object 1930 may be mixed inside a SPMD block, as indicated by reference number 1940, and may be mixed outside the SPMD block, as indicated by reference number 1950.

Figure 38:
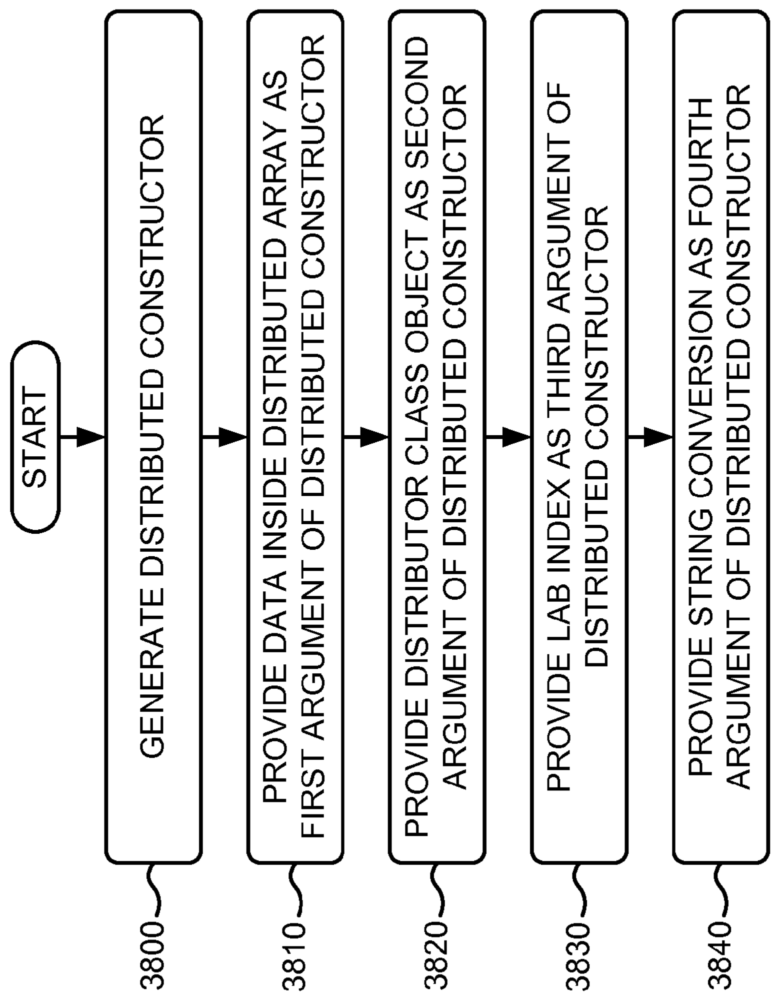

Alternatively and/or additionally, process block 2940 may include the process blocks illustrated in FIG. 38. As shown in FIG. 38, process block 2940 may include generating a distributed constructor (block 3800), providing data inside a distributed array as a first argument of the distributed constructor (block 3810), providing a distributor class object as a second argument of the distributed constructor (block 3820), providing a lab index as a third argument of the distributed constructor (block 3830), and providing a string conversion as fourth argument of the distributed constructor (block 3840).

For example, in implementations described above in connection with FIG. 20, distributed array commands 2000 may include distributed objects with one or more input arguments. The distributed object with one input argument 2010 may include argument 2050 that includes data to be stored in a distributed array. The distributed objects with two input arguments 2020 may include argument 2050 and argument 2060 that includes a distributor object of class distributor or argument 2070 that indicates a conversion from a single built-in array is requested. The distributed object with three input arguments 2030 may include arguments 2050-2070. The distributed object with four input arguments 2040 may include arguments 2050-2070 and argument 2080 that includes an index of a lab (e.g., a labindex).

Figure 39:
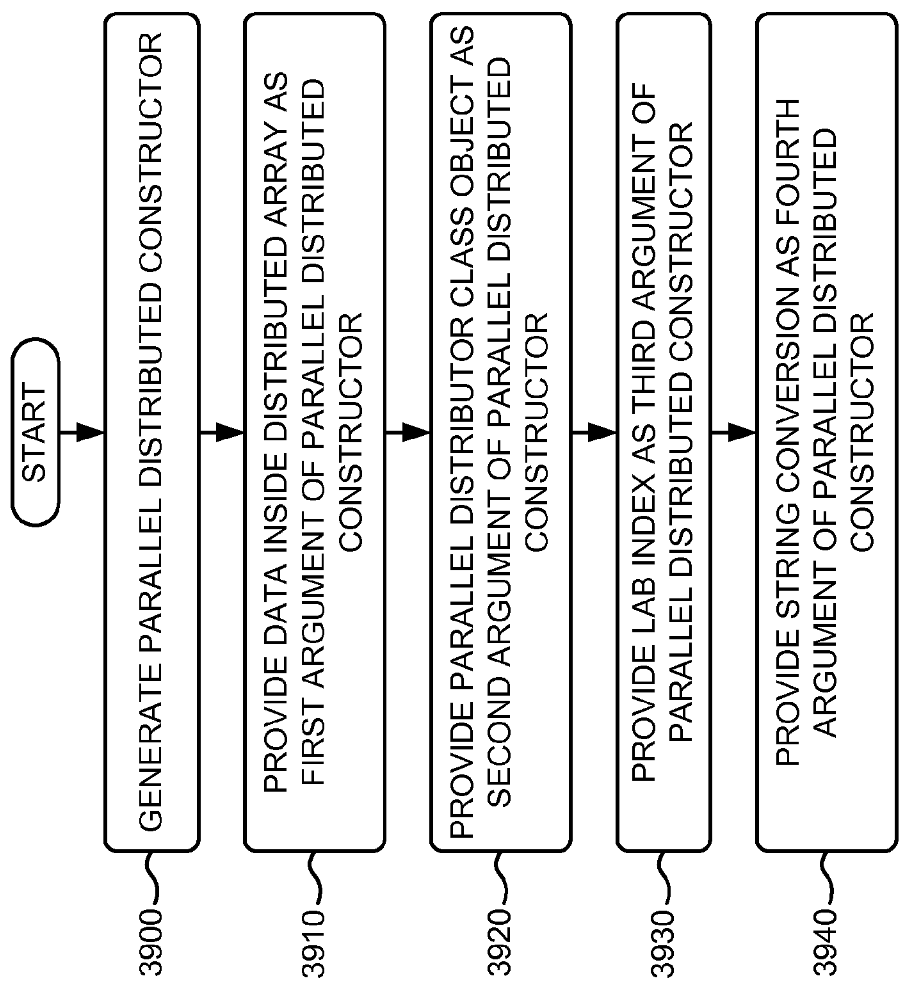

Alternatively and/or additionally, process block 2940 may include the process blocks illustrated in FIG. 39. As shown in FIG. 39, process block 2940 may include generating a parallel distributed constructor (block 3900), providing data inside a distributed array as a first argument of the parallel distributed constructor (block 3910), providing a parallel distributor class object as a second argument of the parallel distributed constructor (block 3920), providing a lab index as a third argument of the parallel distributed constructor (block 3930), and providing a string conversion as fourth argument of the parallel distributed constructor (block 3940).

For example, in implementations described above in connection with FIG. 21, distributed array commands 2100 may include parallel distributed objects with one or more input arguments. The distributed object with one input argument 2110 may include argument 2150 that includes data to be stored in a distributed array. The distributed objects with two input arguments 2120 may include argument 2150 and argument 2160 that includes a distributor object of class codistributor or argument 2170 that indicates a conversion from a single built-in array is requested. The distributed object with three input arguments 2130 may include arguments 2150-2170. The distributed object with four input arguments 2140 may include arguments 2150-2170 and argument 2180 that includes an index of a lab (e.g., a labindex).

Figure 40:
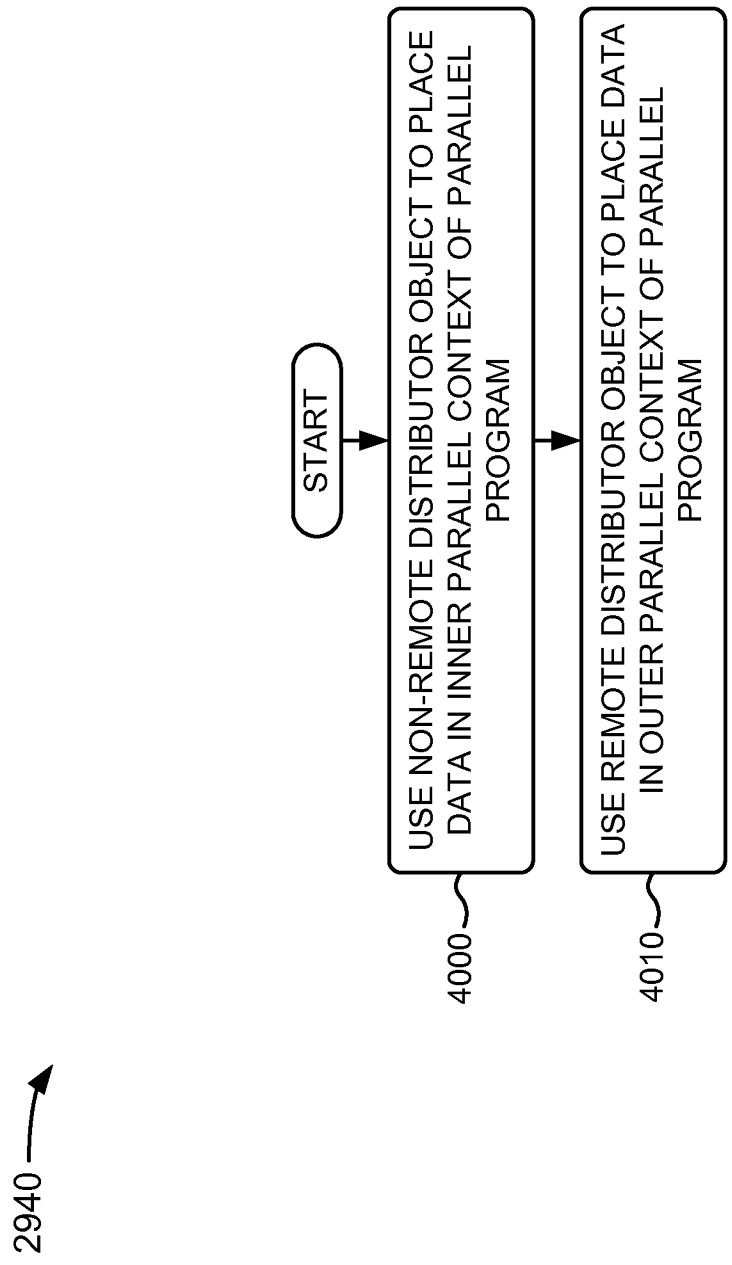

Alternatively and/or additionally, process block 2940 may include the process blocks illustrated in FIG. 40. As shown in FIG. 40, process block 2940 may include using a non-remote distributor object to place data in an inner parallel context of the parallel program (block 4000), and using a remote distributor object to place data in an outer parallel context of the parallel program (block 4010). For example, in implementations described above in connection with FIG. 22, distribution scheme/distributed array commands 2200 may include non-remote distributor object 2210, remote distributor object 2220, distributed class object 2230, and codistributed class object 2240. A distributor object (e.g., non-remote distributor object 2210 and remote distributor object 2220) may determine where data associated with a distributed array may be placed. For example, if a distributor object is non-remote (e.g., non-remote distributor object 2210), a resulting distributed array (e.g., codistributed class object 2240) may be non-remote. However, if a distributor object is non-remote (e.g., non-remote distributor object 2210), error 2250 may generated if any dimensions of the resulting distributed array are remote. If a distributor object is remote (e.g., remote distributor object 2220), a resulting distributed array (e.g., distributed class object 2230) may be remote.

Figure 41:
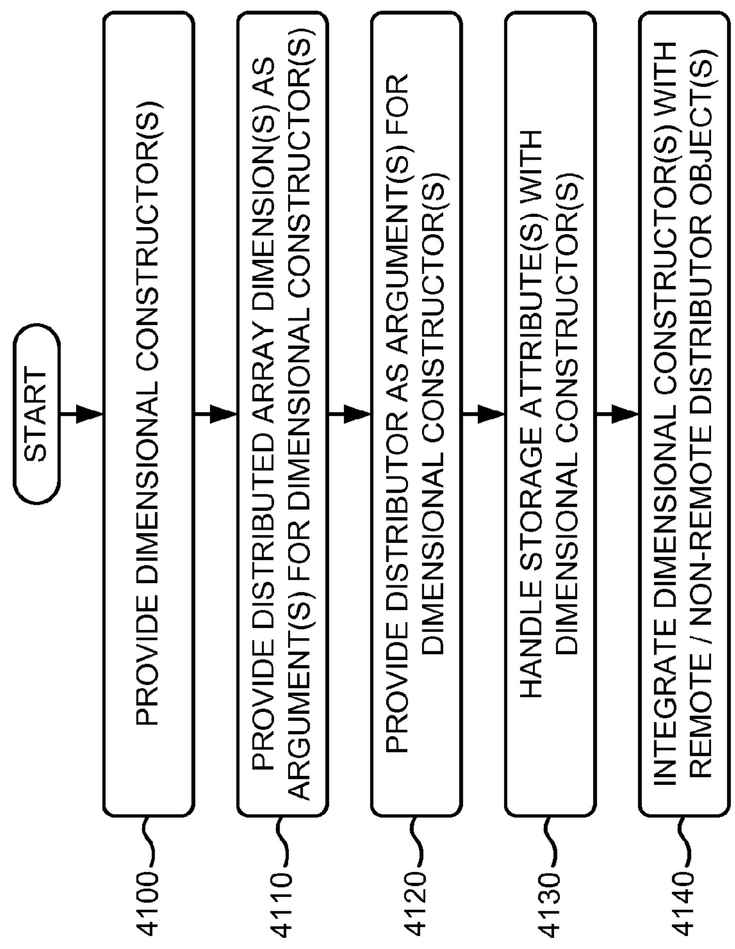

Alternatively and/or additionally, process block 2940 may include the process blocks illustrated in FIG. 41. As shown in FIG. 41, process block 2940 may include providing one or more dimensional constructors (block 4100), providing one or more distributed array dimensions as one or more arguments for the one or more dimensional constructors (block 4110), providing a distributor as one or more arguments for the one or more dimensional constructors (block 4120), handling one or more storage attributes with the one or more dimensional constructors (block 4130), and integrating the one or more dimensional constructors with one or more remote and/or non-remote distributor objects (block 4140).

For example, in implementations described above in connection with FIG. 23, dimensional constructors 2300 may include distributed array dimensions as arguments, as indicated by reference number 2310, and a distributor object as arguments, as indicated by reference number 2320. Dimensional constructors 2300 may handle storage attributes associated with a distributed array, as indicated by reference number 2330, and may be integrated with distributed and/or codistributed classes, as indicated by reference number 2340.

Figure 42:
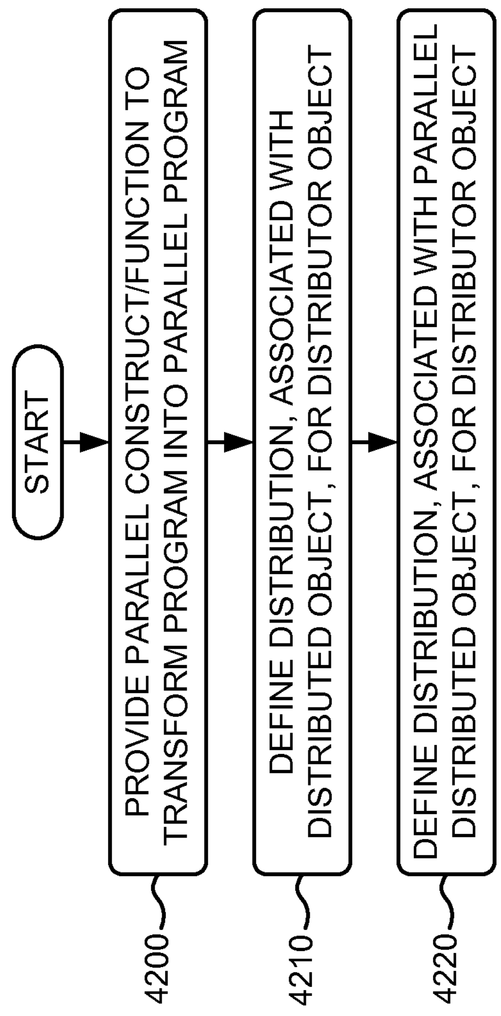

Alternatively and/or additionally, process block 2940 may include the process blocks illustrated in FIG. 42. As shown in FIG. 42, process block 2940 may include providing a parallel construct or function to transform the program into the parallel program (block 4200), defining a distribution, associated with a distributed object, for a distributor object (block 4210), and defining a distribution, associated with a parallel distributed object, for the distributor object (block 4220). For example, in implementations described above in connection with FIG. 24, distribution scheme/distributed array commands 2400 may include a parallel construct (e.g., a SPMD block). In terms of placement, distributed arrays and distributor objects may be in-sync, as indicated by reference number 2490. In other words, a distributed object (e.g., objects 2420 and/or 2470) may include a distributor object (e.g., objects 2410, 2430, and/or 2480) to define its distribution, and a codistributed object (e.g., object 2460) may include a distributor object (e.g., objects 2410, 2430, and/or 2480) to define its distribution.

Figure 43:
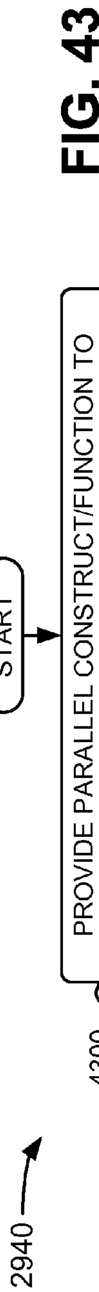

Alternatively and/or additionally, process block 2940 may include the process blocks illustrated in FIG. 43. As shown in FIG. 43, process block 2940 may include providing a parallel construct or function to transform the program into the parallel program (block 4300), providing a distributor object inside a parallel context of the parallel construct or function (block 4310), referencing the distributor object with a distributor remote outside the parallel context of the parallel construct or function (block 4320), and providing a nested parallel construct or function for entry from the parallel context of the parallel construct or function with the distributor object (block 4330). For example, in implementations described above in connection with FIG. 25, distribution scheme/distributed array commands 2500 may include a parallel construct (e.g., a SPMD block), and nested parallel constructs (e.g., nested SPMD blocks). A distributor object (e.g., dist) may exist in one parallel context, as indicated by reference number 2510. A distributor object may be referenced with distributor remotes outside of the one parallel context, as indicated by reference number 2520. A distributor object may enter a nested SPMD block from its own parallel context, as indicated by reference number 2530.

Returning to FIG. 43, process block 2940 may further include providing a distributed array in the parallel context of the parallel construct or function (block 4340), providing a reference to the distributed array outside a distributed array context and inside the nested parallel construct or function (block 4350), using the same data placement rules for the distributed array and the distributor object (block 4360), and signaling an error when the distributed array is used in the nested parallel construct or function (block 4370).

For example, in implementations described above in connection with FIGS. 25 and 26, a distributed array may exist in one parallel context, as indicated by reference number 2540. References to a distributed array outside of the distributed array's context are not permissible in a nested SPMD block, as indicated by reference number 2550. Functions associated with distributed arrays may be collective and may include a transfer of a distributed array into a nested SPMD block (e.g., a SPMD block within another SPMD block). A distributed array and distributor functions may use the same data placement rules regardless of the nesting depth of the SPMD blocks, as indicated by reference number 2560. Distribution scheme/distributed array commands 2600 may generate error 2610 to prevent parallel error signaling. Error 2610 may be generated when a codistributed object (e.g., D) is used in a nested SPMD block.

Figure 44:
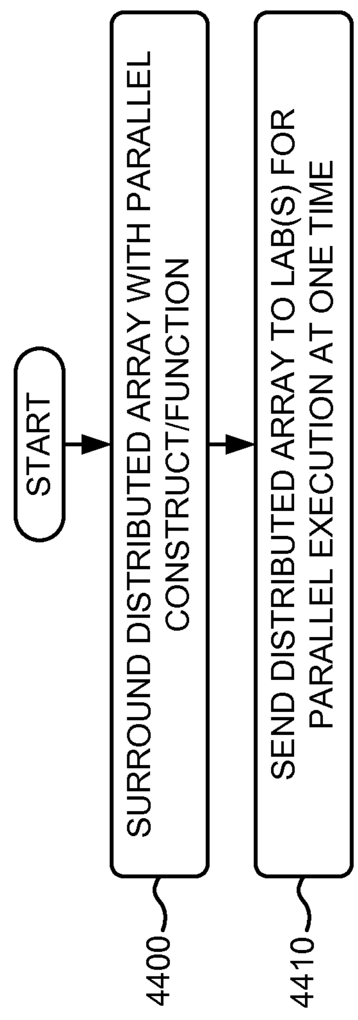

Process blocks 2940 and 2950 may include the process blocks illustrated in FIG. 44. As shown in FIG. 44, process blocks 2940 and 2950 may include surrounding a distributed array with a parallel construct or function (block 4400), and sending the distributed array to the two or more labs for parallel execution at one time (block 4410). For example, in implementations described above in connection with FIG. 27, distribution scheme/distributed array commands 2700 may reduce a remote call outside a parallel processing construct. If code that uses distributed arrays is inside a SPMD block, remote method invocation may be reduced. In other words, surrounding a piece of code with a SPMD block may optimize the code. For example, a function (e.g., nrm=solverSPMD(n, dist)) may make six separate local calls to the labs (e.g., labs 420), and the labs may separately execute the six separate calls, as indicated by reference number 2720. In contrast, another function (e.g., testerSPMD( )) may include a distributor object 2720 and may make a single remote call to the labs (e.g., labs 420), as indicated by reference number 2730. The labs may execute the single call at one time.

Figure 45:
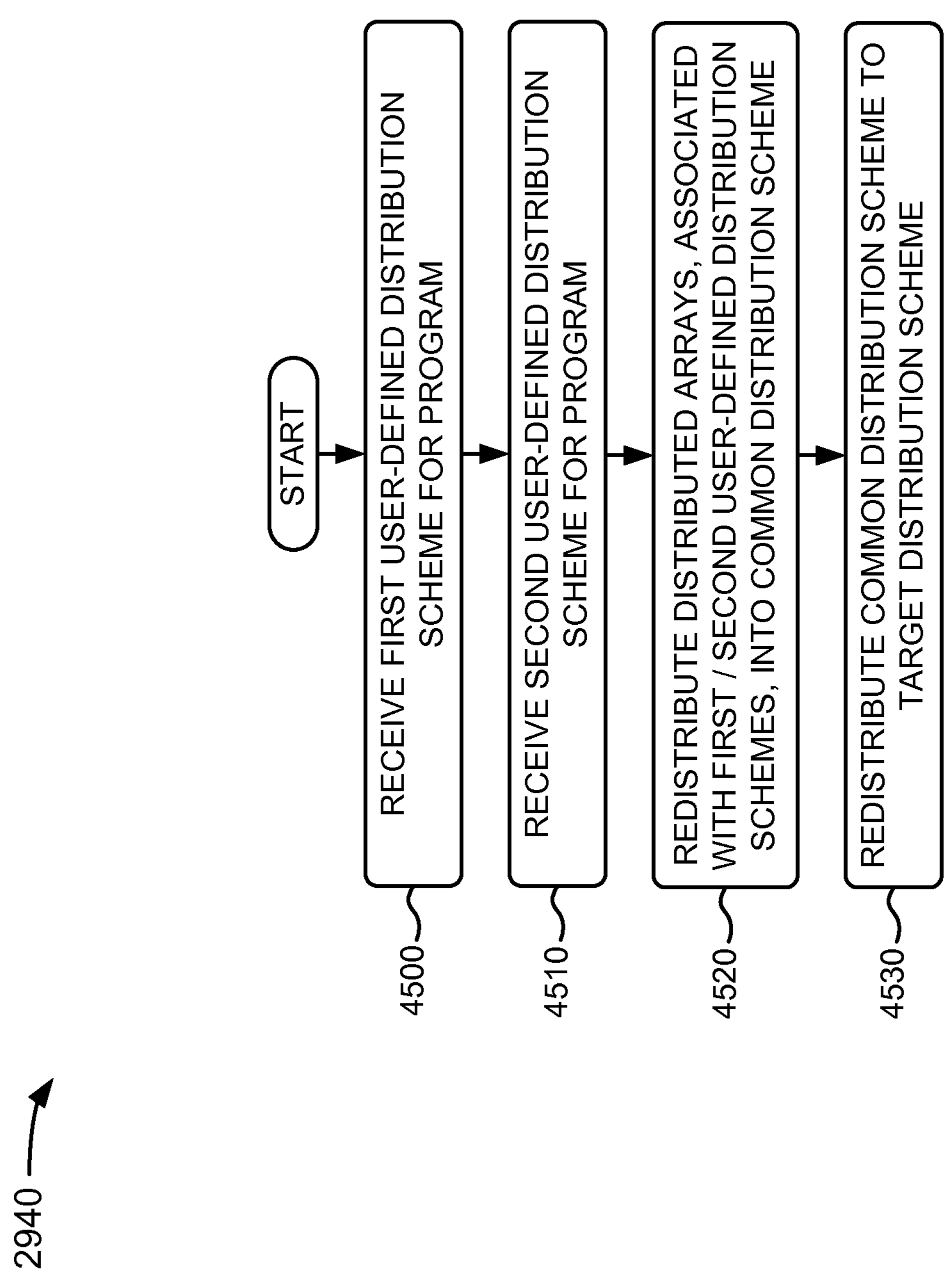

Alternatively and/or additionally, process block 2940 may include the process blocks illustrated in FIG. 45. As shown in FIG. 45, process block 2940 may include receiving a first user-defined distribution scheme for the program (block 4500), receiving a second user-defined distribution scheme for the program (block 4510), redistributing distributed arrays, associated with the first and second user-defined distribution schemes, into a common distribution scheme (block 4520), and redistributing the common distribution scheme to a target distribution scheme (block 4530).

For example, in implementations described above in connection with FIG. 28, client 500 may include common distributor creator logic 2800 and redistributor logic 2810. Common distribution creator 2800 may receive first custom distribution scheme 2820 (e.g., from a first user), and may receive second customer distribution scheme 2830 (e.g., from a second user). Common distribution creator 2800 may redistribute first custom distribution scheme 2820 and second custom distribution scheme 2830 into common distribution 2830, and may provide common distribution 2840 to redistributor logic 2810. Redistributor logic 2810 may receive common distribution 2840 from common distribution creator 2800, and may redistribute common distribution 2840 to target distribution scheme 2850. Target distribution scheme 2850 may be used in place of first custom distribution scheme 2820 and second custom distribution scheme 2830.

CONCLUSION

Implementations described herein may provide systems and/or methods for performing parallel processing. For example, in one implementation, the systems and/or methods may initiate a single programming language, and may identify, via the single programming language, one or more data distribution schemes for executing a program. The systems and/or methods also may transform, via the single programming language, the program into a parallel program with an optimum data distribution scheme selected from the one or more identified data distribution schemes, and may allocate one or more portions of the parallel program to two or more labs for parallel execution. The systems and/or methods may further receive one or more results associated with the parallel execution of the one or more portions from the two or more labs, and may provide the one or more results to the program.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 29-45, the order of the blocks may be modified in other implementations. Further, non-dependent blocks may be performed in parallel.

Also, the term "user" has been used herein. The term "user" is intended to be broadly interpreted to include a client or a user of a client.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:

transmitting a program to a first device, the transmitting being performed by a second device, the program including instructions to cause the first device to:

initiate a programming language, identify, via the programming language, one or more data distribution schemes for executing the program, when identifying the one or more data distribution schemes, the first device being further to:

receive a data distribution scheme, create a class that is a subclass of an object, and identify a parallel function of the program based on the created class, transform, via the programming language, the program into a parallel program, using the parallel function, with a data distribution scheme selected from the one or more identified data distribution schemes, allocate the parallel program to two or more labs for parallel execution, receive one or more results associated with the parallel execution of the parallel program from the two or more labs, and transmit the one or more results;

receiving the transmitted one or more results, the receiving being performed by the second device; and providing, for presentation, the transmitted one or more results, the providing being performed by the second device.

2. The method of claim 1, where the first device is a client device.

3. The method of claim 1, where the program is created for a technical computing environment.

4. The method of claim 1, where the parallel function enables a distributed array to be manipulated with explicit use of a single program, multiple data (SPMD) command.

5. The method of claim 1, where the instructions are further to cause the first device to:

identify an inner context and an outer context of the parallel program;

execute the outer context of the parallel program; and determine a portion of the parallel program to execute from the inner context of the parallel program.

6. The method of claim 1, where the instructions are further to cause the first device to:

execute the parallel program using the two or more labs.

7. The method of claim 1, where the instructions further cause the first device to:

combine the one or more results into a single result, and where receiving the transmitted one or more results includes:

receiving the single result.

8. A device comprising:

a processor to:

transmit a program to another device, the program including instructions to cause the other device to:

initiate a programming language, identify, via the programming language, one or more data distribution schemes for executing the program, when identifying the one or more data distribution schemes, the other device being further to:

receive a data distribution scheme, create a class that is a subclass of an object, and identify a parallel function of the parallel program based on the created class, transform, via the programming language, the program into a parallel program, using the parallel function, with a data distribution scheme selected from the one or more identified data distribution schemes, allocate the parallel program to two or more labs for parallel execution, receive one or more results associated with the parallel execution of the parallel program from the two or more labs, and transmit the one or more results;

receive the transmitted one or more results; and provide, for presentation, the transmitted one or more results.

9. The device of claim 8, where the other device is a client device.

10. The device of claim 8, where the program is created for a technical computing environment.

11. The device of claim 8, where the parallel function enables a distributed array to be manipulated with explicit use of a single program, multiple data (SPMD) command.

12. The device of claim 8, where the instructions are further to cause the other device to:

identify an inner context and an outer context of the parallel program;

execute the outer context of the parallel program; and determine a portion of the parallel program to execute from the inner context of the parallel program.

13. The device of claim 8, where the instructions are further to cause the other device to:

execute the parallel program using the two or more labs.

14. The device of claim 8, where the instructions further cause the other device to:

combine the one or more results into a single result, and where, when receiving the transmitted one or more results, the device is to:

receive the single result.

15. A method comprising:

transmitting a program to a first device, the transmitting being performed by a second device, the program including instructions to cause the first device to:

initiate a programming language, identify, via the programming language, one or more data distribution schemes for executing the program, transform, via the programming language, the program into a parallel program with a data distribution scheme selected from the one or more identified data distribution schemes, allocate the parallel program to two or more labs for parallel execution, receive one or more results associated with the parallel execution of the parallel program from the two or more labs, and transmit the one or more results;

receiving, the transmitted one or more results, the receiving being performed by the second device; and providing, for presentation, the transmitted one or more results, the providing being performed by the second device.

16. The method of claim 15, where the first device is a client device.

17. The method of claim 15, where the program is created for a technical computing environment.

18. The method of claim 15, where the parallel function enables a distributed array to be manipulated with explicit use of a single program, multiple data (SPMD) command.

19. The method of claim 15, where the instructions are further to cause the first device to:

identify an inner context and an outer context of the parallel program;

execute the outer context of the parallel program; and determine a portion of the parallel program to execute from the inner context of the parallel program.

20. The method of claim 15, where the instructions further cause the first device to:

combine the one or more results into a single result, and where receiving the transmitted one or more results includes:

receiving the single result.

* * * * *